United States Patent [19]

Belcastro

[11] 3,848,262

[45] Nov. 12, 1974

[54] DRUM MEMORY PROTECT ARRANGEMENT

[75] Inventor: Richard J. Belcastro, Schaumburg, Ill.

[73] Assignee: GTE Automatic Electric Laboratories Incorporated, Northlake, Ill.

[22] Filed: Apr. 6, 1973

[21] Appl. No.: 348,542

[52] U.S. Cl. .............................................. 360/60
[51] Int. Cl. .............................................. G11b 19/04
[58] Field of Search... 340/174.1 B, 174.1 C, 172.5; 307/85, 86, 87; 360/60, 79, 103

[56] References Cited

UNITED STATES PATENTS

| | | | |
|---|---|---|---|
| 3,172,091 | 3/1965 | Friend | 340/174.1 |
| 3,261,980 | 7/1966 | McCartney et al. | 307/86 |
| 3,339,081 | 8/1967 | Borden et al. | 307/86 |
| 3,483,541 | 12/1969 | Wright | 340/174.1 B |
| 3,518,986 | 7/1970 | Woods et al. | 307/86 |
| 3,535,560 | 10/1970 | Cliff | 340/172.5 |
| 3,551,746 | 12/1970 | Rubner | 307/87 |

*Primary Examiner*—Gareth D. Shaw
*Assistant Examiner*—Michael Sachs

[57] ABSTRACT

A drum memory system is described including the circuits and their system oriented relationship necessary to reduce the probability of destroying the data stored on a rotating magnetic drum due to common faults within the memory logic and linear write-read system. The problems associated with power supply failures, the most common faults, are treated.

5 Claims, 36 Drawing Figures

FIG. 2
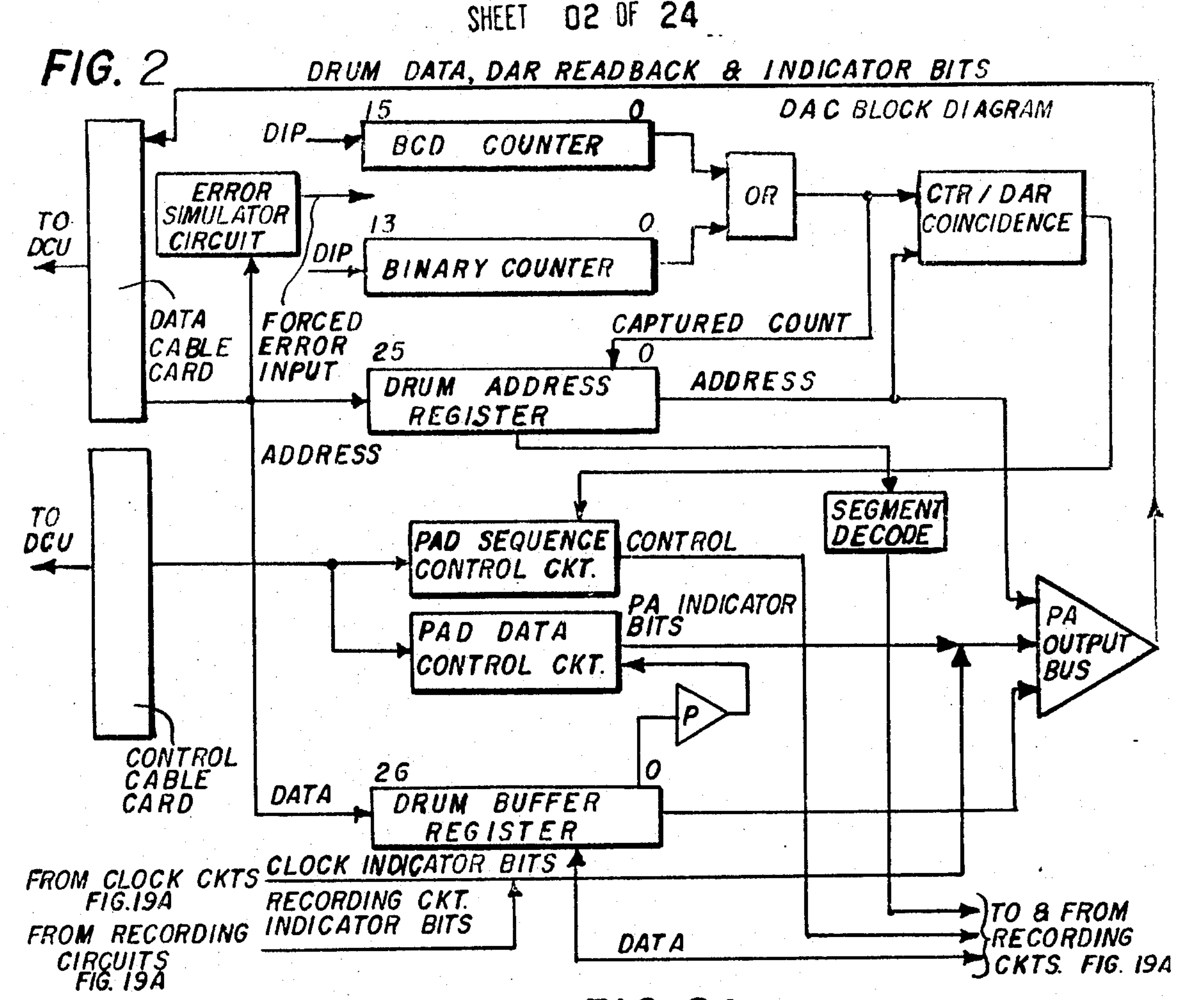
FIG. 2A DAC BLOCK DIAGRAM
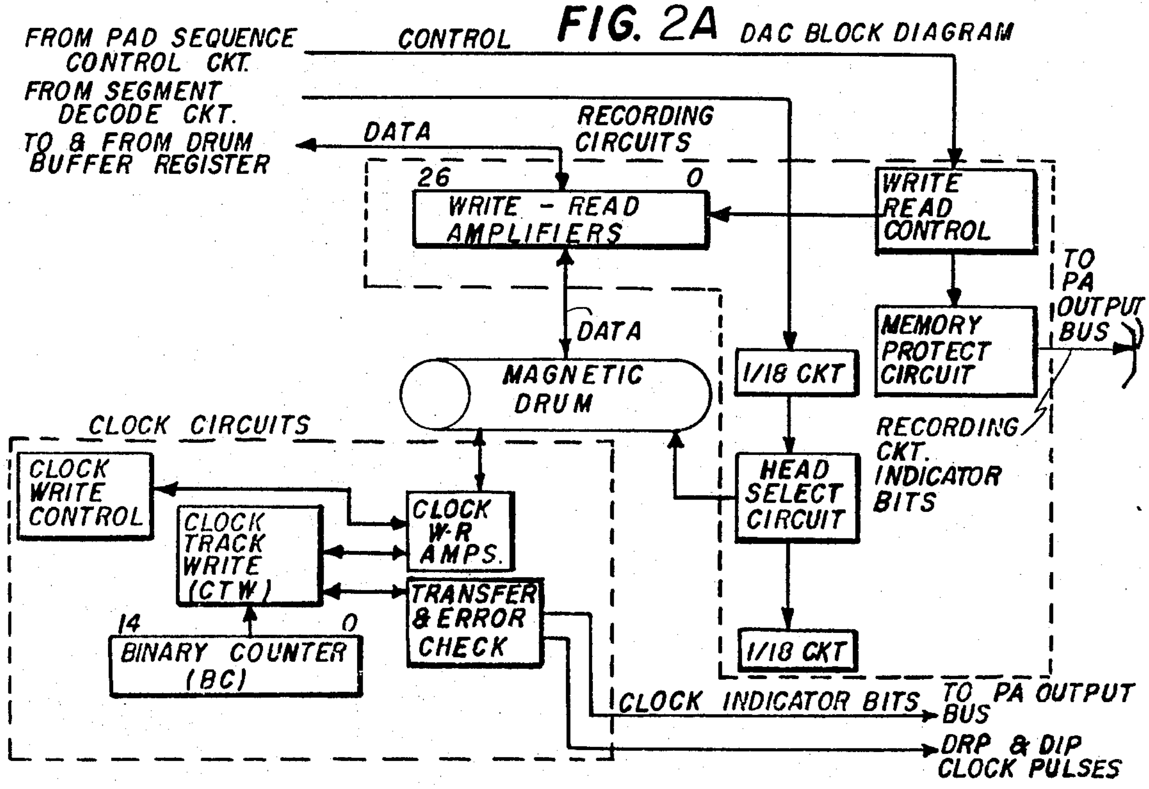

DAC PERIPHERAL ADAPTER READ TRANSFER FLOWCHART

DCU BLOCK DIAGRAM

DCU READ SEQUENCE

ASSOCIATIVE SEARCH CONTROL BLOCK DIAGRAM

ASSOCIATIVE SEARCH CONTROL BLOCK DIAGRAM

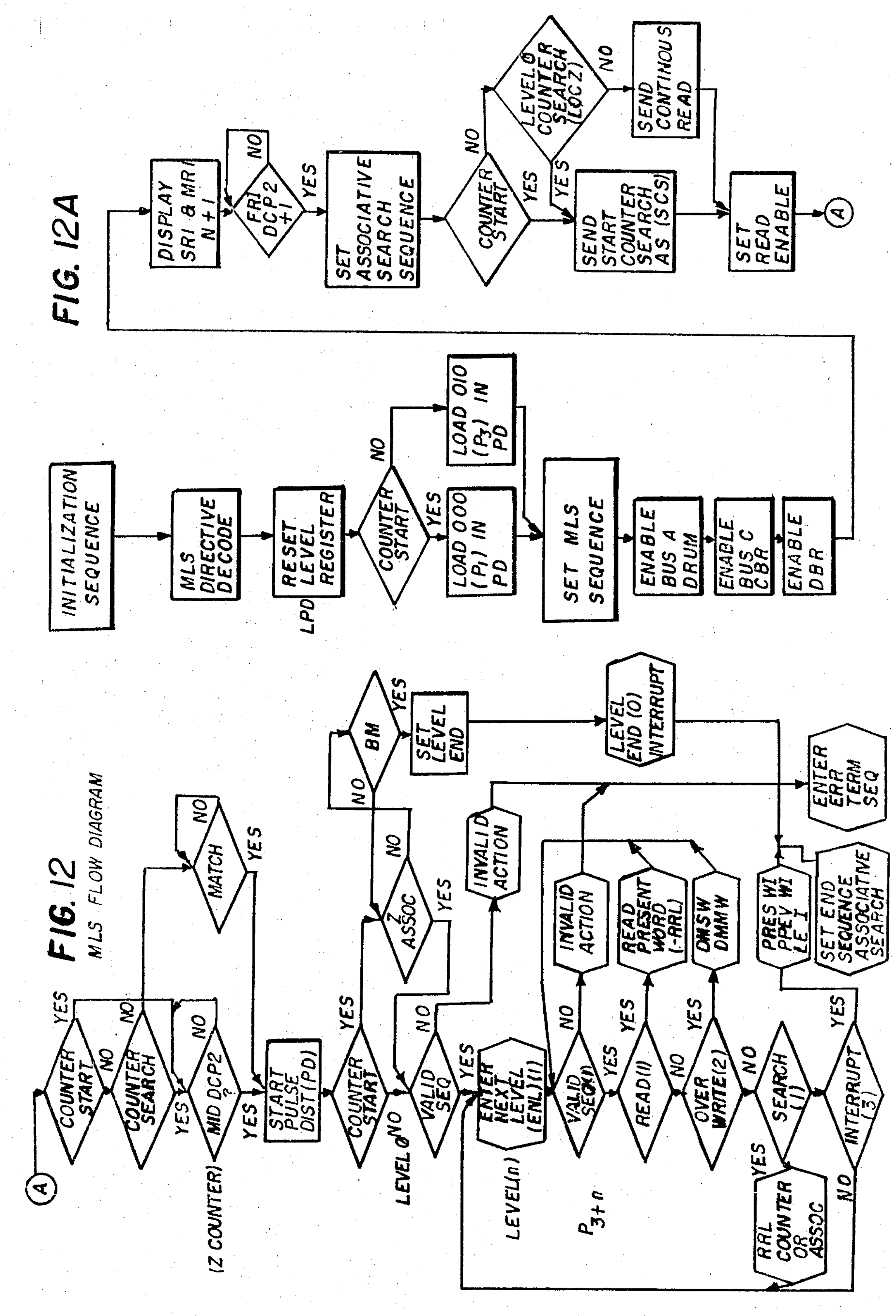
FIG. 12 MLS FLOW DIAGRAM, FIG. 12A

NOTES 1. "X" INDICATES TRUE
2. BLANK INDICATES FALSE
3. "—" WHEN IN A GROUP, ONE AND ONLY ONE IS TRUE
4. "—" WHEN ALONE INDICATES DONT CARE

FIG. 16A

| CONDITIONS | | RULES 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 |
|---|---|---|---|---|---|---|---|---|---|---|---|---|---|---|---|---|---|---|---|---|---|---|---|---|---|---|---|---|
| ACTIVE LEVEL | 0 | | | | | | | | | | | | | | | | | | | | | | | | | | | |
| ↓ | 1 | | | | | | | | | | | | | | | | | | | | | | | | | | | |
| | 2 | X | X | X | X | X | X | X | | | X | X | X | X | X | X | X | | | | | | | | | | | |
| ACTIVE LEVEL | 3 | | | | | | | | | | | | | | | | | | | X | X | X | X | X | X | X | | X |
| CBR CONTROL BITS | 2  1 INT. / 23 22 21 | | | | | | | | | | | | | | | | | | | | | | | | | | | |
| | 0 0 0 | — | | | | — | | — | | | — | | — | | | — | — | | | | — | — | — | | — | — | | |
| | 0 0 1 | | | | X | — | | — | | | — | | — | | | — | — | | | — | | | | | — | — | | |
| | 0 1 0 | | | | | | | | | | | | — | | | — | — | | | — | | | | | — | — | | |
| | 0 1 1 | | | | | | | | | | | | — | | | — | — | | | — | | | | | — | — | | |
| ↓ | 1 0 0 | — | | | | — | | — | | | — | | — | | | — | — | | | — | | | | | — | — | | |
| | 1 0 1 | | X | X | | | X | | | | | X | — | | | — | — | | | — | | | | | — | — | | |
| | 1 1 0 | | | | | | | | | | | | — | | | — | — | | | | — | — | — | | — | — | | |
| CBR CONTROL BITS | 1 1 1 | | | | | | | | | | | | | X | X | — | — | | | | | | | X | — | — | | X |
| DBR CONTROL BITS | 23 22 21 / 0 0 0 | | | X | | | | | | | — | — | — | — | | — | | | | — | X | | | — | — | — | | |
| | 0 0 1 | X | X | | X | | | | | | — | — | — | | X | — | | | | — | | X | | — | — | — | | |
| | 0 1 0 | | | | | — | — | | | | — | — | — | — | | — | | | | — | | | — | | — | — | | — |
| | 0 1 1 | | | | | — | — | | | | — | — | — | — | | — | | | | — | | | — | | — | — | | — |
| ↓ | 1 0 0 | | | | | — | — | | | | — | — | — | — | | — | | | | — | | | — | | — | — | | — |
| | 1 0 1 | | | | | — | — | | | | — | — | — | — | | — | | | | — | | | — | | — | — | | — |
| | 1 1 0 | | | | | — | — | — | | | | — | — | — | | | — | | | — | | | — | | — | — | | — |
| DBR CONTROL BITS | 1 1 1 | | | | | — | — | — | | | | — | — | — | | | — | | | — | | | — | | — | — | | — |
| READ LATCH SET | | X | X | X | X | X | X | X | | | X | X | | | | | | | | X | X | X | X | X | | X | | X |
| COINCIDENCE (DBR WORD) | | | | | | | | X | | | X | X | | | | | X | X | | | | | | | — | X | | |
| ENL | | | | | | | | X | | | | | | | | | X | | | | | | | | | | | |
| RPW | | | | | | | | | | | | | | | | | | | | | X | | | | | | | |
| DMSW | | | | X | X | | | | | | | | SEARCHING | SEARCHING | | | | | | | | | | | | | | |
| DMMW | | | X | | | | | | | | | | | | | | | | | | | | | | | | | |
| RRL | | | | | | X | | | | | | | | | | | | | | | | | | | | | | |
| PVWI | | | | | | | X | | | | | X | | | | | | | | | | | | | | | | X |
| PSWI | | X | | | | | | | | | | | | | | | | | | | | X | | | | | | |
| LEI | | | | | | | | | | | | | | | X | | | | | | | | | | | | | |
| IAI | | | | | | | | | | | X | | | | | X | | | | X | | | X | X | X | X | | |

FIG. 18 SYSTEM SHOWING MEMORY PROTECT CIRCUIT & THE MEMORY PROTECTION INTERFACE SYSTEM
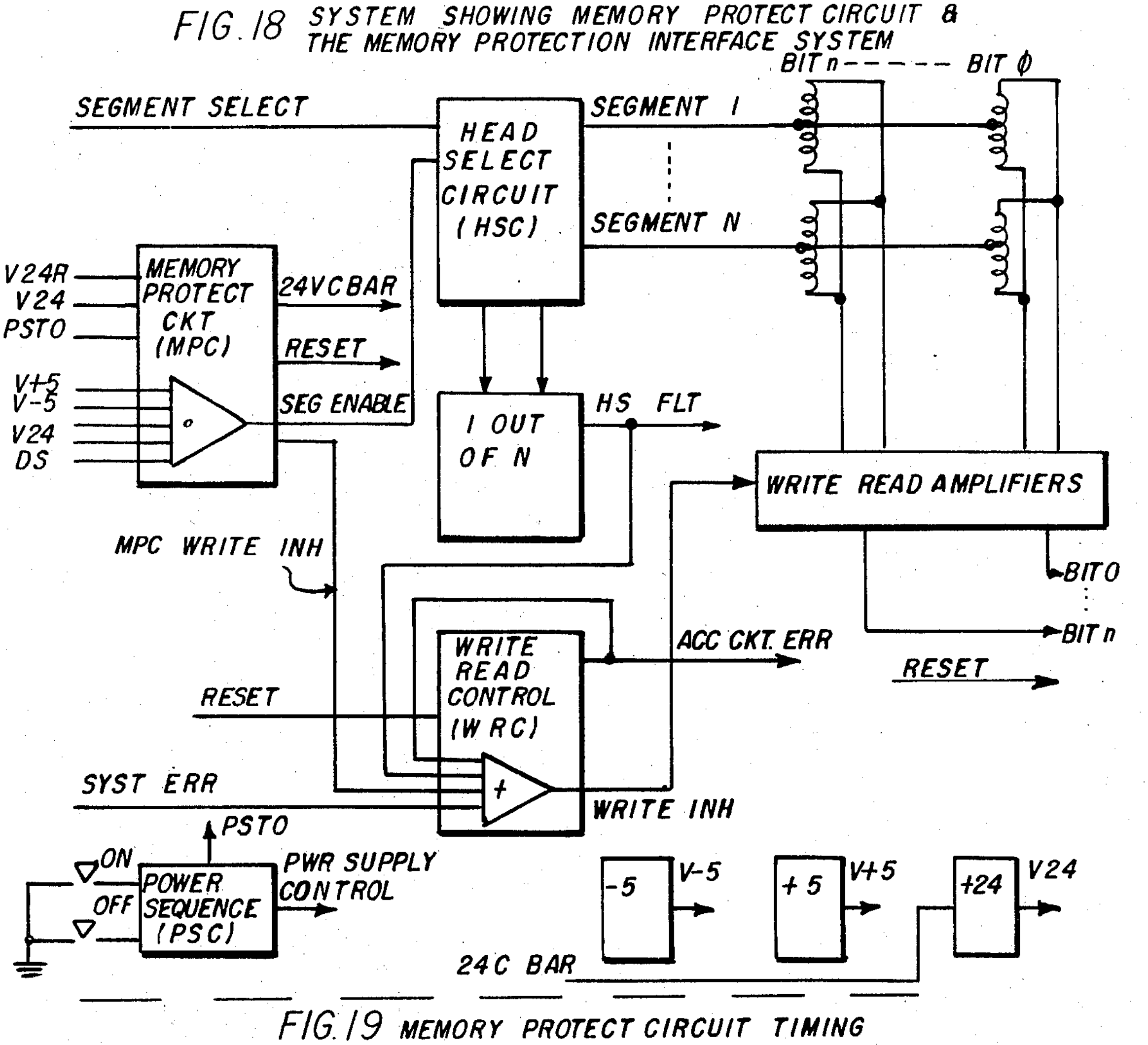
FIG. 19 MEMORY PROTECT CIRCUIT TIMING
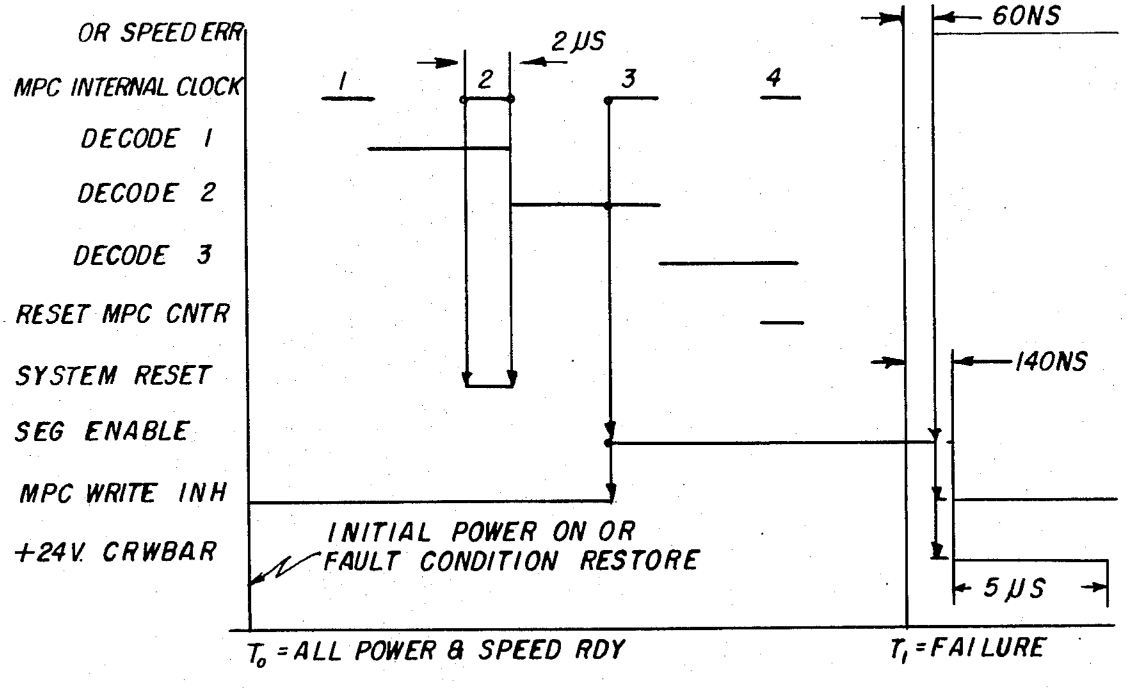

LOCAL POWER SUPPLY DETECTORS AND SPEED MONITOR

DRUM MEMORY PROTECT ARRANGEMENT

CROSS-REFERENCES TO RELATED APPLICATIONS

The preferred embodiment of the invention is incorporated in a "COMMUNICATION SWITCHING SYSTEM WITH MARKER, REGISTER AND OTHER SUBSYSTEMS COORDINATED BY A STORED PROGRAM CENTRAL PROCESSOR" U.S. Pat. application Ser. No. 130,133 filed Apr. 1, 1971 by K. E. Prescher, R. E. Schauer and F. B. Sikorski now abandoned, and a continuation-in-part thereof Ser. No. 342,323, filed Mar. 19, 1973, hereinafter referred to as the "System" application. The system may also be referred to as No. 1 EAX or simply EAX.

The memory access, and the priority and interrupt circuits for the register-sender subsystem are covered by U.S. Pat. application Ser. No. 139,480 filed May 3, 1971 now Pat. No. 3,729,715, issued May 31, 1973 by C. K. Buedel for a "Memory Access Apparatus Providing Cyclic Sequential Access By A Register Subsystem And Random Access By A Main Processor In A Communication Switching System," hereinafter referred to as the "Register-Sender Memory Control" patent application. The register-sender subsystem is described in U.S. Pat. application Ser. No. 201,851 filed Nov. 24, 1971 by S. E. Puccini for "Data Processor With Cyclic Sequential Access To Multiplexed Logic And Memory," hereinafter referred to as the "Register-Sender" patent application. Maintenance hardware features of the register-sender are described in four U.S. Pat. applications having the same disclosure filed July 12, 1972, Ser. No. 270,909 now Pat. No. 3,784,801, issued Jan. 8, 1974 by J. P. Caputo and F. A. Weber for a "Data Handling System Error And Fault Detecting And Discriminating Maintenance Arrangement," Ser. No. 270,910 by C. K. Buedel and J. P. Caputo for a "Data Handling System Maintenance Arrangement For Processing System Trouble Conditions," Ser. No. 270,912 by C. K. Buedel and J. P. Caputo, for a Data Handling System Error And Fault Detection And Discrimination Maintenance Arrangement," see Ser. No. 270,910, now Pat. No. 3,783,255, issued Jan. 1, 1974, by C. K. Buedel and J. P. Caputo, for a "Data Handling System Maintenance Arrangement For Processing System Trouble Conditions," by C. K. Buedel and J. P. Caputo, Ser. No. 290,912, for a "Data Handling System Maintenance Arrangement For Processing System Fault Conditions," and Ser. No. 270,916 now Pat. No. 3,783,256, issued Jan. 1, 1974 by J. P. Caputo and G. O'Toole for a "Data Handling System Maintenance Arrangement For Checking Signals," these four applications being referred to hereinafter as the "Register-Sender Maintenance" patent applications.

The marker for the system is disclosed in the U.S. Pat. 3,681,537, issued Aug. 1, 1972 by J. W. Eddy, H. G. Fitch, W. F. Mui and A. M. Valente for a "Marker For Communication Switching System," and No. 3,678,208, issued July 18, 1972 by J. W. Eddy for a "Marker Path Finding Arrangement Including Immediate Ring;" and also in U.S. Pat. applications Ser. No. 281,586 filed Aug. 17, 1972 by J. W. Eddy for an "Interlock Arrangement For A Communication Switching System," Ser. No. 311,606 filed Dec. 4, 1972 by J. W. Eddy and S. E. Puccini for a "Communication System Control Transfer Arrangement," Ser. No. 303,157 filed Nov. 2, 1972 by J. W. Eddy and S. E. Puccini for a "Communication Switching System Interlock Arrangement," hereinafter referred to as the MARKER patents and applications.

The communication register and the marker transceivers are described in U.S. Pat. application Ser. No. 320,412 filed Jan. 2, 1973 by J. J. Vrba and C. K. Buedel for a "Communication Switching System Transceiver Arrangement For Serial Transmission," hereinafter referred to as the "Communications Register" patent application.

The executive or operating system of the stored program processor is disclosed in U.S. Pat. application Ser. No. 347,281 filed Apr. 9, 1973 by C. A. Kalat, E. F. Wodka, A. W. Clay, and P. R. Harrington for "Stored Program Control In A Communication Switching System," hereinafter referred to as the "Executive" patent application.

The above system, register-sender, marker, communication register, executive and computer line processor patents and applications are incorporated herein and made a part hereof as though fully set forth.

BACKGROUND OF THE INVENTION

1. Field of the Invention

This invention relates generally to a telephone communication system, and more particularly to an arrangement for protecting the data stored in the drum memory associated with the central processor of such a system.

2. Description of the Prior Art

In rotating memory systems, (drums or disks) there is always the ever plaguing problem of the loss or destruction of data as an effect of another fault in the system, especially a failure in one of the power supplies. It seems that in most existing rotating memory systems, the loss of a power supply or the initialization of power to the system causes destruction of data on the recorded medium. The problems of special handling and time of reinitialization are then necessary to recover from the condition.

To describe the problem further, three phases of the machine must be defined:

1. Power initialization phase,
2. Power loss or hardware fault,
3. Power removal.

PHASE 1. Power Initialization Phase

When power is applied to a rotating memory system, the state of the machine must be controlled or defined through the entire process of power initialization until the hardware is stable so that no write or erase currents flow through the recording heads.

PHASE 2. Power Loss During A Write or Read Access

If any one of the power supplies is lost during a write access, the state of the machine must be quickly defined to a state which will prevent the destruction of data due to the power loss.

Power Loss During a Read Access

Power loss during a read access does not present as serious a problem as Phase 2 above. However, if the state of the machine is not quickly defined, stray logic states, due to power loss may cause write or erase currents to flow. Hardware Fault During a Write or Read Access In this phase, it is only possible to reduce the probability of data destruction because no matter how well the device is protected, a possible fault exists, such that the data can be destroyed.

PHASE 3. Power Removal Phase

When power is removed a relationship between power removal sequencing and the state of the machine must be defined until a point in time where write or read currents can no longer flow.

SUMMARY OF THE INVENTION

Accordingly it is an object of the present invention to improve the reliability of the drum memory system such that a power fault will not destroy the contents. It is a further object of this invention to provide an arrangement whereby the memory contents will be protected during the various abnormal operating conditions.

BRIEF DESCRIPTION OF THE DRAWINGS

The above-mentioned objects and other features of the invention and the manner of obtaining them will become more apparent, and the invention itself will be best understood by reference to the following description of an embodiment of the invention taken in conjunction with the accompanying drawings in which:

FIGS. 2 and 2A comprise a drum access circuit block diagram;

FIGS. 12 and 12A comprise an MLS flowchart for the drum memory system;

FIGS. 16 and 16A are an MLS decision table for the drum memory system;

FIG. 18 is block diagram of the memory ptotect circuit and the memory protection interface;

FIG. 19 is chart of the memory protect circuit timing;

DESCRIPTION OF THE PREFERRED EMBODIMENT

Figure 1:
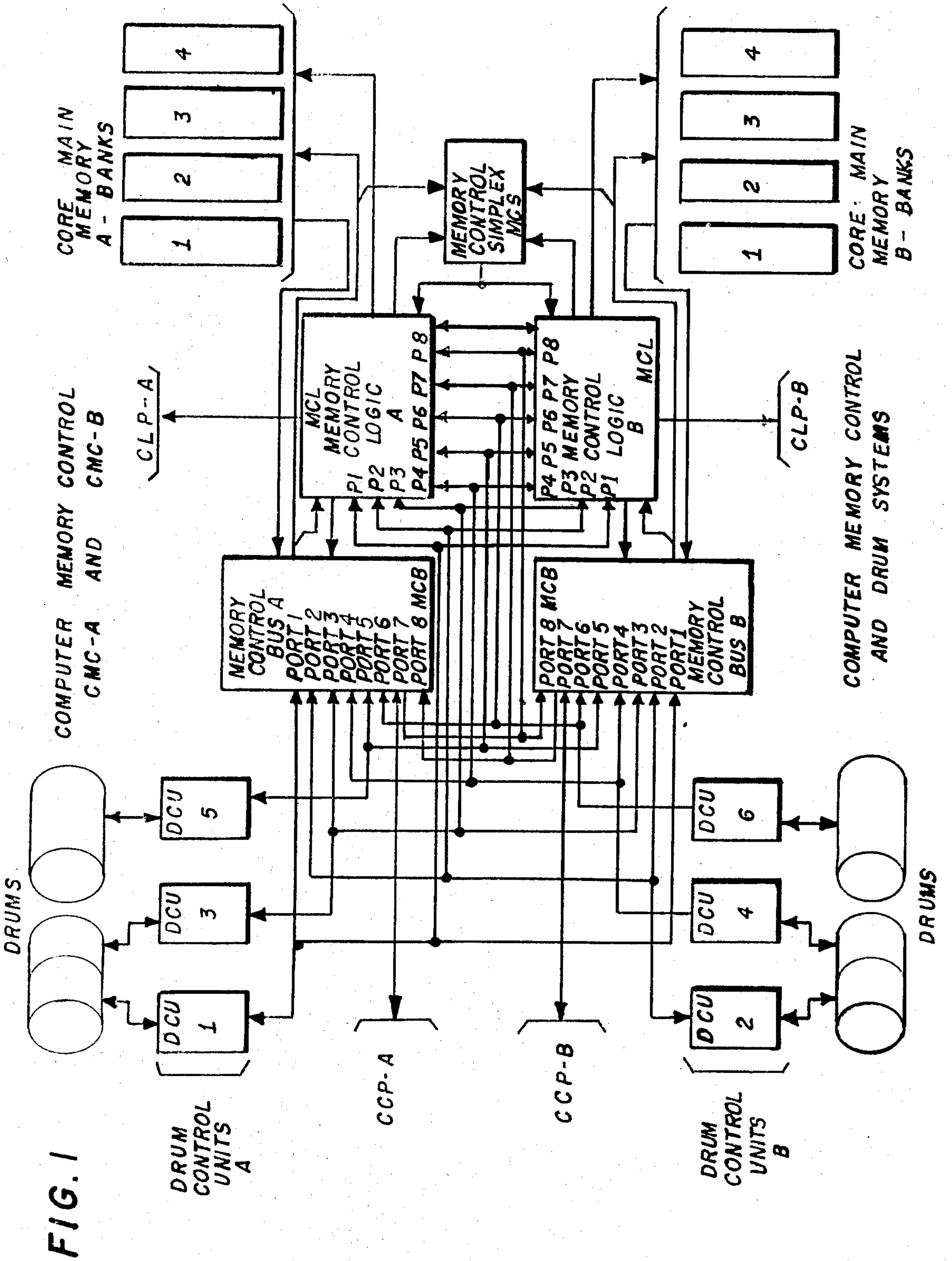
FIG. 1 is a block diagram of the computer memory control and drum systems.
Figure 3:
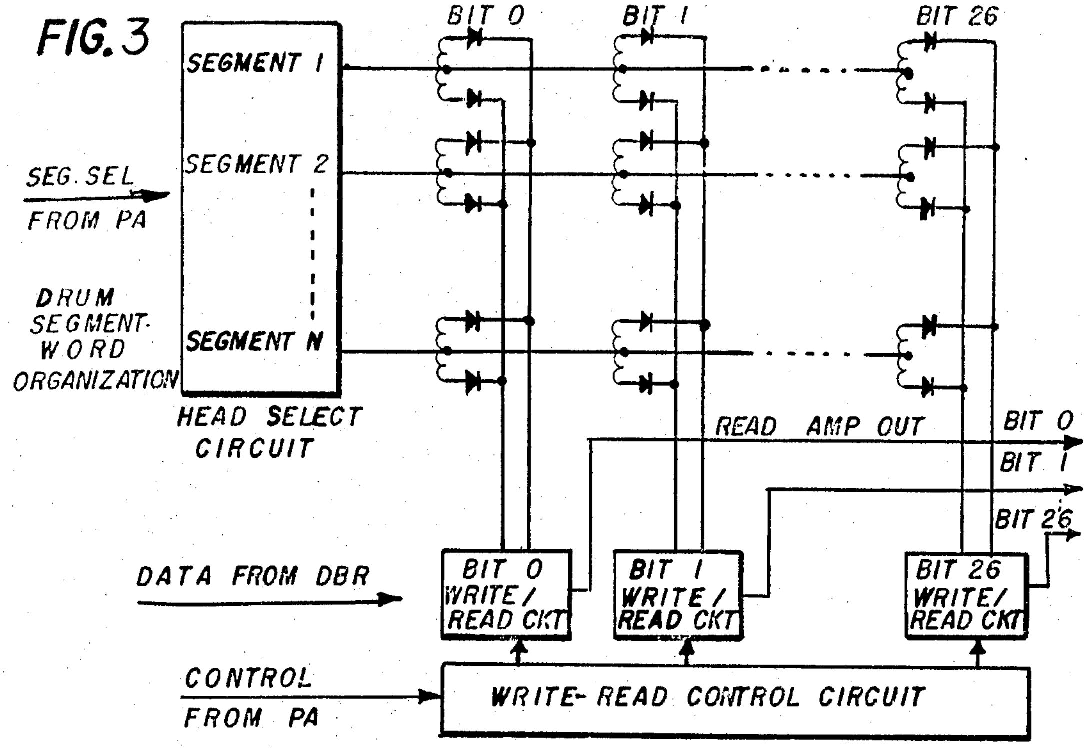
FIG. 3 is a diagram of a drum segment, word organization.

The solution to the data retention problem involves a number of circuits (logic, discreet component, and electromechanical) related in such a manner in an attempt to accomplish the objectives stated under the 3 phases above.

The complete technique will be discussed by:

1. presenting a functional description of each circuit entity (FIG. 1),
2. presenting and discussing the functional relationship of all these units within the system,
3. discussing how the system works under the conditions of the 3 phases defined above.

A. FUNCTIONAL DESCRIPTION OF EACH CIRCUIT (FIG. 18)

1. MEMORY PROTECT CIRCUIT

The basic patent application relates to the Memory Protect Circuit (MPC). This circuit has unique features, self contained, which may be used to accomplish memory protection.

In this application, however, the MPC is used in an environment of other circuits to accomplish a very high probability of memory protection.

The Memory Protect Circuit has the following features:

1. Provide a reset pulse to the Drum Memory System which is initiated when power is first turned on, in order to force the Drum Memory System (DMS) to its reset (a known and safe) state.
2. Provides inhibit levels to the write/read circuits of the DMS, while a number of input conditions are false or removed during operation.
3. Provides enabling levels when a number of input conditions are true (correct) and the system reset pulse was successful.

NOTE: These input conditions are the power supplies of the DMS, the drum speed, and the "no memory fault" indication.

4. The Memory Protect Circuit has its own built-in power supply detectors, set to detect at 5 percent lower than the system power supply monitors 5–10 percent total. 5 percent below the system monitors because these detectors are much faster than the system monitors, and, therefore, could respond to power distribution noise - an undesirable condition. Note that these detectors must be fast in order to provide the memory protection. That is, inhibit levels must be set very fast after a power supply (or other condition) failure or loss. These levels are set in less than 500 nanoseconds which will be discussed later.
5. The major feature of the MPC is the self contained (local) power supply of its own, which itself is powered by two independent sources - one from the supplies of the associated DMS and one from another DMS (second supply may be an inexpensive independent unit in other applications). In other words, the MPC does not solely depend on any of the power supplies being monitored by the MPC.
6. The MPC provides a 24 volt crowbar trigger pulse output. This crowbars the high voltage (recording) supply which causes memory loss when a malfunction occurs. Note: the crowbar is defined as the effect of providing a short across the output of the power supply. In other words, the voltage is clamped very close to zero volts in a short amount of time - around 5 – 10 microseconds.

2. HEAD SELECT CIRCUIT (HSC)

The HSC provides the 24 volt switching to the selected segment of drum recording heads. In the No. 1 EAX Drum Memory System, 26 heads are selected at once (1 segment) - about 2.5 amps.

3. THE WRITE/READ AMPLIFIERS (W/R A)

The W/R Amps are those circuits that record and read each one of the heads selected by the HSC above. Each W/R A corresponds to the bits of the data word.

To record, a specific segment is selected via HSC and the Write portion of the W/R Amps is energized.

To read, a specific segment is selected via HSC and the read portion of the W/R Amps is energized.

4. WRITE READ CONTROL (WRC)

This circuit provides the proper timing logic to record and read from drum. False timing detectors are included.

5. ONE OUT OF N

This circuit provides detection of none or more than one segment selected at one time.

6. POWER SEQUENCING CIRCUIT (PSC)

This circuit provides the turn-on and turn-off sequencing of power supplies. The No. 1 EAX contains 3 power supplies; the +5 volt logic supply, the −5 volt reverse bias of the Head Select Circuit, and the +24 write/read voltage. When power is turned on via the PSC, the −5 and +5 are applied first. Milliseconds later, after the logic and reverse bias is applied, the +24 volts is applied.

When power is turned off, the +24 volts is removed first, followed by removing the +5 and −5.

The PSC contains a Power Sequencing Turn Off (PSTO in FIG. 1) control which will be discussed in the next section on circuit functional interface.

B. CIRCUIT FUNCTIONAL INTERFACE

The interface relationship of the circuits in FIG. 1 is best understood by a discussion of these events:

1. Power turn on,
2. Power turn off,
3. System malfunction or power supply failure - similar to 2 above.

The timing relationship is shown in FIG. 19.

Before power is turned on, a number of conditions are detected at the input of the MPC. The drum must be at proper speed (DS) and the redundant 24 volt supply must on (V24R).

It is important to note that, at this time, even though the drum memory system does not have power, the MPC has power via the V24R. The main feature of the MPC is its own self contained local power supply. In other words, the +5 volt logic on the MPC is supplied by a local +5 volt supply derived from V24R or V24 (the 24 volts of this memory system).

Prior to turning power on in the particular memory system, +24 volts is supplied (V24R) to the MPC. In the case of No. 1 EAX, this is supplied from the drum pair. In the cases where there would be no drum pair, the special V24R could be the first power supply energized by a Power Sequencing Circuit. This V24R supply may be a low power small supply since its only use will be to supply current to the MPC local DC-DC converter on the board.

Refer to FIG. 19. Before all conditions are ready, the SEG ENABLE lead (see FIG. 1) is inhibiting segment selection (the 24 volts to the write cards is inhibited). Also the MPC WRITE INH lead is inhibiting the WRC card, providing further write (or destroy) protection.

Assume the next event of energizing the PSC. This sequences power to the Drum Memory System (−5, +5, then +24).

After the power supplies have been energized and the drum speed has reached its final value (3600 RPM), the MPC logic is enabled. The MPC INTERNAL CLOCK is enabled and begins (see FIG. 19).

The 2nd clock pulse and DECODE 1 cause SYSTEM RESET. The pulse is sent to all drum memory logic to reset and define all logic states. At this time recording levels are inhibiting.

On the 3rd clock pulse and DECODE 2 the SEG ENABLE level enables segment selection. At the same time, the MPC WRITE INH level also allows writing memory.

In summary, the system was powered-up, its state defined and circuits enabled - in that order.

Assume now that a T1 on FIG. 19, a fault occurs (in the drum speed, or power supply, or another condition if monitored). About 60 nanoseconds later, the condition is detected. The enable and inhibit levels are such that recording or spurious write levels are prevented. Also a 5$\mu$pulse to initiate the crowbar circuit which clamps the 24 volt power supply is generated. Note that these levels change in approximately 140 nanoseconds after the fault occurs. In other words, 140 nanoseconds of rotating memory may get destroyed. This represents no more than 1 address of data. In fact, (depending on drum speed) since this is such a small portion of one address, typically no data is lost.

FIG. 18 shows a number of other logic levels controlled by the basic protecting (or enabling) levels of the MPC. ACC CKT ERR and WRITE INH run around the system protecting memory at other vulnerable functions.

So far, the MPC protects memory for power turn-on, and the occurrence of certain faults. The MPC also provides protection when power is removed by an operation.

When the PSC "OFF" switch is depressed, the sequencing begins. +24 is removed first. But because a large decoupling capacitor is used to provide instantaneous high currents, (over 2000 $^{m}$fs) the decay of the 24 volts may take many seconds. If the +5 and −5 volts are removed while the +24 is decaying, the memory is again vulnerable because states are no longer defined. To prevent destruction, the PSTO signal from the PSC signals the MPC circuit as through a fault occurred. The same events then progress as described above for a fault. See T1 in FIG. 19.

MAIN MEMORY AND DRUM CONTROL 2.1 Main Memory 2.1.1 Introduction

The CMC (Computer Memory Control) can best be thought of as a bi-directional multiplex - distributor such that any of the units at the parts can transfer data to any memory bank in main memory and data from any memory bank can be transferred to any port on a one-transfer-at-a-time basis. FIG. 1 shows the maximum configuration of Drum Control Units, Central Processors and CMC's in a No. 1 EAX office. Smaller offices may have only two or four DCU's (Drum Control Units). DCU's are supplied in redundant pairs.

2.1.3 Operational Description

The CMC operates on a request acknowledge basis. If no requests are presented by the Drum Control Units or the Central Processor the CMC and the core memories are idle. The Central Processor is pre-selected as the Address Bus Source at the end of each memory request and remains pre-selected if no requests are presented to the CMC. This enables accelerated access to main memory by the CCP. If a DCU request is presented to CMC a 350 ns timer is started to allow selection of the port making the request and to allow the address to propagate to the bank selection circuitry and to the memory banks. At the end of the 350 ns delay if all main memories have finished their previous requests a Start Read command is issued to the main memory bank specified by the address bits supplied by the requesting port.

The memory bank will return a Memory Busy signal and after the word at the address specified has been read it will return a Data Available signal and the data read at the address. On a read request, a data available signal and the data, will be returned to the port within 1.0 microseconds after the request was received. On a read request, the CMC will send a Restore Control signal to the memory and the word read from memory will be written back in. On a write request at the end of the data available signal the CMC will send to the memory bank the data to be written into the location.

After the data is written into the data register of the memory it will return a Data Loaded signal to the CMC and the CMC will return a Data Loaded signal to a port having a write request. After the data word has been written into memory and another memory cycle can be initiated the Memory Busy signal will go false. The memory will also return an End of Cycle signal which is used for timing in the CMC.

The CMC has seven ports of which up to six DCU's and the CP will be connected. Simultaneous memory requests are resolved by a predetermined priority assignment to each port. Port 1 has the highest priority, port 2 has the next highest and so on to port 7. The Central Processor is assigned to port 7 due to the inability of the DCU's to wait for any extended period. Service of one memory request is always completed before another is started. The next request to be serviced is always the one of highest priority in the queue.

The port selection to determine which request will be answered can be made while the previous request is being completed.

Failure of a port to remove a read request or write request after it is answered will result in a Port Request TimeOut Error. Any error which occurs while a port is accessing the memory will cause the port to be locked out except for the CP, which is never lockout. Also a read request or write request must be removed before the next memory request from that port can be recognized.

The time required for the Data Available signal to be sent to a port after a read request is received varies from 0.8 microseconds to $(1.0+1.8N)$ microseconds where $N$ is the number of the port in the queue. The Data Loaded signal is sent to port $N$1.4 to $(1.6+1.8N)$ microseconds after the write request is received.

A word is read from the magnetic drum of the Drum Memory system once every 1.5 to 1.63 microseconds and since the words on the drum have an interlace of five this means that the maximum time the DCU can wait for a Data Loaded signal after a write request goes out is 7.5 microseconds. If four DCU's present read requests or write requests to the CMC at a time when the CMC is answering a memory request from the CP, then one of the DCU's may not have its request answered in the time necessary and its CORE ACCESS TROUBLE sense line to Computer Line Processor will go true. The DCU will remove its write or read request and if it does not receive a malfunction indication from the CMC a DCU TIME OUT interrupt will be generated 8 drum revolutions (approximately 136 milliseconds) after a request was first sent to the DCU.

When the CMC's are running in sync the port selections of the two CMC's must agree before a port can be selected. When a memory request appears a 350 ns delay, Delay 1, will be started to allow port selection to take place. At the end of Delay 1 a comparison will be made to see if the port selections agree. if another memory request was being answered when the memory request appeared, Delay 1 will not start until 150 ns after the fall of the Data Available signal from the first request.

If two ports presented read requests at the same time it would be possible for the two CMC's to select different ports. When at the end of Delay 1, the port selections did not agree, a second delay, Delay 2, of 150 nanoseconds would be started and at the end of it a retry at port selection can be made. After the third retry a port will be selected regardless of whether the port selections compare. If three retries have been made and the port selections do not agree an error interrupt will be generated and the PORT SELECT RETRY ERROR sense line will go to the one state. Any write operations will be aborted to a read operation and the Abort write sense line will become true. Each retry adds a maximum of 614 ns to the time required for port selection so that if three retries are made, the third DCU will receive a Data Loaded signal within 7042 ns which is within the 7500 ns maximum required to guarantee that the DCU does not encounter port blockage.

2.1.3 Status Indicators and Interrupts

Besides the data return leads the following outputs from the CMC are connected directly to the CP to indicate the status of the CP's read requests and write requests.

| LEAD DESCRIPTION | REMARKS AND TIMING |
|---|---|
| DATA AVAILABLE | Indicates that data is being read from main memory. Becomes true 0.8 to (1.0+1.8N) $\mu s$ after read request becomes true and remains true for as long as read request is true. |
| DATA LOADED | Indicates that data has been written into main memory. Becomes true 1.4 to (1.6+1.8N) s after write request becomes true and remains true for as long as write request is true. |
| PROGRAM ERROR | Indicates that the CP caused an Address Out of Range, attemppted Read Only Memory Write or Protected Location Write malfunction during |

–Continued

| LEAD DESCRIPTION | REMARKS AND TIMING |
|---|---|
| | main memory access. Becomes true 0.3 to (2.2+1.8N) μs after read request or write request becomes true. Reset by REI or CLR. Causes a CP level 2 trap. |
| COMPARE ERROR | Indicates that a mismatch was detected between the two CMC's. Causes a Computer Third Party trap. |

The only interrupts assigned to the CMC's are CMC 1 Error and CMC 2 Error in interrupt level 2 with octal sense line numbers 73002 and 73020 respectively. The following sense lines are assigned to the CMC's:

| OCTAL SENSE LINE NO. | SENSE LINE NAME | SENSE LINE DESCRIPTION |
|---|---|---|
| COMPUTER MEMORY CONTROL: GROUP 53 | | |
| 65001 | PAICEST 1 | Port Address In Compare Error Stored. The addresses supplied by the port are different in the two CMC's. |
| 65002 | PDICEST 1 | Port Data In Compare Error Stored. The Data words supplied by the port are different in the two CMC's |
| 65004 | PAIPEST 1 | Port Address in Parity Error Stored The address supplied by the Port has even parity |
| 65010 | PDIPEST 1 | Port Data In Parity Error Stored The data word supplied by the port has even parity |
| 65020 | PINVCIEST 1 | Port Invalid Control In Error Stored The port has made an invalid request for service. |
| 65040 | RTRYEST 1 | Retry Error Stored The CMC's have made 3 port select retries and the port selections still do not match. |
| 65100 | PTOEST 1 | Port Time Out Error Stored The port has not removed its read or write request after it was answered. |
| 65200 | CMC PROT SYSTEM ACT 1 | The memory protection system has not been disabled by the switch on the control panel |
| COMPUTER MEMORY CONTROL: GROUP 54 | | |
| 66001 | SYNCTOST 1 | Sync Time Out Stored The two CMC's have fallen more than 800 nanoseconds out of synchronization. |
| 66002 | MARCEST 1 | Memory Address Return Compared Error Stored The addresses returned from the memories associated with the two CMC's do not compare. |
| 66004 | MDRRCEST 1 | Memory Data Return Read Compare Error Stored The words read from the two memories do not compare |
| 66010 | MDRWCEST 1 | Memory Data Return Write Compare Error Stored The data words returned from the memories on the write portion of the cycle do not compare. |
| 66020 | MARPEST 1 | Memory Address Return Parity Error Stored The address returned by the memory has even parity. |
| 66040 | MDRWPEST 1 | Memory Data Return Write Parity Error Stored The data returned from memory on the write portion of the cycle has even parity. |
| 66100 | MINVCREST 1 | Memory Invalid Control Return Error Stored The control signals returned from memory are invalid. |
| 66200 | BSRCEST 1 | Bank Select Register Compare Error Stored The bank selections of the two CMC's do not agree. |
| COMPUTER MEMORY CONTROL: GROUP 55 | | |
| 67001 | BSMR[0] 1 | Bank Select Malf Reg. These leads indicate the bank which was selected when the first error occurred. |
| 67002 | BSMR[1] 1 | |
| 67004 | ABORT WRITE 1 | A core write transfer has been aborted to a READ/MODIFY/Write or core read operation. |
| 67010 | PCIMR[RR] 1 | Port Control in Malf Reg. These leads contain the state of the Port Control In leads when the first error occurred. |
| 67020 | PCIMR[WR] 1 | |
| 67040 | PCIMR[RMPB] 1 | |
| 67100 | PCIMR[PT] 1 | |
| 67200 | PCIMR[INIT] | |

—Continued

| OCTAL SENSE LINE NO. | SENSE LINE NAME | SENSE LINE DESCRIPTION |
|---|---|---|
| COMPUTER MEMORY CONTROL: GROUP 57 | | |
| 71001 | AOREST 1 | Address Out of Range Error Stored The address exceeds the range of memory used. |
| 71002 | ROMEST 1 | Read Only Memory Error Stored The port has tried to write into read only memory. |
| 71004 | CROSS WRITE ACTIVE FF SET | Cross Write configuration has been achieved. |
| 71010 | DTEST 1 | Drum Table Error Stored A DCU has tried to read or write outside of its initialization table while in the initialization sequence or write outside of its initialization table and outside of the block transfer area while it was not privileged. |
| 71020 | PSMR[0] 1 | Port Select Malf Reg. These leads carry the binary - encoded number of the port selected when the first error occurred. |
| 71040 | PSMR[1] 1 | |
| 71100 | PSMR[2] 1 | |
| 71200 | PSMR[3] 1 | |
| COMPUTER MEMORY CONTROL: GROUP 58 | | |
| 72001 | PMALFR[1] 1 | Port Malfunction Register An error has occurred while this port was selected. |
| 72002 | PMALFR[2] 1 | |
| 72004 | PMALFR[3] 1 | |
| 72010 | PMALFR[4] 1 | |
| 72020 | PMALFR[5] 1 | |
| 72040 | PMALFR[6] 1 | |
| 72100 | CCP PMALFR 1 | |
| 72200 | PMALFR[8] | |
| COMPUTER MEMORY CONTROL: GROUP 59 | | |
| 73001 | PC ROMEST 1 | Program Controlled Read Only Memory Error Stored. The CCP has tried to write into program controlled read only memory. |
| 73002 | CMC ERR ST 1 | The CMC has detected one of the errors listed here |
| 73004 | MDRRPEST 1 | Memory Data Return Read Parity Error Stored. The data word read from memory has even parity. |
| 73010 | PC ROMACT 1 | Program Controlled Read Only Memory Active Read only memory protection is in effect for the program controlled read only memory selection. |
| 73020 | PC ROMEST 2 | Same as 73001 |
| 73040 | CMC ERR ST 2 | Same as 73002 |
| 73100 | MDRRPEST 2 | Same as 73004 |
| 73200 | PC ROM ACT 2 | Same as 73010 |
| COMPUTER MEMORY CONTROL: GROUP 61 | | |
| 75001 | PAICEST 2 | |
| 75002 | PDICEST 2 | Similar to Group 53 |
| 75004 | PAIPEST 2 | |
| 75010 | PDIPEST 2 | |
| 75020 | PINVCIEST 2 | |
| 75040 | RTRYEST 2 | |
| 75100 | PTOEST 2 | |
| 75200 | CMC PROT SYST ACT 2 | |
| COMPUTER MEMORY CONTROL: GROUP 62 | | |
| 76001 | SYNCTOST | |
| 76002 | MARCEST 2 | Similar to Group 54 |
| 76004 | MDRRCEST 2 | |
| 76010 | MDRWCEST 2 | |
| 76020 | MARPEST 2 | |
| 76040 | MDRWPEST 2 | |
| 76100 | MINVCREST 2 | |
| 76200 | BSRCEST 2 | |
| COMPUTER MEMORY CONTROL: GROUP 63 | | |
| 77001 | BSMR[0] 2 | |
| 77002 | BSMR[1] 2 | Similar to Group 55 |
| 77004 | ABORT WRITE 2 | |
| 77010 | PCIMR [RR] | |
| 77020 | PCIMR[WR] 2 | |
| 77040 | PCIMR[RMPB] 2 | |
| 77100 | PCIMR[PT] 2 | |
| 77200 | PCIMR[INIT] 2 | |
| COMPUTER MEMORY CONTROL: GROUP 65 | | |
| 01401 | AOREST 2 | |
| 01402 | ROMEST 2 | Similar to Group 57 |
| 01404 | CROSS WRITE ACTIVE 2 | |
| 01410 | DTEST 2 | |
| 01420 | PSMR[0] 2 | |
| 01440 | PSMR[1] 2 | |
| 01500 | PSMR[2] 2 | |
| 01600 | PSMR[3] 2 | |
| COMPUTER MEMORY CONTROL: GROUP 66 | | |
| 02401 | PMALFR [1] 2 | |
| 02402 | PMALFR [2] 2 | Similar to Group 58 |

–Continued

COMPUTER MEMORY CONTROL: GROUP 66

| OCTAL SENSE LINE NO. | SENSE LINE NAME | SENSE LINE DESCRIPTION |
|---|---|---|
| 02404 | PMALFR [3] 2 | |
| 02410 | PMALFR [4] 2 | |
| 02402 | PMALFR [5] 2 | |
| 20440 | PMALFR [6] 2 | |
| 02500 | CCP PMALFR 2 | |
| 02600 | PMALFR [8] 2 | |

2.1.4 Data and Instruction Formats

Besides the data bus and address bus the following inputs are provided to the CMC from the CP.

| Input | Description |
|---|---|
| READ REQUEST | Becomes true to read main memory. |
| WRITE REQUEST | Becomes true to write into main memory. |
| SYSTEM MEMORY | MP STAT is alway true unless the Disable |
| PROTEST STATUS | Memory Protect Switch on the Maintenance Control Panel is operated. |
| RESET ERROR INDICATORS | REI becomes true during the execution of an REI instruction. |
| MASTER CLEAR | CLR is always false unless the computer test panel is plugged in and the MASTER CLEAR Push button is depressed or the THIRD PARTY CLEAR signal becomes true to clear a CCP. |
| CONTROL PULSE DIRECTIVE | Control Pulse Directive is a signal for CMC to interpret data bus bits 0 to 8. |
| CCP ON LINE | The CP is on-line. |

Control pulse directives from the CP are used to set or reset Maintenance registers in the CMC. Which register receives a pulse is determined by data bus bits 0 to 8 and the register is set if bit 0 is a one and reset if it is a zero. The registers which are set or reset by a control pulse directive and the various combinations of bits 0–8 on the data bus are given in the following list.

CMC Control Pulse Directive

| Data Bus Octal No. | Action | Description of Register |
|---|---|---|
| 000 | MCLTR {MB}-RST | Memory Control Logic Test Register {Memory Busy} MCLTR simulates a memory request from a port and the control signals returned from the memory to test CMC control logic. |
| 001 | MCLTR{MB}-SET | |
| 002 | MCLTR{DA} RST | MCLTR {Data Available} |
| 003 | MCLTR{DA} SET | |
| 004 | MCLTR{DL} RST | MCLTR {Data Loaded} |
| 005 | MCLTR{DL} SET | |
| 006 | MCLTR{EOC}RST | MCLTR {End of Cycle} |
| 007 | MCLTR{EOC}SET | |
| 010 | MCLTR{MREQ}RST | MCLTR {Memory Request} |
| 011 | MCLTR{MREQ}SET | |
| 012 | MMDBSOCR{1}RST | Maintenance Memory Data Bus Source Control Register By setting MMDBSOCR{1} {2} {3} the test points previously listed will be connected to the data bus if the CP is off-line |
| 013 | MMDBSOCR{1}SET | |
| 014 | MMDBSOCR{2}RST | |
| 015 | MMDBSOCR{2}SET | |
| 016 | MMDBSOCR{3}RST | |
| 017 | MMDBSOCR{3}SET | |
| 020 | PENTR{1} RST | Port Enable Test Register {1–6} |
| 021 | PENTR{1} SET | |
| 022 | PENTR{2} RST | PENTR enables the CMC to answer a memory memory request from an off-line port if the CP is off-line |
| 023 | PENTR{2} SET | |
| 024 | PENTR{3} RST | |
| 025 | PENTR{3} SET | |
| 026 | PENTR{4} RST | |
| 027 | PENTR{4} SET | |
| 030 | PENTR{5} RST | |
| 031 | PENTR{5} SET | |
| 032 | PENTR{6} RST | |
| 033 | PENTR{6} SET | |

Continued

| CMC Control Pulse Directive Data Bus Octal No. | Action | Description of Register |
|---|---|---|
| 034 | POLR{1} RST | Port On Line Register {1–6} POLR controls the on-line status of the six DCU's attached to ports 1 to 6. The POLR's of a DCU must be reset in both CMC's before an off-line indication is given to that DCU. POLR is also reset by the MASTER CLEAR button on the computer test panel. |
| 035 | POLR{1} SET | |
| 036 | POLR{2} RST | |
| 037 | POLR{2} SET | |
| 040 | POLR{3} RST | |
| 041 | POLR{3} SET | |
| 042 | POLR{4} RST | |
| 043 | POLR{4} SET | |
| 044 | POLR{5} RST | |
| 045 | POLR{5} SET | |
| 046 | POLR{6} RST | |
| 047 | POLR{6} SET | |
| 050 | INPUT TEST REG {1} RST | Input Test Register {1–6} |
| 051 | INPUT TEST REG {1} SET | |
| 052 | INPUT TEST REG {2} RST | used to test the signal paths from the DCU's to the CMC's |
| 053 | INPUT TEST REG {2} SET | When an input test register is set all the inputs to the CMC's from that DCU should be true. |
| 054 | INPUT TEST REG {3} RST | |
| 055 | INPUT TEST REG {3} SET | |
| 056 | INPUT TEST REG {4} RST | |
| 057 | INPUT TEST REG {4} SET | |
| 060 | INPUT TEST REG {5} RST | |
| 061 | INPUT TEST REG {5} SET | |
| 062 | INPUT TEST REG {6} RST | |
| 063 | INPUT TEST REG {6} SET | |
| 064 | MCLTR{LCH-MDB}RST | Memory Control |
| 065 | MCLTR{LCH-MDB}SET | Logic Test Register {Latch Memory Data Bus} If the CP is off-line setting MCLTR {LCH-MDB} latches the data bus so that a one applied to the data bus remains on the data bus after the input is removed. |
| 066 | PC ROM ACT-RST | Program Controlled |
| 067 | PC ROM ACT-SET | Read Only Memory Active. Setting this register enables the program controlled read only memory protection. |
| 076 | CROSS WRITE-RST | Cross write enables an on-line CCP to write into its own memory and the duplex memory which must be off line. |
| 077 | CROSS WRITE-SET | |

2.1.5 Configuration

The configuration of ports enables to access main memory is software controlled. Two registers are provided in the CMC for control of the ports. One bit in each register is assigned to each port. For a DCU to access an 'On Line' main memory, i.e., CCP ON LINE signal from CCP to CMC true, its associated bit in the Port On Line Register (POLR 1-6) must be true. For the port to access an Off Line main memory (the CCP ON LINE signal from CCP to CMC false) its associated bit in the Port Enable Test Register (PENTR 1-6) must be true. Bits of the POLR and PENTR are individually set by CPD instructions. Bits of the POLR and PENTR are individually reset by CPD instructions and both registers are reset to all zeros by CLEAR. The status of the POLR and PENTR are available for interrogation on Maintenance Memory Data Bus Source word 3.

The status of Port 7 and Port 8 is under control of the Cross Write feature

2.1.6 Maintenance Features

2.1.6.1 Error Detection

A list of errors detected by the CMC and their description appears under CMC sense lines. Certain of these errors cause the CMC to take immediate action. All errors will cause the following actions. The port which was accessing main memory will be blocked from any further access until RET or CLEAR is received from the CCP. The CCP (PORT 7) is only blocked if it does not remove its memory request after the request is answered. Other errors do not block Port 7.

The Port Selected Malfunction Register (PSMR) is set indicating via sense line which port was accessing memory when the error occurred. The Bank Selected Malfunction Register (BSMR) set indicating via sense line which bank of main memory was selected when the error occurred. The Error Stored Flop and Disable Error Load Flop (ESF and DERLF) are set. DERLF will prevent any subsequent errors from changing the value of PSMR or BSMR and will prevent any subsequent errors from changing the error indicators to the CLP. DERLF will cause subsequent errors to be ignored by the CLP until the first error is reset by REI or CLEAR from CCP.

If DERLF (disable error load flop) is set, a THIRD PARTY TRAP can be caused by Synchronism Time Out (SYNCTOF) only, and an ERROR TRAP can be generated.

In addition to the above any error will cause its associated sense line to become true if DERLF was not previously set and to remain true until REI or CLEAR is issued to CMC by CCP.

The following errors will cause an Error Trap if they occur while the CCP is accessing main memory:
Read Only Memory Error (Switch protected)
Address Out of Range Error
Program Controlled Read Only Memory Error (25th bit protected words).

The following errors will cause a Third Party Party Trap when both CCP's are On Line only:
Bank Selection Comparison Error
Memory Address Returned Comparison Error
Memory Data Returned Read Comparison Error
Memory Data Returned Write Comparison Error
Port Address In Comparison Error
Port Data in Comparison Error
Retry Error (Port selection does not compare after three retries)
Synchronism Time Out Error A Third Party Trap is not generated by a miscomparison during Cross Write. The associated sense line to CLP does become true.

To protect the integrity of information in memory the following errors will generate a Restore Control Signal to Main Memory and thus abort a write operation. If these errors occur during a write operation a sense line to CLP, Abort Write, will become true:
Read Only Memory Error (Switch Protected)
Port Invalid Control in Error
Bank Select Comparison Error
Port Address In Compare Error
Port Address in Parity Error
Address Out of Range Error
Retry Error
Drum Table Error
Software Protected Read Only Memory Error.

2.1.6.2 Program Controlled Read Only Memory

A set-reset latch in CMC is provided to activate 25th bit read only memory protection. (See section Software Protected Read Only Memory for the operational description of this latch.)

2.6.3 Maintenance Data Bus Source

The status of internal points in the CMC may be interrogated by returning these points to the CCP on the Data Bus. When a CCP is OFF LINE it is connected as a sink to the CMC Data Bus. (This is also true during Cross Write).

By execution of the associated CPD instruction in the ON LINE CCP the following three words describing the status of control points may be placed on the Data Bus of the off line CMC and thus onto the Data Bus of the off line CCP.

MMDBSOCR 1

| Data Bus Bits | Test Point | Description |
|---|---|---|
| 0–17 | MAB (0–17) | MEMORY ADDRESS BUS(0–17) The address bus of the CMC may be the address in from port or the address returned for the last Memory Bank accessed. |
| 18–23 | POLR (1–6) | PORT ON LINE REGISTER (1–6) The on-line status of the DCU's. |
| 24 | DATA BUS (0–25) EVEN PARITY | causes MMDBSOCR 1 to be sent to CCP with odd parity |
| 25 | EG | Logic '0' |

MMDBSOCR 2

| Data Bus Bits | Test Point | Description |
|---|---|---|
| 0 | EG | Logic '0' |
| 1 | ROMF | READ ONLY MEMORY FLIP-FLOP The last Address in accessed Switch Protected Read Only Memory |
| 2 | DIITF | DRUM IN ITS INITIALIZATION TABLE FLIP-FLOP The last request was from a DCU for a word in its initialization table. |
| 3 | DOBTAF | DRUM OUTSIDE BLOCK TRANSFER AREA FLIP FLOP The last request was from a DCU which accessed a location outside of the Non-Resident area. |
| 4 | PCIR RMPB | PORT CONTROL IN REGISTER RETAIN MEMORY PROTECT BIT The last request was from CCP and Software Read Only Memory Protection was in effect. |
| 5 | PCIMR RMPB | PORT CONTROL IN MALFUNCTION REGISTER RETAIN MEMORY PROTECT BIT Same as above when an error occurred. |
| 6 | MARGIN SW OFF NOR | MARGIN SWITCH OFF NORMAL One of the Power Supply Level switches on one of the Main Memories is operated to the 'high' or 'low' position. |
| 7 | MDRREPF | MEMORY DATA RETURNED READ EVEN PARITY FLIP FLOP Even parity on the word returned from Main Memory during a read cycle. |
| 8 | MDIEPF | MEMORY DATA IN EVEN PARITY FLIP FLOP Even Parity on the word supplied by the port during a write cycle. |
| 9 | MDRWEPF | MEMORY DATA RETURN WRITE EVEN PARITY FLIP FLOP Even parity on the word returned |

Continued

| MMDBSOCR 1 Data Bus Bits | Test Point | Description |
|---|---|---|
| | | from Main Memory during a write cycle (will also become ture if MDRREPF is true) |
| 10 | DERLF | DISABLE ERROR LOAD FLIP FLOP No further errors will be stored until REI or CLEAR is issued by CCP. |
| 11 | RTRY3F | RETRY 3 FLIP FLOP 3 attempts have been made at port selection and port selection does not compare. |
| 12 | MDF 25 F | MEMORY DATA BIT 25 STORED The status of bit 25 in the last core location accessed. |
| 13 | −PH0 | PHASE 0 (inverted) A CMC internal timing pulse occurring while CMC is idle. |
| 14 | −PH1 | PHASE 1 (inverted) A CMC internal timing pulse occurring where a memory request is received and before a Start Read is issued to Main Memory. |
| 15 | PH2 | PHASE 2 A CMC internal timing pulse occurring while Start Read to Main Memory is true. |
| 16 | PH3 | PHASE 3 A CMC internal timing pulse occurring after Start Read to Main Memory is issued and before Data Available is returned. |
| 17 | PH4 | PHASE 4 A CMC internal timing pulse occurring while Data Available returned from Main Memory is true. |
| 18 | −PH5 | PHASE 5 (inverted) A CMC internal timing pulse occurring during a 150 ns monopulser which is triggered at the falling edge of the Data Available signal returned from Main Memory. |
| 19 | −PH6 | PHASE 6 (inverted) A CMC internal timing pulse occurring from the end of Phase 5 until the Data Loaded signal is returned from Main Memory |
| 20 | PH7 | PHASE 7 A CMC internal timing pulse occurring while the Data Loaded signal is returned from Main Memory. |
| 21 | −PH8 | PHASE 8 (inverted) A CMC internal timing pulse occurring from the fall of the Data Loaded signal until the End of Cycle signal returned from main memory. |
| 22 | −PH3 & PH4 | PHASE 3 or PHASE 4 (inverted) |
| 23 | −PH5 & PH6 | PHASE 5 or PHASE 6 (inverted) |
| 24 | Data Bus (0–25) Even Parity | Causes MMDBSOCR (2) to be returned to CCP with odd parity |
| 25 | EG | LOGIC '0' |
| MMDBSOCR 3 | | |
| 0 | PCIR RR | PORT CONTROL IN REGISTER READ REQUEST The last memory request presented by a port was a read request. |
| 1 | PCIR WR | PORT CONTROL IN REGISTER WRITE REQUEST The last memory request presented by a port was a write request. |
| 2 | PCIR PT | PORT CONTROL IN REGISTER PRIVILEGED TRANSFER a) The last request was from a DCU which was allowed to access a location outside of its initialization table and outside of the block transfer area, because the Privileged Transfer lead from that DCU was true at the time of the request. b) The last request was from the CCP and Program Controlled read only memory protection was disabled. |
| 3 | PCIR INIT | PORT CONTROL IN REGISTER IN INITIALIZATION TABLE The DCU INIT lead from the last DCU to make a memory request was true indicating that the DCU was attempting to access its initialization table. |
| 4 | START READ (11, 12) | The START READ command to Main Memory Bank one from CMC (inverted) |
| 5 | START READ | The START READ command to Main |

Continued

| MMDBSOCR 1 Data Bus Bits | Test Point | Description |
|---|---|---|
| | (21, 22) | Memory Bank two from CMC (inverted) |
| 6 | START READ (31, 32) | The START READ command to Main Memory Bank three from CMC (inverted) |
| 7 | START READ (41, 42) | The START READ command to Main Memory Bank four from CMC (inverted) |
| 8–13 | PENTR (1–6) | PORT ENABLE TEST REGISTER (1–6) The associated port is enabled to access CMC when the CCP is off line. |
| 14 | ACKR 1 +ACKR 2 + ACKR 3 | ACKNOWLEDGE REGISTER 1 or 2 or 3. A Data Available signal has been returned to a port and that port's memory request remains true. |
| 15 | ACKR 4 + ACKR 5 + ACKR 6 | ACKNOWLEDGE REGISTER 4 or 5 or 6. |
| 16 | ACKR 7 + ACKR 8 + ACKR 9 | ACKNOWLEDGE REGISTER 7 or 8 9 |
| 17 | MAR EPF | MEMORY ADDRESS RETURNED EVEN PARITY FLIP FLOP The address stored in the address return buffer register has even parity. |
| 18 | AORF | ADDRESS OUT OF RANGE FLIP FLOP The address supplied with the memory request was for a location outside of the available core. |
| 19 | PAIEPF | PORT ADDRESS IN EVEN PARITY FLIP FLOP The address supplied with a memory request had even parity |
| 20 | PAICF | PORT ADDRESS IN COMPARISON FLIP FLOP The address supplied by a port to both CMC's while running in synchronism did not compare. |
| 21 | MEM ADD RTRN COMPARE FLOP | MEMORY ADDRESS RETURN COMPARISON FLIP FLOP The address stored in the address return buffer registers of Main Memory attached to CMC-A and that attached to CMC-B did not compare. |
| 22 | PAI 17 | PORT ADDRESS IN BIT 17 FLIP FLOP Indicates the parity bit of the address supplied with the last memory request. |
| 23 | RESTORE CONTROL | RESTORE CONTROL signal instructing Main Memory to change from a R/M/W to a R/M/W cycle. |
| 24 | DATA-BUS 0–25 EVEN PARITY | CAUSES MMDBSOCR 3 to be sent to CCP with odd parity. |
| 25 | EG | LOGIC '0' |

2.1.6.4 Memory Control Logic Test Register

An OFF LINE CMC may be stepped through a simulated memory cycle by executing CPD instructions in the ON LINE CCP. In this manner the ON LINE CCP may simulate:

1. A Memory Request via the MCLTR MREQ set CPD
2. Memory Busy signal from Main Memory via the MCLTR MB set CPD
3. Data Available signal, MCLTR DA
4. Data Loaded signal, MCLTR DL
5. End of Cycle signal, MCLTR EOC If the proper sequence of set and reset CPD's are executed the CMC will simulate a complete memory cycle. Note that the CMC under test must be OFF LINE and the other CCP which executes the test must be ON LINE.

2.1.6.5 Input Test Register

A bit set 'true' in the Input TEST REGISTER, INPTR 1–6 will cause the inputs from the associated DCU to CMC to become true. This does not include the eight DCU sense lines which are passed through CMC.

INPTR 1–6 are set and reset in CMC by CPD instructions executed in the CCP associated with that CMC. All bits of INPTR are reset by CLEAR.

2.1.6.6 Cross Write

A maintenance feature is incorporated into the CMC's which enables an on line CCP to refresh an off line core main memory directly from the on line copy of main memory. Once the CMC's are in the Cross Write Active configuration one CCP may independently refresh all locations in main memory by merely repeating a two instruction loop; LOAD A, STORE A. Note that all memory protection features remain in effect in the on-line CMC during a cross write operation. During cross write Program Controlled Read Only Memory protection is disabled in the off-line CMC. Thus the on line CCP will write over 25th bit protected words in the off line memory.

Cross Write may only be employed by an on-line CCP and the memory being refreshed must have its associated CCP off line. If both CCP's become either on line or the configuration is reversed by the Third Party, Cross Write Configuration is immediately lost and must be entirely reinitiated. If both CCP's become off-line Cross Write remains Active.

During Cross Write, the DCU's may be active when Cross Write is initiated and during cross write. Since the DCU's can access the on line, main memory it is necessary to also allow them access to the off-line memory. This insures that the off-line memory is updated by any DCU to main memory transfer which occurs during a cross write.

The duplex CMC's are configured to Cross Write Active state by means of master-slave storage elements. The master is loaded at the time the on-line CCP issues the SET CROSS WRITE CPD.

The slave is not set until both CMC's become idle. Note that setting CROSS WRITE ACTIVE requires a re-synchronization of the CMC's. If three DCU's request access to the on line main memory at the time CCP tries to set Cross Write a worse case maximum of 7.0 μsec. could elapse between the SET CROSS WRITE CPD and the achievement of Cross Write Active configuration. A sense line is provided indicating CROSS WRITE ACTIVE.

Once Cross Write Active configuration is achieved the on line CCP is enabled by the Cross Write Active Flop to access the off line CMC through Port 8 (Port 8 is connected to Port 7 of the duplex CMC unit via backplane wiring). In the off line CMC Port 7 is blocked to insure that the off line CCP can not interfere with actions of the on line CCP. CPD instructions from the off line CCP are allowed access to the off line CMC during Cross Write. To insure that both CMC's will be available for transfers during Cross Write Active the CMC's are run in synchronism. Because they are in sync the following comparisons are made:

i. Port Address in
ii. Port Data in
iii. Memory Address returned
iv. Synchronism Time Out
v. Bank selection Comparison
vi. Port selection Retry Error The memory data returned is not compared as it is not expected to compare during Cross Write. The above mismatches are available on sense lines for interrogation. The CMC MISMATCH signal however is DISABLED during cross write as this signal is used to generate a THIRD PARTY trap.

Data and control signals are returned to the CCP from the on-line main memory (via CMC) only during CROSS WRITE. DATA LOADED is returned to the on-line CCP by the on-line CMC only after DL is returned to the CMC by BOTH memories. Control signals are returned to the DCU's from both CMC's but DATA is returned to the DCU's only from the on-line CMC.

All error detection circuitry in both CMC's with the exception of Memory DATA (READ and WRITE) RETURNED COMPARISON ERROR remains active during CROSS WRITE.

Two means of exit (other than system master CLEAR) from cross write are available:

1. Execution of RESET CROSS WRITE CPD. In this case the same sequence of events occurs as does when entering cross write. The CROSS WRITE ACTIVE (SLAVE) latch is not reset until both CMC's are idle. When Cross Write Active Flop becomes reset the DCU's will not have access to the off line CMC unless their associated PENTR's are set.
2. Bring the off-line CCP back on line. This causes immediate resetting of Cross Write Active Flop. The DCU's will now be enabled to both CMC's by the CCP ON LINE signal if their associated POLR's are set.

In summary the steps required to enter CROSS WRITE ACTIVE configuration are:

1. One CCP must be on-line, one CCP must be off-line.
2. The Port On Line Register (POLR 1–6) of the off-line CMC must be equal to the POLR of the on-line CMC.
3. Issue SET CROSS WRITE CPD to the on-line CMC by execution of the associated CPD instruction in the on-line CCP.
4. Sense for CROSS WRITE ACTIVE sense line true.
5. When CROSS WRITE ACTIVE sense line is true begin reading the on-line core main memory and writing both memories with the STA, STQ, etc. instruction executed in the on-line CCP only.

To exit from Cross Write

1. System Clear in the off-line CCP. Subsequent DCU transfers will not effect the off-line CMM.
2. Issue Reset Cross Write CPD and sense for Cross Write Active sense line false. DCU transfers will now be lost unless the Port Enable Test Register (PENTR 1–6) in the off-line CMC is equal to the POLR of the on-line CMC.
3. Bring the off-line CCP back on-line. No DCU transfers will be lost as long as the POLR in the off-line CMC has been left set.

DRUM MEMORY

2.2.1 INTRODUCTION

Drum memory is used as storage area for the programs and data that do not require "immediate" access by the central processor. Drum Memory information is readout of and written into main memory under control of a Drum Control Unit (DCU) via the Computer Memory Control (CMC) circuit. Each DCU is assigned a specific port, in the CMC. These ports are numbered 1 thru 6 and are assigned a priority. Port 1 having a higher priority than port 2 and so on down to port 6 with the lowest priority of DCU's. The central Processor has port 7 assigned to it and attains the least priority. Each DCU can control an entire drum of 18 segments or one half a drum (9 segments). Thus a maximum of six drums could be handled. Each drum segment contains 10,999 words of 27 bits each.

The writing into and reading out of drum must be accomplished when the Drum is ready. Failure to do so will create an error. A word can be read out of, or written into memory every 1.6 microseconds. If more than one Drum, or a Drum and the CCP wished to access memory, transactions in the Drum area would be lost, or the CCP would not get a chance to access memory. In order to avoid this the drums are handled at an interlace rate of 5. This means that successive Drum locations to be read or written into are actually spaced every 5 locations. Thus when a drum reads from memory, it will not be ready to read again until 8 microseconds later. Thus one Drum will not hog memory. With this interlace, 3 Drums and a CCP can be running simultaneously without losing drum and yet allowing the processor to access memory at least once for every three separate Drum transactions. If a fourth Drum is accessed, the CCP may get locked out for a longer length of time or conceivably until one of the drums stops processing. As a Fifth Drum is added the possibility of locking out the CCP becomes more prevalent. The loss of transactions on a drum are also possible. Simultaneous use of a sixth drum exaggerates the problem.

2.2.2 OPERATIONAL DESCRIPTION (HARDWARE)

2.2.2.1 MODES OF PROCESSING

There are three basic modes of processing the Drum Memory System (DMS). Initialization, search and transfer, and termination.

2.2.2.1.1 INITIALIZATION

Initialization involves loading the various registers in the DMS from the initialization table located in main core memory.

2.2.2.1.1.1

The even numbered locations (0–16) of the initialization table are loaded by the Central Processor's running program. All information necessary for a Drum Control Unit (DCU) to fulfill an assigned task is present in these nine locations.

2.2.2.1.1.2

The odd numbered locations are used by the DCU, to write into them, the data contained in the proceeding even numbered locations, so that a check can be made, that the information in those locations are correct.

2.2.2.1.1.3

Location 18 thru 24 will contain other data that will be explained further on in the article.

2.2.2.1.1.4

Initialization is accomplished by the issuance of a CPD instruction from the CCP to a selected DCU.

2.2.2.1.2 SEARCH AND TRANSFER

Two methods of search are available. Single Level Counter Start (SLCS) or associative search. The SLCS mode of operation is used in transferring program and tables between core memory and drum. Large blocks of data may be transferred, the limit being defined by the Limit Register (LR). Blocks of 2048 words are reserved in core as SLCS (block transfer) areas.

A search is made in the DAC for address coincidence. The address in the Drum Address Register (DAR) of the DAC is compared with the binary or BCD counter. When match is found, the words are transferred on interlace until the number of words defined by the contents of the LR are read (from core or drum).

Associative Search

The associative search module of the DCU is a read drum write core data transfer sequence, where the data is located by searching for data coincidence between the drum data and the specified search register (SR). There is an associated mask register (MR) that specifies which of the SR bits are to be involved in the associative coincidence. There are two associative search sequences, single and multilevel. Associative Search (MLS) can perform one to three levels of search and read.

2.2.2.1.3 Termination

After the required number of words have been transferred, the termination cycle is entered. This cycle dumps the contents of the Core Address Register (CAR) of the DCU into the initialization table of core. This information aids the program in accessing retrieved data. Following this, the DCU interrupts the CCP with a DCU Ready Interrupt indicating the process is complete.

2.2.2.2 HARDWARE DESCRIPTION

The following section will present the Drum, the Drum Access Circuits (DAC) and the Drum Control Unit (DCU) from a hardware point of view.

2.2.2.2.1 Drum Characteristics

The magnetic drum used in the EAX system is a Bryant Computer Products Model 10512. It operates at 3600 rpm and has a hard plated nickel-cobalt surface. The drum comes equipped with 504 data recording heads and six clock track recording heads.

2.2.2.2.1.1 Storage Characteristics

The drum is divided into 18 segments. Each segment contains 27 active recording heads and one spare recording head. There are 10,999 locations around the peripheral of the drum, thus, each segment is capable of recording 10,999, 27 bit parallel words. The total storage per drum is then 18 × 10,999 or 197,982 words.

Depending upon the system application, the drum can be arranged in one of two configurations. One configuration treats the drum as a single storage area of 18 segments. The other divides the drum into two independent storage areas of nine segments each. The two areas can be accessed simultaneously without electrical interaction. Each drum unit, whether nine or 18 segments, will have three sets of clock tracks. Each set consists of two tracks; one has a single bit recorded at drum location 0 and the other is a continuous closed track with a bit recorded at every drum location.

There is one master set and two auxiliary sets for each drum unit. The auxiliary tracks provide redundant clock sources for the Drum memory System. One set will be active and the other will be on standby. The master tracks provide backup for re-recording auxiliary tracks.

The drum is equipped with Bryant AH-020 recording heads. A modified return-to-bias recording method is used at a recording frequency of 660 KHz (350 bits per inch). The write current pulse width is 400 nsec. and the pulse amplitude is 80 ma. For reading, a playback voltage of 60 mv is obtained across a 1K ohm read amplifier input.

2.2.2.2.1.2 Power Distribution and Control

The distribution and control of power to the Drum Memory System refers to the circuits and equipment necessary to run the drum motor and apply the D-C voltages to the Drum Memory System circuit.

2.2.2.2.1.2.1 Drum Motor Power

The drum motor operates on 117 volts, 60 Hz A-C. The motor starts on commercial power and after a preset time delay, a DC-AC inverter is switched in to provide motor power. If the inverter output fails, the motor will be switched back to commercial power with no other discontinuities in the system. The failure will cause an alarm signal to be sent to the Maintenance Control Center (MCC) and a lamp to come on at the A-C power control panel of the DMS.

The starting current requirements of the motor are about 3 times the run current requirements, e.g., the measured start and run currents for the Bryant drum are 15 and 5 amps respectively. A special circuit, the Drum Motor Start Circuit, is used to provide a high starting current and yet permit the use of a smaller, more economical and more reliable inverter. Basically, the circuit holds start capacitors in the motor power circuit until the motor has been on for a few minutes, at which time it switches the capacitors out. A short time after the capacitors have been switched out, the power source will be switched from the commercial line to the DC-AC inverter.

A thermal overload switch which is preadjusted by the manufacturer for maximum allowable internal temperature of the drum, is supplied with the drum. When a thermal overload occurs, power is removed from the drum, an alarm signal is sent to the MCC and a lamp at the A-C power control panel of the DMS provides a local indication of the thermal overload condition.

2.2.2.2.1.2.2 D-C Power Sequencing

Three D-C supply voltage levels are used in the Drum Access Circuits (DAC). These are the −5V off-bias voltage, the +5V logic voltage, and the +24V write/-read voltage. In order to protect the information on the drum, the sequence of power application and removal must be defined. The Power Sequencing Circuit provides this function automatically when −50V is applied to the circuit by depressing the D-C power sequencing switch on the D-C control panel of the DMS. The sequence of application is −5V and +5V together and then +24V. In removing power, the opposite sequence must be used, i.e., +24V is removed first, then +5V and −5V. The DCU has a separate supply which is not sequenced with the DAC supplies.

2.2.2.2.1.2.3 Power Supply Monitor

The output of each power supply in the DMS is connected to an inlet of a voltage monitor. There is one voltage monitor per DMS frame. Whenever the output voltage of a power supply drifts beyond a predetermined allowable tolerance, the voltage monitor board indicates which supply is in trouble, and an alarm signal will be sent to the MCC indicating that the DMS subsystem has power supply trouble.

2.2.2.2.1.3 DMS Power Panel

The power panel is mounted on the DMS frame and is equipped as follows.

1. A-C Power
   1. Lighted POWER-ON Switch
   2. Lighted POWER-OFF Switch
   3. Inverter Failure lamp
   4. Thermal overload lamp
   5. Lamp check pushbutton
2. DC Power
   1. D-C power sequencing lighted switch
   2. +24 volt lighted switch
   3. Lamp check pushbutton 2.2.2.2.2 Drum Access Circuits (DAC)

FIGS. 2 and 2A illustrate the three major sections of the DAC. They are the Recording Circuits, the Clock Circuits and the Peripheral Adapter (PA). The recording circuits are those circuits including their drivers, monitors and protect circuits which communicate directly with the magnetic drum. The clock circuits provide clock pulses for referencing drum locations and for timing logical functions in the DAC and DCU. The PA contains the storage and control circuits necessary for interfacing the DCU and the recording circuits.

2.2.2.2.2.1 Recording Circuits

The functional blocks of the recording circuits are shown in FIG. 2A. These include the Write/Read Circuits; the Head Select Circuit; the Write/Read Control Circuit; the Head Select Monitor Circuit; and the Memory Protect Circuit.

2.2.2.2.2.1.1 Write/Read and Select Circuits

Figure 20:
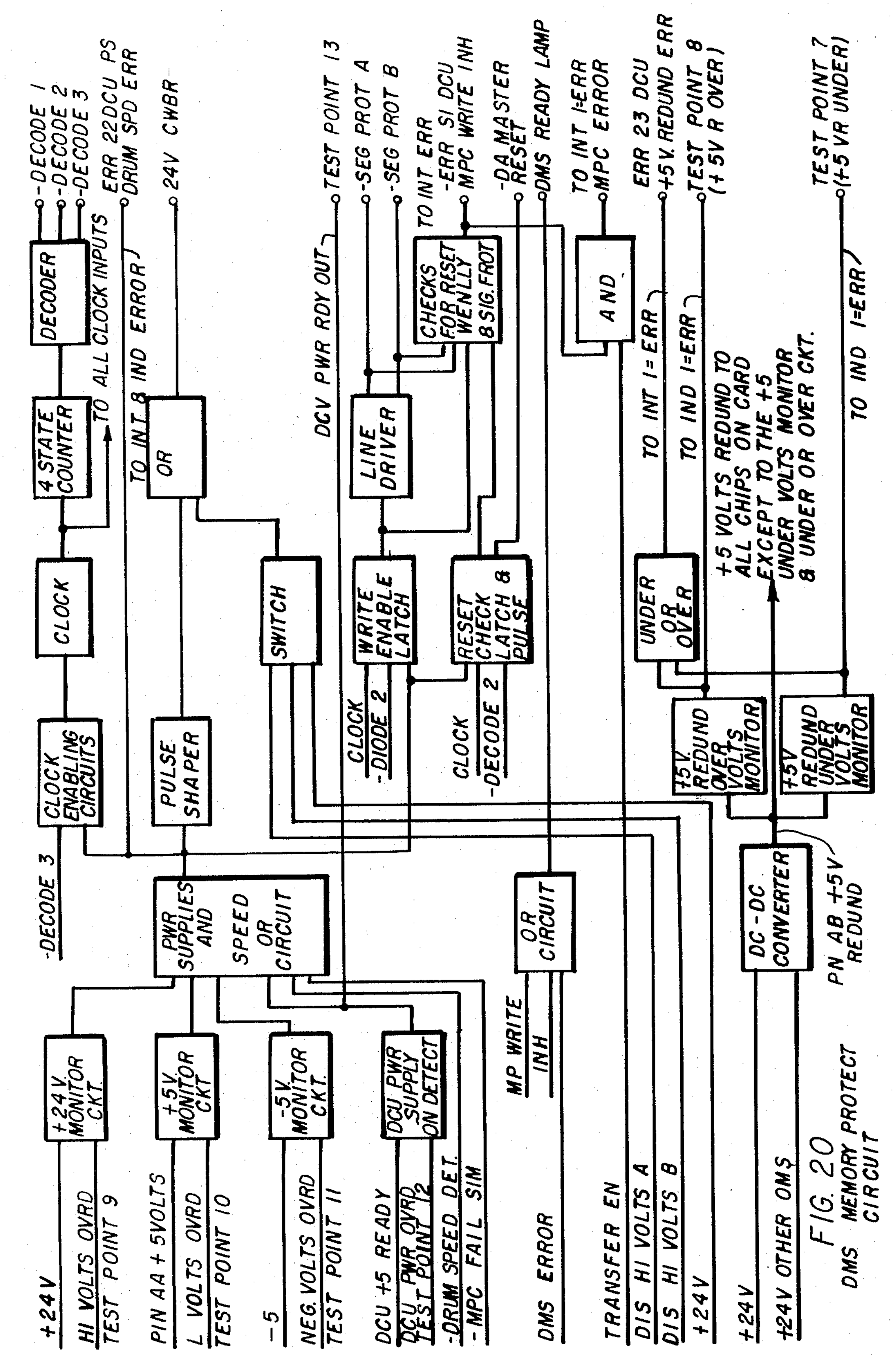
FIG. 20 is a functional block diagram of the memory protect circuits.
Figure 21:
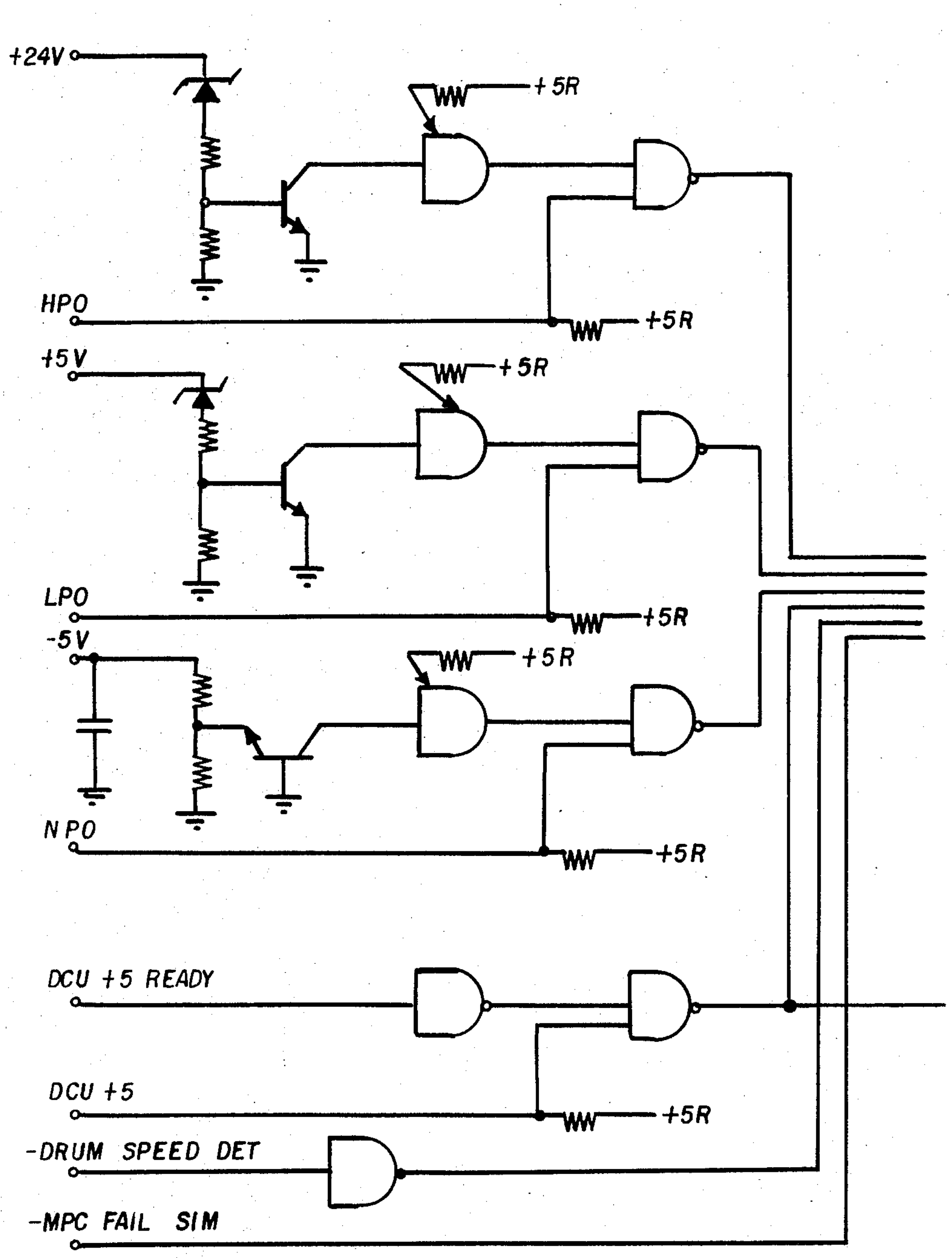
FIGS. 21, 22 and 23 show the circuit logic of the memory protect circuits.
Figure 22:
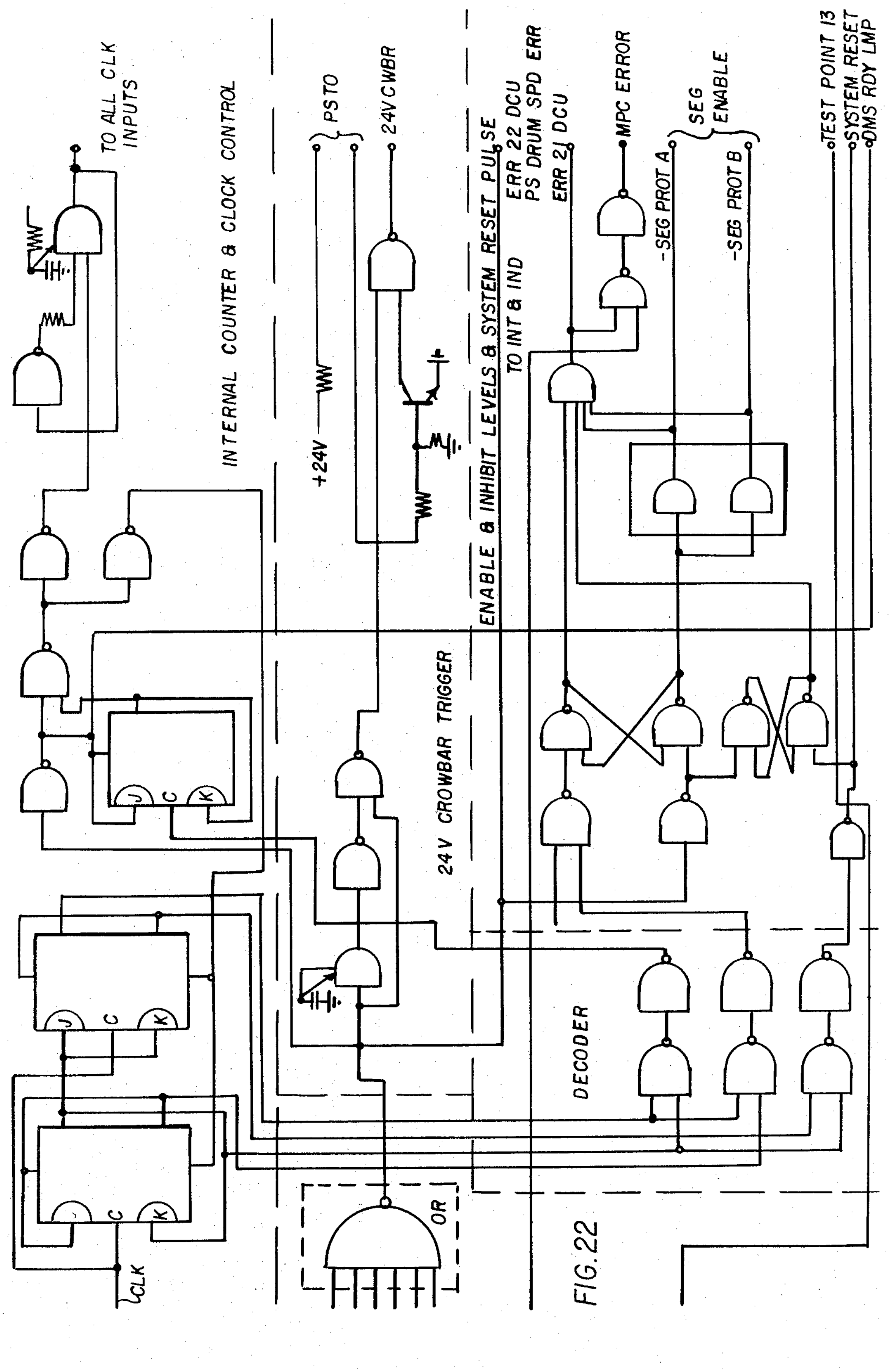
Figure 23:
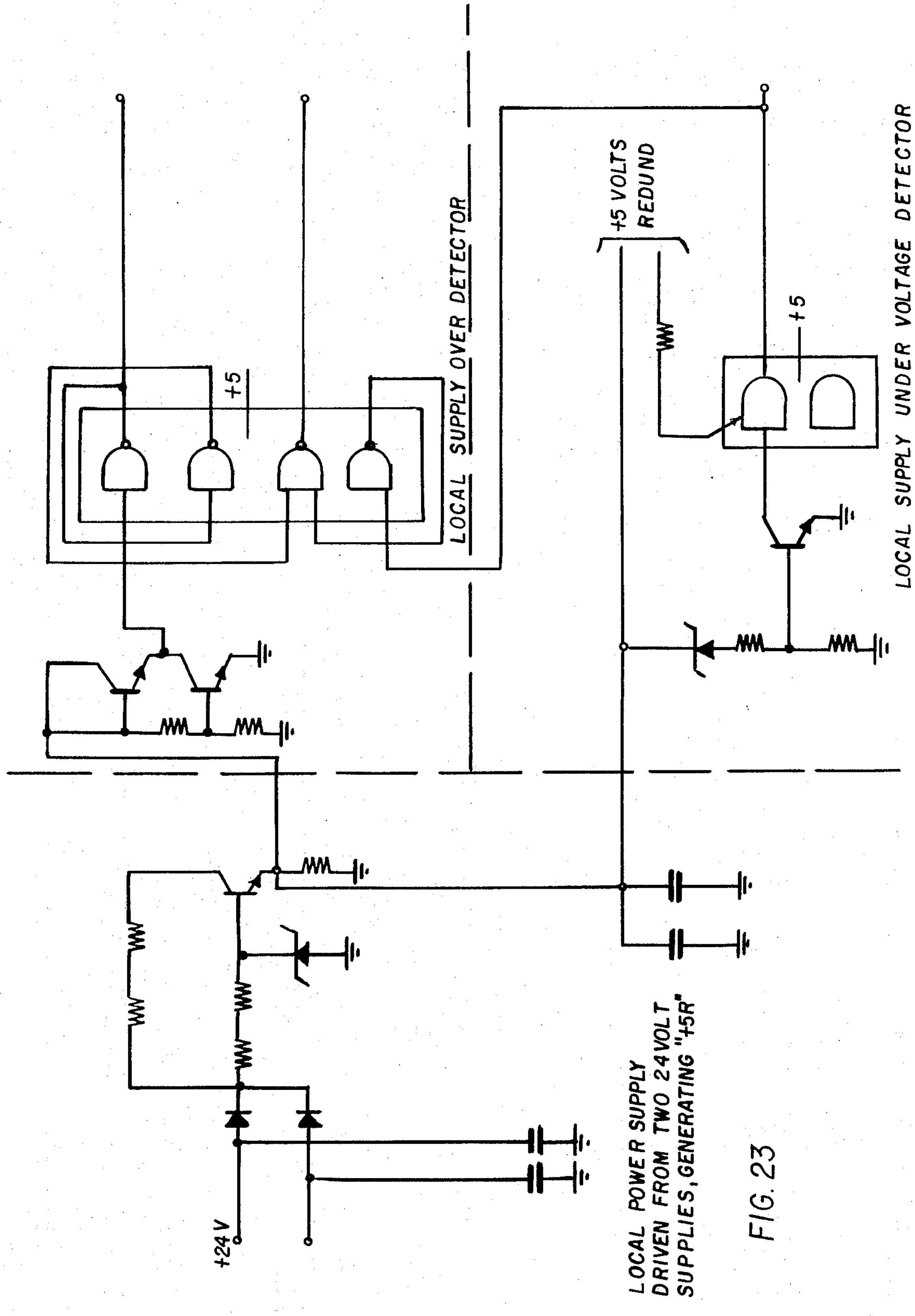

Write/Read Circuits and Head Select Circuits FIG. 20 illustrates the organization of recording heads and their write circuits - the Head Select Circuit and the Write/Read Amplifiers. The Head Select Circuit selects the heads in the horizontal direction defined as a segment. Each segment contains 27 heads (number of bits per word). Corresponding heads (same bit number) are connected together as shown and are driven by one write amplifier. For a write operation, one segment is selected and all write amplifiers are energized. Data will be recorded only at the drum location related to the selected segment. Each write amplifier has a corresponding read amplifier to sense the information recorded on a particular bit and segment. The input to the read amp is the playback voltage developed across the recording head.

1. Head Select

The Head Select Circuit receives its inputs from a circuit in the PA that decodes the segment portion of the drum address. Only one segment decode input will be true at a time. The Head Select Circuit will place +24V on the center tap of all heads of the selected segment; all other center taps will be grounded. Write current for the 27 heads, approximately 2.5 amperes, is applied to the heads in this manner.

2. Write Amplifiers

The write amplifiers switch current directly to the heads previously selected by the Head Select Circuit. Control comes from the DAC Write/Read Control Circuit which receives write commands from a PA control circuit. Each amplifier has two outputs; they are connected to opposite endtaps of the same head via shielded twisted pair leads.

3. Read Amplifiers

The read amps read the playback voltage across the recording heads and output a logic 1 for a recorded logic 1 and a logic 0 for a recorded logic 0. The physical connection between the read amp inputs and the recording heads is via the same shielded twisted pair that connects the write amp to the head. The shield is grounded at both ends. The read amps have a differential input stage. This, along with the twisted pair, provides a high degree of balance. The differential input has a relatively high common mode rejection which is necessary because of the noisy environment that may exist around the cable between head and read amp input. The output of the read amplifier is a 800 nsec pulse from a standard NAND gate.

2.2.2.2.2.1.2 Write/Read Control Circuit

The Write/Read Control Circuit develops the pulses and levels necessary to control and drive the 27 Write/-Read Circuits. Since the timing of the write pulses to the amplifiers is critical, the circuit contains precision timing and checking circuits. To write information on the drum, and enable signal (WRITE LEVEL) and write pulses (WRITE PULSE) are sent from the PA to the Write/Read Control Circuit. Timing is not critical at the WRITE PULSE input level since the critical delay and shaper circuits are on the Write/Read Control Circuit itself. To read information from the drum, the PA sends an enable signal. Data to be recorded on the drum is sent from the DCU to the Drum Buffer Register in the PA and then to the write amplifiers. Data read from the drum is sent from the read amplifiers to the Drum Buffer Register and to the DCU. Two error detectors, the Access Circuit Err and Write Control Err, check the integrity of control signals to the write/read circuits.

2.2.2.2.2.1.3 Head Select Monitor Circuit

The Head Select Monitor Circuit detects a selection of none or more than one segment. There are two one-out-of-18 circuits on each monitor card. One monitors the decoded segment select information at the input to the Head Circuit; the other monitors the output of the Head Select Circuit. The error signals sent to the PA are Head Select Input Fault and Head Select Output Fault respectively. Either one will cause a DCU interrupt.

2.2.2.2.2.1.4 Memory Protect Circuit

The DAC contains a Memory Protect Circuit which acts to protect drum recorded information in the event of a power supply or drum speed failure. This circuit also acts to protect drum and reset the DMS when power is turned on or off. (See DMS-PDR document). A power supply failure is indicated by a lamp on the power supply monitor panel as well as bits 22 and 19, word 20 and bit 19, word 22 (refer to sections on error status indicator words) of ITE if the Error Termination Sequence is at all possible. A drum speed error will set bits 19, 22 and 13 of word 20 and bit 19, word 22 of ITE.

The Memory Protect Circuit is independent of the +5 logic power supply. It utilizes an on-the-card DC-DC converter powered by redundant +24V power supplies. A failure on this card causes a DCU error interrupt indicated by bits 19 and 23 word 20, and bit 19 word 22 of the ITE.

Problems within the drum may cause the thermal overload contacts to open and release A-C power to the drum motor. This condition will cause the drum speed detection circuits to set and trigger an error termination sequence setting the same bits as mentioned for a Drum speed failure.

2.2.2.2.2.2 Clock Circuits

The Clock Circuits will provide the Drum Reset Pulses (DRP) and the Drum Index Pulses (DIP) for referencing the angular index of the drum. A clock track, called Master Reset Pulse (MRP), will be recorded with one bit. This bit develops the DRP which marks the start location on the drum perimeter.

A second clock track, called Drum Index Pulse, will be recorded with 10,999 bits. This will be a continuous closed track and each bit will reference a word location on drum.

For reliability reasons, it was decided there would be three sets of clock tracks, one set called master (MRP and DIP) and two sets called auxiliary tracks (1 and 2). The master tracks will provide backup for re-recording auxiliary tracks. The two sets of auxiliary tracks provide backup for each other. If an auxiliary track which is on-line failed, the Clock Circuit would automatically switch the respective standby track on line and indicate a clock track error. The responsibility of the Clock Circuits is to record clock tracks, transfer tracks, and indicate clock track errors. These functions are shown on the DAC Block Diagram; FIG. 2 and 2A.

2.2.2.2.2.2.1 Recording Clock Tracks

The Clock Track Control (CTC) is a panel which contains all the controls for writing clock tracks. Each clock track has its own write/read amplifier. The mode of recording tracks is return-to-bias (RB).

The manual procedure for writing a clock track is as follows:

1. Select the track to recorded
2. Enable the write amplifier
3. Depress the erase button. This will bias the associated clock track.
4. Depress the write button. This will start the Clock Track Writer (CTW) recording sequence.

When recording Master MRP, the CTW will generate one pulse which will record one bit on the associated MRP track. When recording Master DIP, the CTW in conjunction with the Binary Counter (BC) will generate a train of 10,999 pulses which will record the associated DIP track. The frequency of these pulses will have to be adjusted to obtain a closed track. It may take several attempts to record a perfect DIP track. The CTW will have the capability of recording 10,500 to 11,500 bit tracks. The BC is a standard 15 bit counter programmable from 0 to 16,383.

When recording the auxiliary tracks, the CTW will record the associated master track data (read amp. output) on to the selected auxiliary clock track. There will be a delay adjustment to minimize the skew between auxiliary DIP tracks. After all clock tracks have been recorded the Clock Track Control Panel may be removed. However, it is necessary to strap the Write Inhibit lead of the Write/Read amplifier to ground before removing the CTC. This strapping is accomplished on the CTW card where jacks are provided.

2.2.2.2.2.2.2 Transfer and Error Check

The Transfer Circuit will switch on-line the alternate auxiliary track either automatically (due to a clock pulse error), or manually from the CTC, or on command from the PA. The MRP on-line develops the Drum Reset Pulse (DRP) which will be in coincidence with one DIP. DRP and DIP are the clock timing pulses for the Drum Memory System.

There are five error checks for Clock Circuit Faults. Error detectors will set latches which will retain the error indication for diagnostics.

1. Master Track Error Detector - this detects coincidence between MRP and DIP bit 10,998.
2. DIP Track Skew Detector - This detects the skew between the auxiliary DIP tracks.
3. Drum Speed Detector - This detects the speed of the drum by timing the DIP pulses.
4. DRP Error Detector - This detects the absence of DRP pulses.
5. DIP Error Detector - This detects the absence of DIP pulses.

2.2.2.2.2.3 DAC Peripheral Adapter (PA)

The PA contains the circuitry necessary for locating drum addresses; drum interlacing; temporary storage of drum data; timing of drum write/read control signals; and detection of hardware and software errors.

2.2.2.2.2.3.1 Locating Drum Addresses

The PA locates drum addresses by finding coincidence between the contents of an address register and the count of a counter which is advanced one count for every Drum Index Pulse (DIP). The following information is required to find a drum address: (1) the segment number, (2) whether the drum location is specified in binary or BCD, and (3) the address of the word relative to DRP (location 0). This information is loaded into the Drum Address Register (DAR) at the beginning of a transfer. The segment number (bits 16–20) is decoded and sent to the Head Select Circuit, which in turn, energizes the appropriate segment. DAR bits 0–15 contain the drum address (relative to DRP). DAR bit 22 specifies which counter will be compared with the address bits. Two counters, one binary and one modified BCD, continuously count DIP pulses. Each count up to the equivalent of decimal 10,998 and then are reset to zero by DRP. Thus, each count in the counters is related to a specific drum location or drum location references in this manner is called a drum index value.

The search for coincidence starts upon command from the DCU (START COUNTER SEARCH).

2.2.2.2.2.3.2 Drum Interlacing

A maximum of six DCU's will be interfaced with two CMC's working in sync. Words can be read from each drum at a 1.6 microsec. rate and the core memory cycle time is 1 to 2 microsec. Thus, since several DCU's might request access to core simultaneously, it is not possible to transfer successive words from drum to core. A drum interlace, whereby one word every five locations is read (written) from drum and written (read) into core, is used. The interlace rate of 5 was selected so six DCU's and the CCP could access core with the probability of a request going unanswered minimized. The interlace rate is not variable, but could be increased to 6, 7 or 8 if required.

Interlacing is controlled by a three stage counter on the PAD Sequence Control Circuit. The counter starts when coincidence is found in either the PA (counter coin) or in the DCU (assoc. coin) and outputs one pulse (MI-DCP2) for every five drum locations. MI-DCP2 will effectively skip ahead one location for every complete drum revolution. For example if drum locations 0, 5, 15 etc. were read on the first drum revolution, locations 1, 6, 16, etc. would be read on the second revolution.

2.2.2.2.2.3.3 Temporary Data Storage

One register, the Drum Buffer Register (DBR) is used as temporary storage for both writing and reading operations. The register contains 26 bits including a parity bit and a memory protect bit. Another bit, The Block Mark Bit, is treated as the 27th bit of the DBR. This bit is located on the PAD Data Control circuit. Parity is checked across all bits except Block Mark for both read and write operations.

The use of DRB in transferring data is described in detail in section 2.2.2.2.2.3.5. 2.2.2.2.2.3.4 Timing and Write/Read Control The PAD Sequence Control Circuit and the PAD Data Control Circuit are the PA circuits that provide timing and write/read control.

The DIP clock track is the source for all DAC write/-read timing signals. For some applications, DIP is used directly; for others timing pulses are generated by pulse circuits on the PAD Data Control Circuit. These pulses are sent to the other DAC circuits for write/read control and to the DCU (refer to FIG. 7, for additional DMS timing details). Write/read control signals are developed on the PAD Sequence Control Circuits. For both writing and reading, an enable signal and pulse are developed. These are WRITE LEVEL and WRITE PULSE for writing, and PA READ ENABLE and STROBE DBR for reading. The write/read control interface with the DCU is described in detail in section 2.2.2.2.2.3.5.

2.2.2.2.2.3.5 Operational Explanation of the PA

The operational explanation of the PA will be divided into read and write categories.

2.2.2.2.2.3.5.1 Read Transfer (drum to core).

Figure 4:
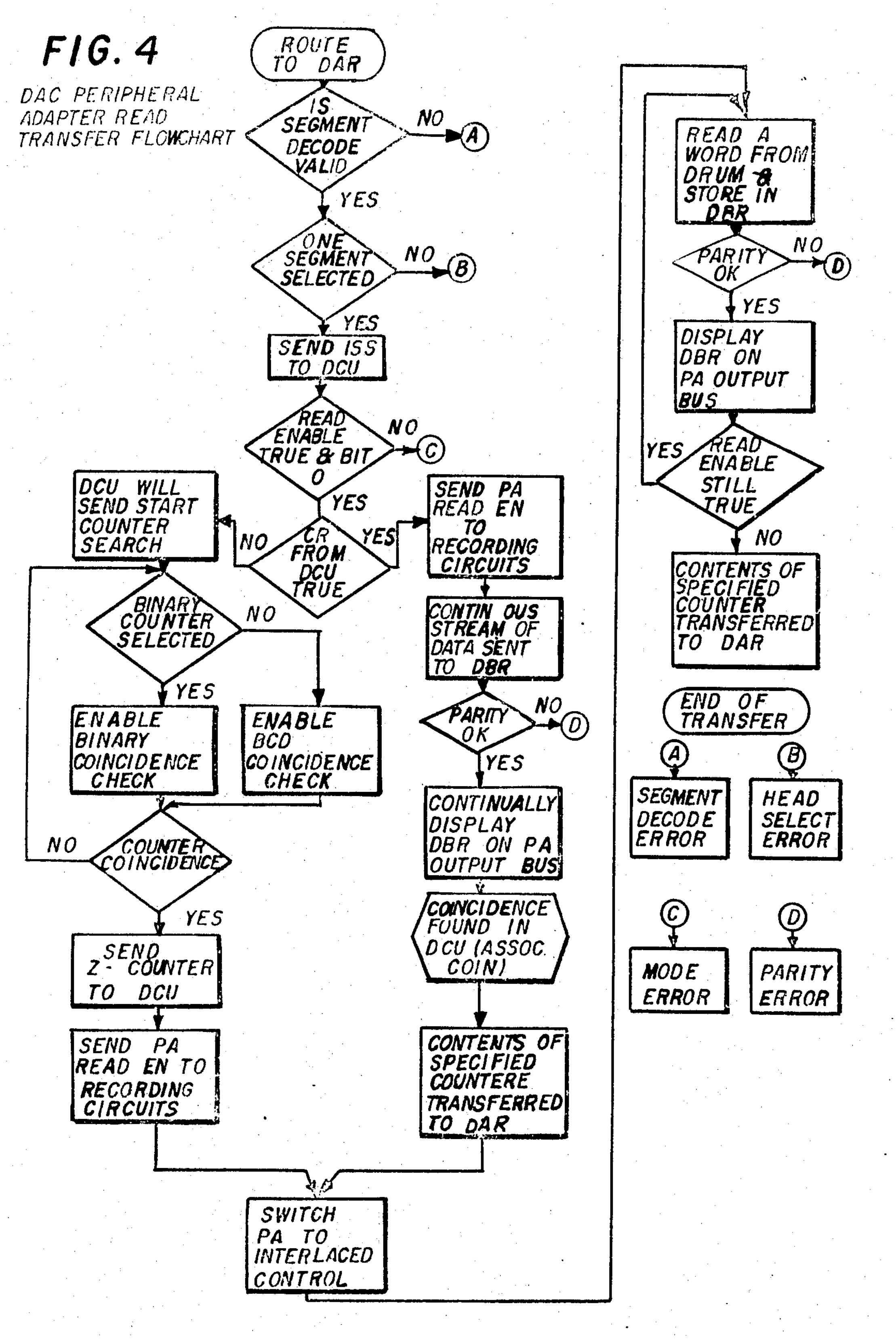
FIGS. 4 and 5 are flowcharts for drum access circuit peripheral adapter read and write transfer.

Refer to the flow chart of FIG. 4. A data transfer is started when the Drum Address Register (DAR) is loaded during the initialization cycle of the DCU. Bits 16 thru 20 of the DAR contains the segment address of the first word to the transfer. If the specified segment is valid (within range of implemented segments), the number of the specified segment is decoded and sent to the Head Select Circuits. The Head Select Circuit then notifies the PA that one and only one segment has been selected and the PA sends the ONE SEGMENT SELECTED (ISS) signal to the DCU. When the DCU acknowledges the ISS signal, it initiates an enable signal (in this case READ ENABLE) and either a CONTINUOUS READ or a START COUNTER SEARCH signal.

Assume that the DCU sent a CONTINUOUS READ signal. If there have been no DAC errors up to this point, the PAD sequence Control Circuit sends the PA READ ENABLE signal to the recording circuits. Data is transferred from the Drum to the Drum Buffer Register under control of the PA. After each word is loaded into the DBR, its parity is checked. If parity is correct, the DCU, by sending a DIPLAY DBR signal transfers the data from the DBR to the PA Output Bus and thus to the DCU. In this manner, the DMS presents a continuous stream of data, and the contents of a register in the Associative Search Module of the DCU. When coincidence is found, the contents of the specified counter is stored in the address bits of the DAR and the PAD Sequence Control Circuit switches the PA to interlaced control. The count stored in the DAR will be the address of the coincidence word +8.

If, instead of a CONTINUOUS READ signal the DCU had sent a START COUNTER SEARCH signal (refer to the CR decision box on the flow chart), the address search would have been performed in the Address Coincidence circuit of the PA. Bit 22 of the DAR specifies which counter (binary or BCD) will be compared with the address bits of the DAR. When coincidence is found, the PAD Sequence Control Circuit sends the PA READ ENABLE signal to the recording circuits and switches the PA to interlaced control. With the PA in the interlaced control mode, every fifth drum word (for interlace of five) will be loaded into the DBR, checked for correct parity and sent to the DCU. Control of the data transfer will handled in the same manner as for a continuous read operation.

The transfer continues until the READ ENABLE signal from the DCU is removed. During the transfer, the count of the specified counter is transferred to the address bits of the DAR once for every 5 DIP pulses. At the end of transfer, the DAR will contain the address of the last word transferred +8.

2.2.2.2.2.3.5.1 Write Transfer (Core to Drum)

Figure 5:
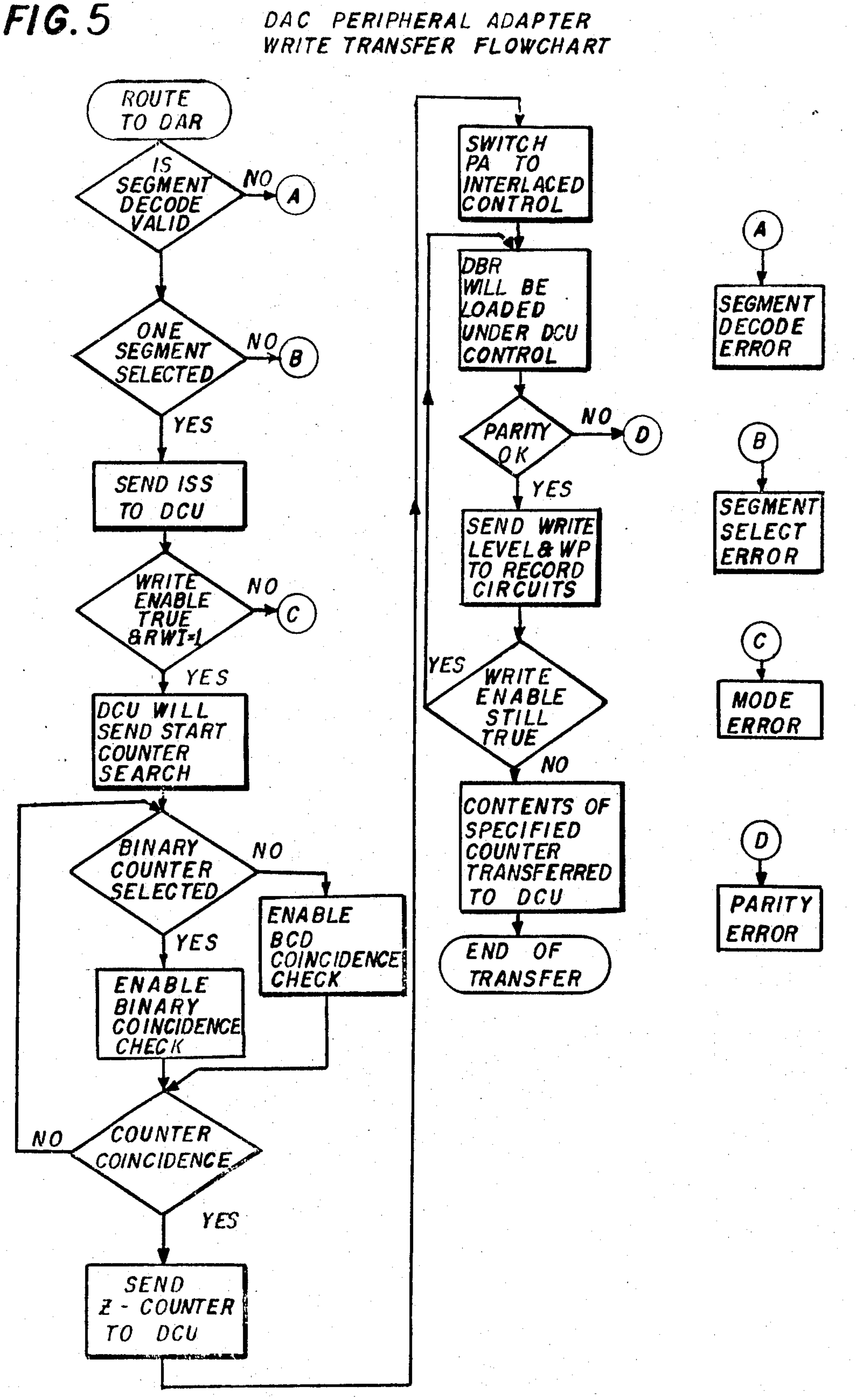

The DCU Associative Search Mode is not used for drum write operations. Therefore, PA operation for write transfers is less complex than that of read transfers. Refer to the flow chart of FIG. 5. The sequence of operation through initial loading of the DAR, segment decode, segment select and ONE SEGMENT SELECTED signal is identical to that of the read operation. If no errors have been detected, the DCU sends the START COUNTER SEARCH signal. The specified counter (binary or BCD) will be compared with the address bits of the DAR to locate the angular index value for the beginning of the transfer. When the angular index value is found the Z COUNTER signal is sent to the DCU and to the PAD Sequence Control Circuit. The DCU controls transfer of data to the DBR and the PAD Sequence Control Circuit sends the WRITE LEVEL and WRITE PULSE to the recording circuits. WRITE PULSES cause data to be written on the drum at the specified interlace rate. The transfer will continue until the WRITE ENABLE (from DCU) signal is removed, terminating the transfer. The count of the specified counter is stored in the address bits of the DAR. The stored count will be the address of the last word written +8.

2.2.2.2.2.3.6 Error Detection

Whenever an error occurs in any circuit of the DAC, the following actions are taken in the PA.

1. If a data transfer is in progress, it will be halted; the contents of the DBR and the 10 higher order bits of the DAR will be held intact for diagnostic purposes.

2. The contents of the binary or BCD counter, at the time of the trouble indication, is stored in the address field of the DAR. For most PA errors, this stored count is meaningless. However, for parity errors, it can be used to identify the bad word. Since binary numbers should be simpler to handle in diagnostic routines, parity errors will cause the binary count to be stored.
3. The error indication will be stored in a flip-flop or latch type of storage element, the output of which can be displayed on the PA Output Bus for diagnostics.
4. The DCU will be notified of the detected error. All DAC error indications will be OR'ed together and a single error signal, DAC ERROR, will be sent to the DCU.

Diagnostic routines, which simulate error conditions in the DAC, will be written so that DAC error detection circuitry is exercised periodically.

2.2.2.2.3 Drum Control Unit (DCU)

The DCU provides the control and data path for the transfer of information between the CMC and DAC. The DCU contains buses (I/O and internal), registers, error detectors, and control circuitry as depicted in the DCU Block Diagram, FIG. 6

2.2.2.2.3.1 Block Diagram Description

Figure 6:
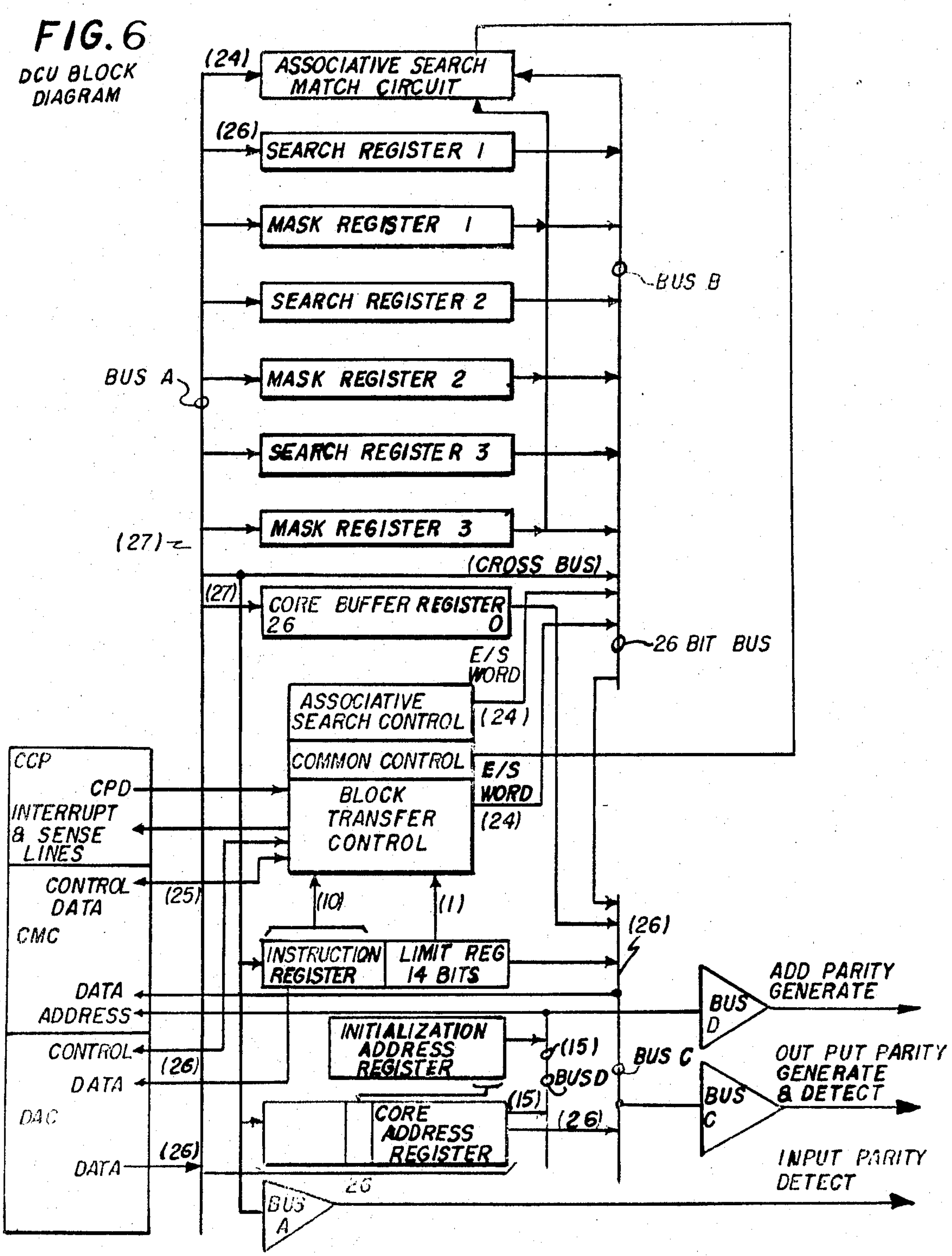
FIG. 6 is a drum control unit block diagram.

FIG. 6 illustrates the organization of the DCU, and aids in understanding the following sections.

2.2.2.2.3.1.1 Bus Structure

1. Data Bus A (Input)

Data to the DCU (25 bits and 1 parity) from the CMC or DAC is received via bus A. Parity at bus A is checked by the Bus A parity circuit.

2. Data Bus C (Output)

Data from the DCU (25 bits and 1 parity) to the CMC or DAC is sent via bus C. Parity is checked (BUS C parity) and corrected if necessary before data is sent to the CMC or DAC, i.e., bad parity will never be written in core or on drum.

3. Address Bus D

Addressing core (15 bits and 1 parity) is accomplished directly over bus D from the DCU. Correct parity is generated at bus D (Bus D parity circuit).

2.2.2.2.3.1.2 Registers

Each register in the DMS except the IAR contains parity and memory protect information in bits 24 and 25 respectively. The following is a description of the registers in the DCU. More detailed descriptions of each DMS register is found in Appendix I of this section.

1. Instruction Register/Limit Register (IR/LR).

The IR portion (10 bits) will contain the directive to be executed by the DMS. The IR portion (14 bits) will contain the number of words to be transferred in the case of single level counter search or the number of words to be skipped (indexed) in the case of single level associative search.

2. Initialization Address Register (IAR)

The IAR is a 15 bit address register used to address core during certain DCU sequences. The low order 5 bits are preset and incremented during these sequences. The high order 10 bits are strapped internally whose value is determined by bound checks to be made in core.

3. Core Address Register (CAR)

This 26 bit register is used to address core during any of the data transfer modes. Bits 15 thru 20 are not programmable.

4. Core Buffer Register (CBR)

The 26 bit CBR is used as a temporary store of data being transferred.

5. Search Registers (SR1-SR3)

The Search Registers (26 bits) contain information that specifies the drum address or data coincidence to be encountered before entering the respective levels of associative search.

6. Mask Registers (MR1-MR3)

The Mask Registers (26 bits) contain information that specify which bits of their respective SR are to be involved.

2.2.2.2.3.1.3 Associative Search Match Circuit

This circuit decodes coincidence between bus A information from drum and the search register screened by the mask register.

2.2.2.2.3.1.4 Common Control

The Common Control contains the DMS timing, coincidence circuit, pulse distributor, and the directive decode circuit.

Figure 7:
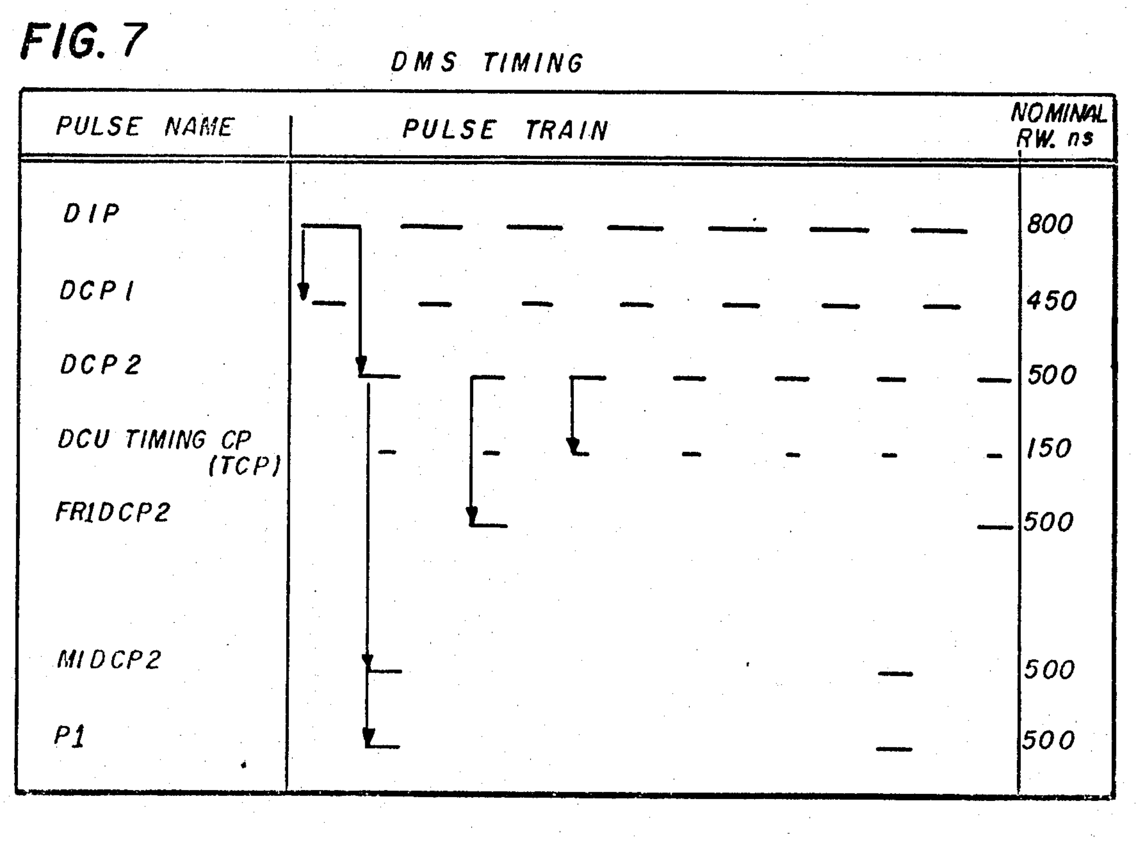
FIG. 7 is a graph of the down control unit timing.

The DMS timing is illustrated in FIG. 7 DCP2 and DCP1 are generated in the PA of the DAC from the drum clock tracks (DIP). FRI-DCP2 (also generated in the PA) is a free running DCP2 whose period is 1 drum interlace time of 7.5 microsec. DCU TIMING CP (TCP) is generated from DCP2 by a pulse shaper on the Bus D Multiplex circuit of DCU. The coincidence circuit recognizes the specified coincidence (counter or information) and enables the pulse distributor at the appropriate time. The pulse distributor (PD) is a three stage counter which is synchronized with the interlace counter of the DAC and clocked by DCP2 pulses. The PD is strapped at the connector for an interlace rate of 5. The strapping can be changed if a higher interlace rate of 6, 7 or 8 is required. The DCU timing is dependent on the control pulses of the pulse distributor.

There are five control pulses, P1 through P5. The P1 pulses of the PD are synchronized with each MI-DCP2 of the DAC. The starting of the PD counter is different for the various DCU sequences.

During the write sequence, the PD counter will be set to P1 and started by Z counter (counter coincidence). For any read-drum write-core counter search sequence, the PD counter will be set to P1 and started by MI-DCP2.

When searching for associative coincidence, the PD will be set to P3 and started on match strobed by DCP2.

Regardless of what the PD counter is set to or which signal started the PD, the control pulses will not be enabled until the counter has been started and the count reaches P3 time.

The directive decode circuit will decode the instruction register bits 20–23 and determine the operation to be performed that is, read sequence (SLCS), write sequence (SLCS), single or multi level associative search DAC maintenance, or invalid operation.

2.2.2.2.3.1.5 Block Transfer

The Block Transfer module controls SLCS read drum, SLCS write drum, initialization, termination, error termination, spills, and the error detection associated with these functions. All of the CMC interface control, as well as the sense line circuitry is under the control of the SLCS module.

2.2.2.2.3.1.6 Associative Search Control

This module controls the multi level and the single level associative search sequences and provides enabling control to the SLCS module which interfaces with the CMC and DAC.

2.2.2.2.3.2 Initialization

Figure 8:
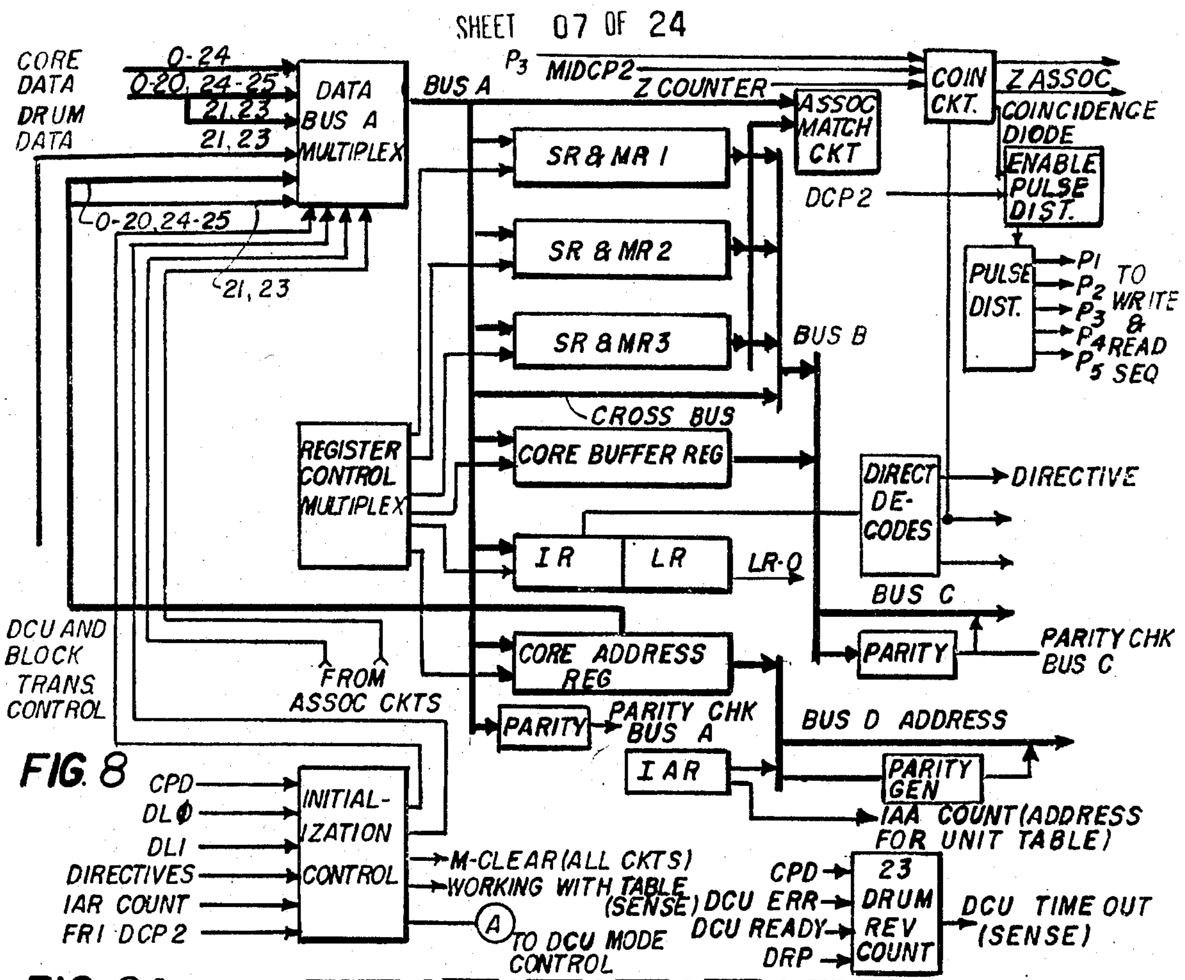
FIGS. 8 and 8A comprise a diagram of the block transfer module of the drum control unit block diagram.
Figure 8A:
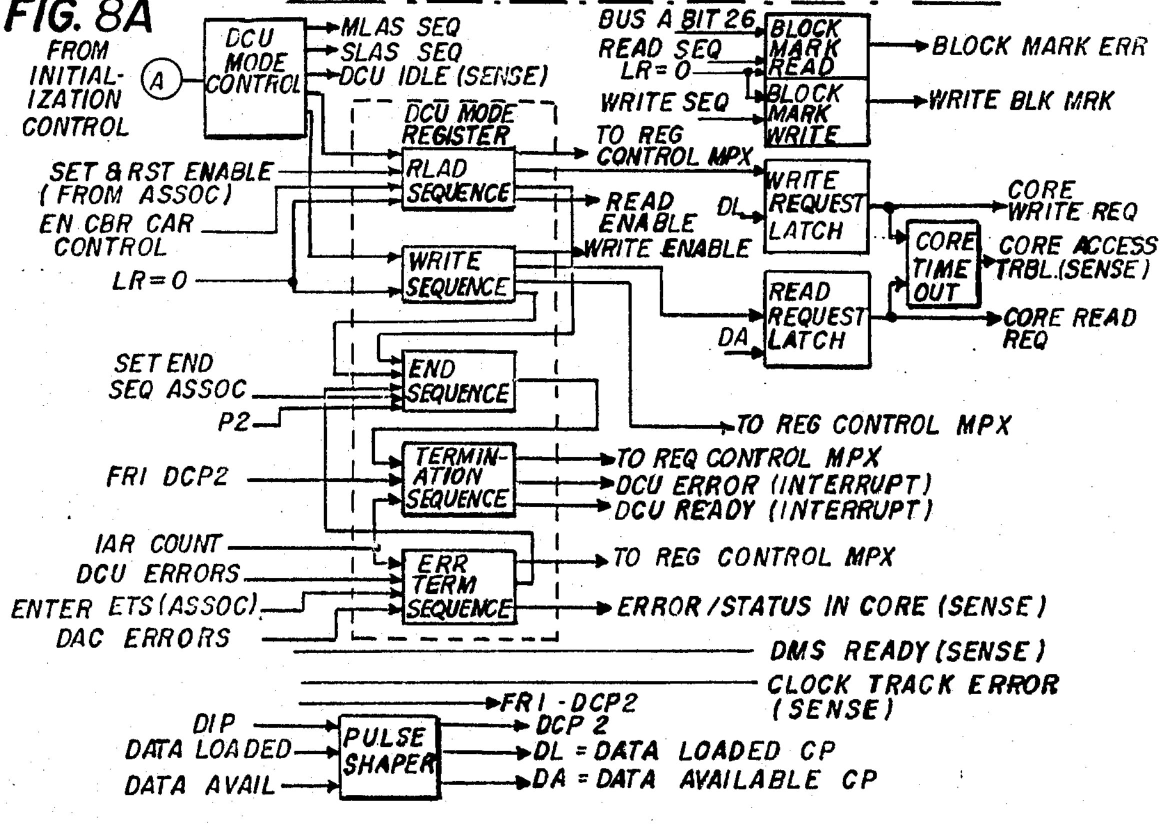

FIG. 8 is a detailed picture of the Block Transfer Module of the DCU block diagram. The Register/bus structure and some control are retained on FIG. 8 (from FIG. 6) for clarity.

Before data transfers between core and drum (or DAC maintenance) can be made, the DCU must be initialized.

Initialization is the process initiated by CPD, by which information is read from fixed locations in core (Initialization Table) into the registers of the DMS. This information contains directives and associated data necessary for execution of the DMS request. A copy of the Initialization Table is shown in the left column in DMS Appendix III. These locations are addressed by the IAR via bus D and the information is controlled by the initialization control and register control multiplex (see FIG. 8).

2.2.2.2.3.3 Single Level Counter Start (SLCS)

The following operation description will refer to the SLCS flow chart, FIG. 8 and FIG. 6.

2.2.2.2.3.3.1 Drrum Write (SLCS-write)

Figures 9, 9A:
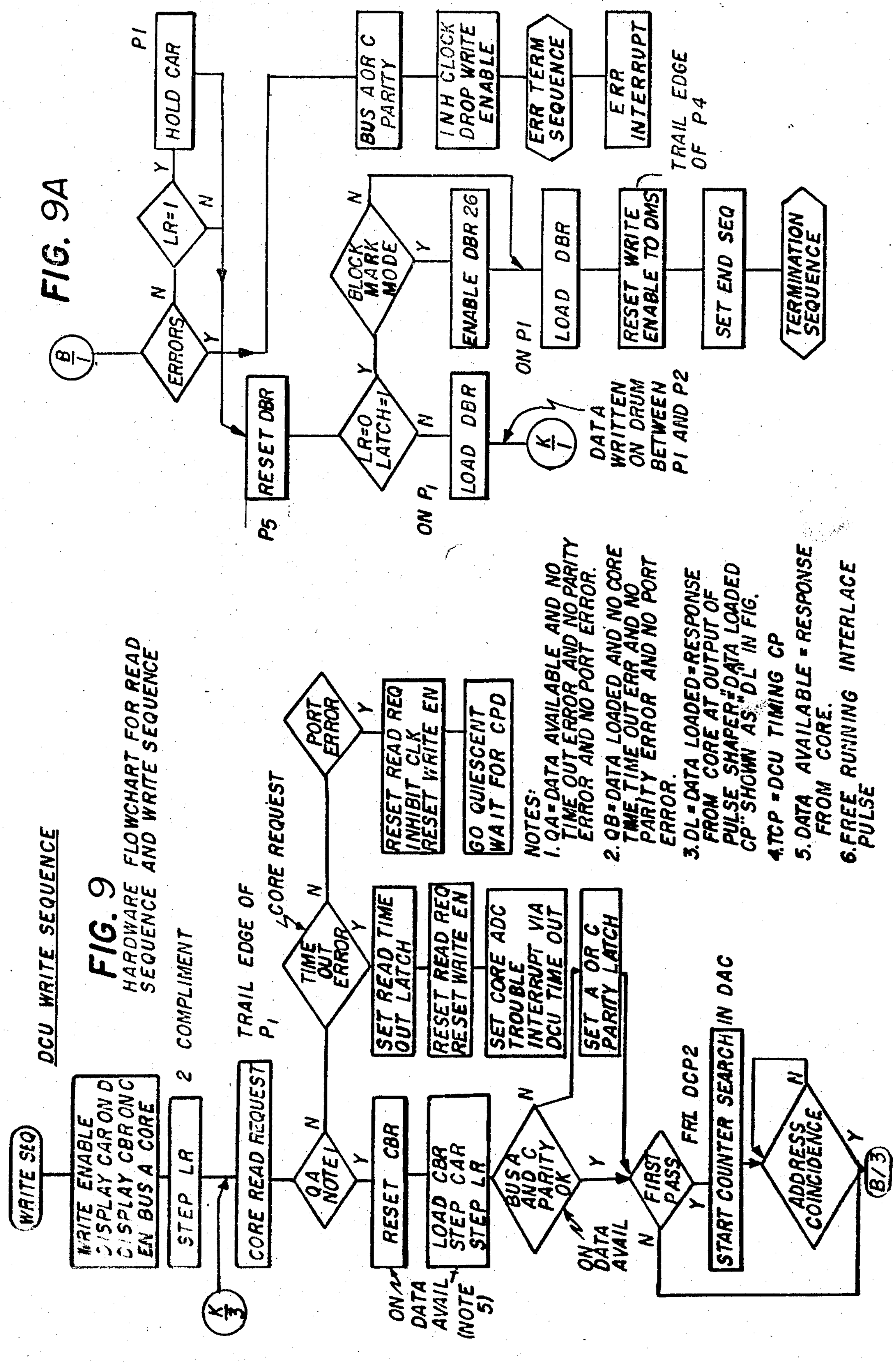
FIGS. 9, 9A and 9B comprise a flowchart for read sequence and write sequence in the drum memory system.
Figure 9B:
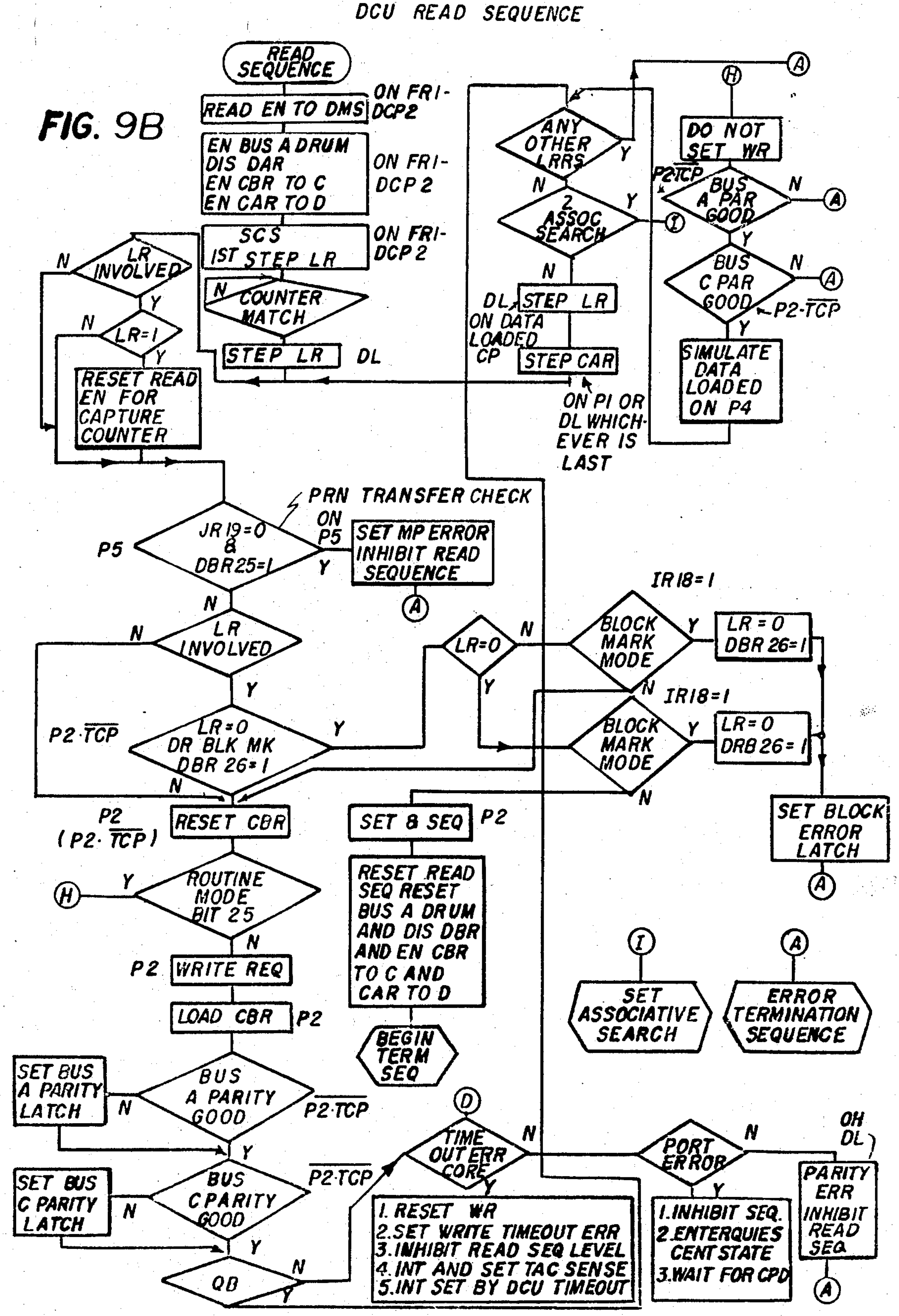

For the SLCS drum write IR directive (see DMS Appendix II for IR format); the IR/LR, DAR, and CAR are loaded in the DMS during initialization. When complete, the DCU mode control circuit (FIG. 8) sets the write sequence circuits. The Write Sequence bit of the Error/Status register (bit 2, word 22) is set. For detailed sequential circuit conditions see the flow chart on FIG. 9 The notes along side of the functions on the flow chart indicate the timing of the hardware functions.

A core read request is issued (FIG. 8). The CMC responds with a "Data Available" pulse indicating that the word at the core location defined by the CAR is available on bus A. The word is then loaded into the CBR. The CAR is advanced (1) to address the next core location, and the LR is stepped (decremented because LR contains 2's complement) to indicate a word was transferred to the DCU. The command to "Start Counter Search" is given to the DMS. The address search continues on interlace 1 until match between the address field of the DAR and the particular angular index counter in the PA is found. If there are no errors the DBR is loaded from the CBR and the word is written on drum where address match was found. The above functions of "Core Read Request," "Data Available," load CBR, load DBR, step CAR and LR, and check for errors are continued on interlace 5 until the LR contains all zeros. At this point the Write Sequence status bit is reset and the Termination Sequence is triggered. The Termination Sequence circuits control the necessary functions for storing the present contents of the CAR (core address of last word read) into core memory, and setting the DCU Ready interrupt (see FIG. 8).

A CPD spill after this directive reveals 1. the original contents of the IR/LR
2. final Drum address
3. final core address
4. last word transferred in CBR
5. last word transferred in DBR 2.2.2.2.3.3.2 Drum Write-Block Mark If the DCU was placed in the Block Mark Mode (set bit 18 in IR), the last word written on drum will set its block mark bit, i.e. bit 26 of the last word will record at 1.

2.2.2.2.3.3.3 Drum Read (SLCS-read)

For the read drum (write core) directive (see Appendix II for IR format; the same DMS registers are loaded as for Drum Write. In other words initialization is similar, but when complete, the DCU mode control circuit sets the read sequence circuits. The Read Sequence bit of the Error/Status register (bit 3, word 22) is set. For detailed sequential circuit functions see Read Sequence on flow chart FIG. 9 The notes along the flow chart functions indicate which DCU timing pulses cause the action. After the read sequence circuits set up the buses required to receive data from drum, the command to the PA to "start counter search" between the address field of the DAR and the particular angular index counter in the PA is found.

The data at the coincidence address is sent to the DCU via bus A and held in the CBR and placed on the output bus (bus C). A "write request" is issued to core. After the word is stored in core at the location defined by the CAR, the CMC responds with a "Data Loaded" pulse. The CAR is advanced (1) to address the next core location, and the IR is stepped (decremented) to indicate a word was transferred to the CMC.

The DAC continually places words from drum into the DBR at an interlace five rate. The DCU loads the DBR word into the CBR, issues a "write request" to core and steps the CAR and LR after the "Data Loaded" response from core. Parity is checked at the DBR, on bus A as the data enters the DCU, and at bus C just before the "write request" is issued to the CMC. This process continues until the LR contains all zeroes in which case a block mark bit is checked (if block mark mode), the Read Sequence status bit is reset and the Termination Sequence begins. The DCU Ready interrupt (see FIG. 8) indicates the completion of the Termination Sequence.

2.2.2.2.3.3.4 Drum Read - Block Mark

If the DCU was placed in the Block Mark mode (IR Bit 26-1). The last word to be transferred is defined by the state of the LR = all zeroes.

If these two conditions

1. LR = 0
2. DBR bit 26=1 do not occur simultaneously an error interrupt occurs. A CPD spill following a read sequence reveals 1. the original contents of the IR/LR
2. final drum address
3. final core address
4. last word transferred in CBR 2.2.2.2.3.4 Associative Search The associative search function of the DCU is basically a read drum write core operation where the data to be transferred is located by associatively searching the drum. There are two associative search sequences multilevel and single level associative search.

The multilevel associative search (MLS) provides for three levels of search and transfer, however, a fourth level of search can be obtained by having a counter search prior to the first associative search. The normal three levels of search can be either a search for counter or associative coincidence. Indirect addressing on drum is possible because of the overwrite feature of the MLS. This feature is the capability of drum data to specify the location of coincidence for the next level of search. From the time the MLS has entered the first level until termination, the DCU is controlled by the drum data.

The single level associative search (SLAS) provides for only one level of associative searching which may or may not be preceded by a counter search. The number of words to be skipped after associative coincidence is specified by the limit register and the number of words to be transferred is specified by the instruction register. Therefore, the number of words transferred is under the control of the initialization table (refer to DMS Appendix III) in core.

When the first associative coincidence is preceded by a counter search, the Block Mark (BM) bit will be checked. If the BM bit comes true while searching for this first associative coincidence, the level end flag will be set and cause an interrupt.

2.2.2.2.3.4.1 MLS Description

The operation or control of the MLS sequence is for the most part data driven. During the Initialization sequence all the control registers are loaded with data pertinent to MLS transfer. That is, the Instruction Register (IR) has the MLS directive and specifies the type of coincidence (counter of associative) to be encountered for each level of search. If all levels of search are not to be used, the unused levels must be specified counter coincidence. The Drum Address Register (DAR) contains the drum address if a counter search and the specified drum segment to be searched. The Core Address Register (CAR) contains the location in core where the first data word is to be written. All the Search Registers (SR) are loaded with information that specifies the drum address or data coincidence to be encountered before entering their respective levels of MLS. The Mask Register (MR) contains information that specifies which bits of their respective SR will be involved.

Upon completing the Initialization sequence, the DCU will enter the MLS sequence as specified by the directive in the Instruction Register. Other than the Search Register specifying the drum address or information coincidence at which the DCU should enter the next level of associative search, the control bits (21, 33 and 23) of the data read from drum will direct the DCU through the MLS sequence word by word until directed to enter the termination sequence.

There are nine possible control actions the DCU can follow as each word is read from drum during the MLS sequence. The action taken is determined by the control bits of the previous (CBR) and present (DBR) word read from drum, the present level of associative search, the present state of the DCU (read or search), and if the present word is a coincidence word (address or information coincidence). Refer to the MLS decision table for more detail information of the MLS control actions, FIG. 16 and MLS flow diagram FIG. 12.

2.2.2.2.3.4.1.1 MLS Operation

Figure 11:
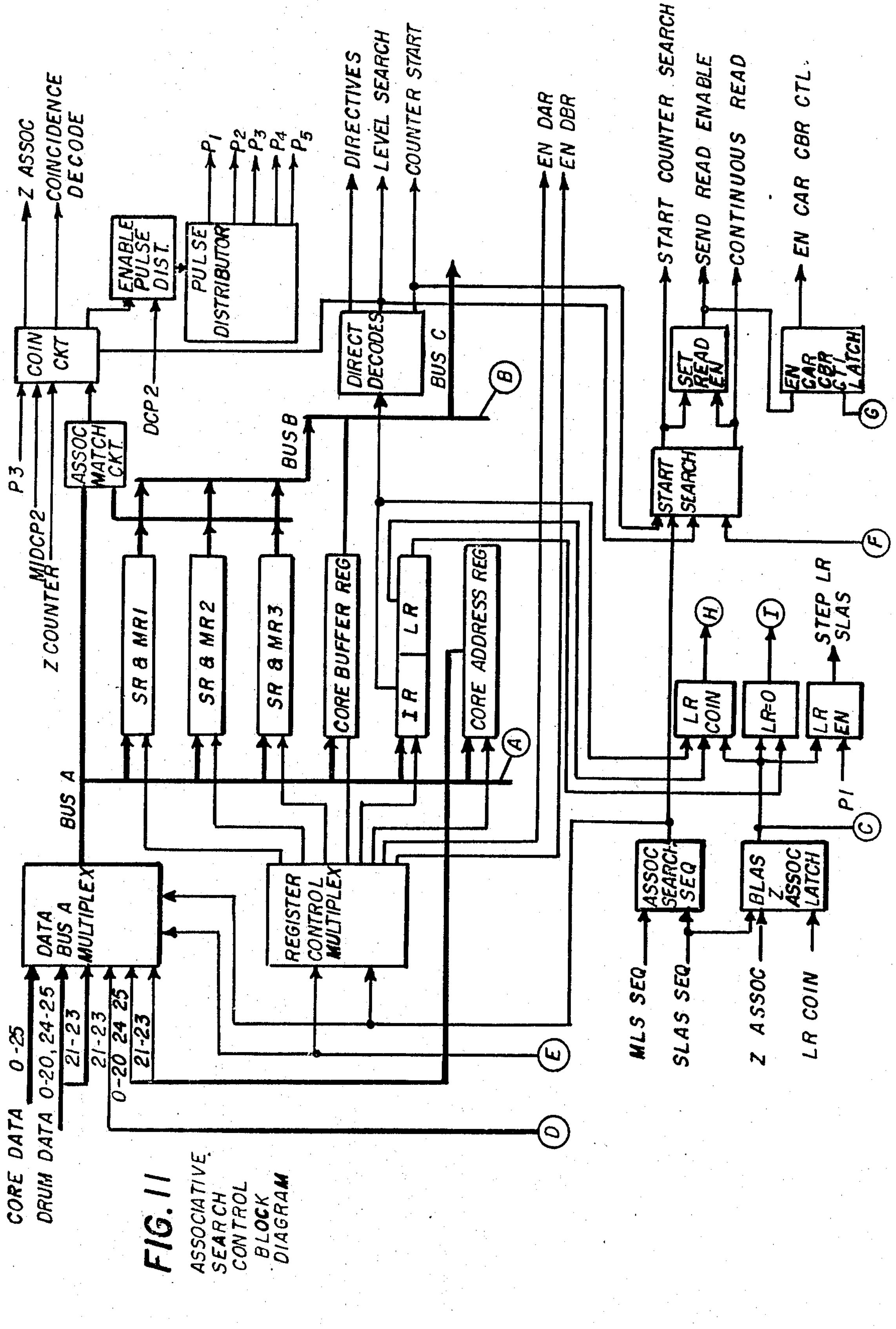
FIGS. 11 and 11A comprise a block diagram for associative search control in the drum memory system.
Figure 11A:
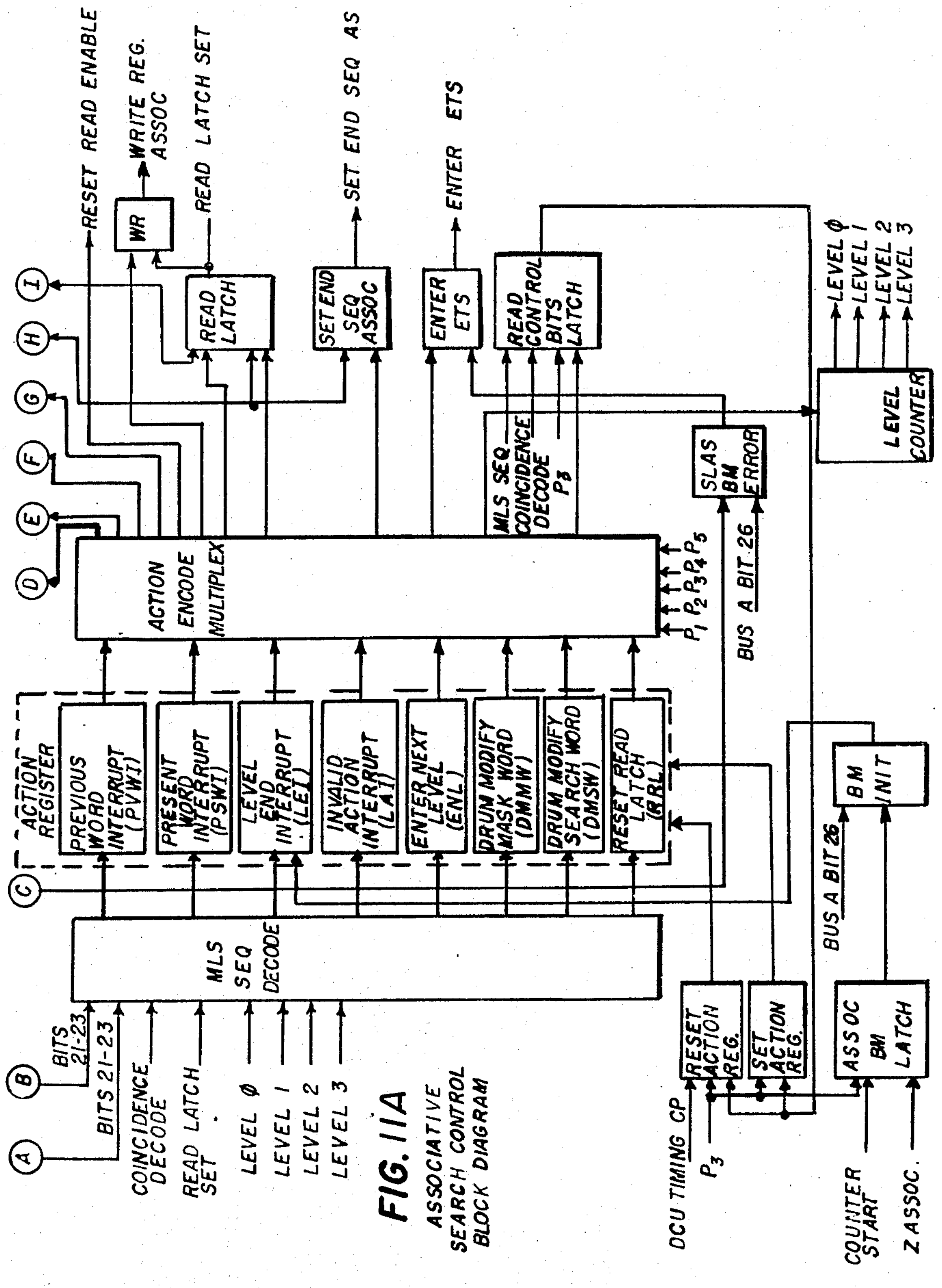

After completing the Initialization Sequence the MLS sequence is set. This will display the Drum Buffer Register (DBR) on the DAC data bus, enable the drum data on bus A, display the Core Buffer Register (CBR) on bus C, and display the appropriate SR and MR on the match bus and bus B, (refer to DCU Block Transfer and Associative Search Control diagrams FIGS. 8 and 11). The Read Enable latch and EN CAR CBR CTL latch will be set for the MLS sequence. The Read Enable lead will condition the DAC to respond to DCU control. The EN CAR CBR CTL lead will ready the Block Transfer Read Sequence circuitry necessary to transfer the DBR data via CBR into core.

If the MLS Transfer is a counter start, the Start Counter Search will be set and the DAC will look for coincidence between the specified counter and the DAR. When coincidence is found the DAC will go active; this will send Z counter to the DCU, start the DAC interlace counter, and load the word associated with counter coincidence in the DBR. There will be an MIDCP2 Pulse at the interlace rate which will start the Pulse Distributor in sync with the interlace counter of the DAC. The DCU will start searching the data at the interlace rate and associative match will be tested every P3 of the Pulse Distributor.

If the MLS Transfer is not a counter start, the Start Search circuit will send a Continuous Read to the DAC. The DAC will start reading drum and loading the DBR every DCP1, and every DCP2 associative match will be tested. When associative coincidence is found, the Pulse Distributor will be started at P3 time and Z associative will synchronously start the DAC interlace counter. The DMS will now transfer data at the normal interlace rate.

Figures 15, 15A, 15B:
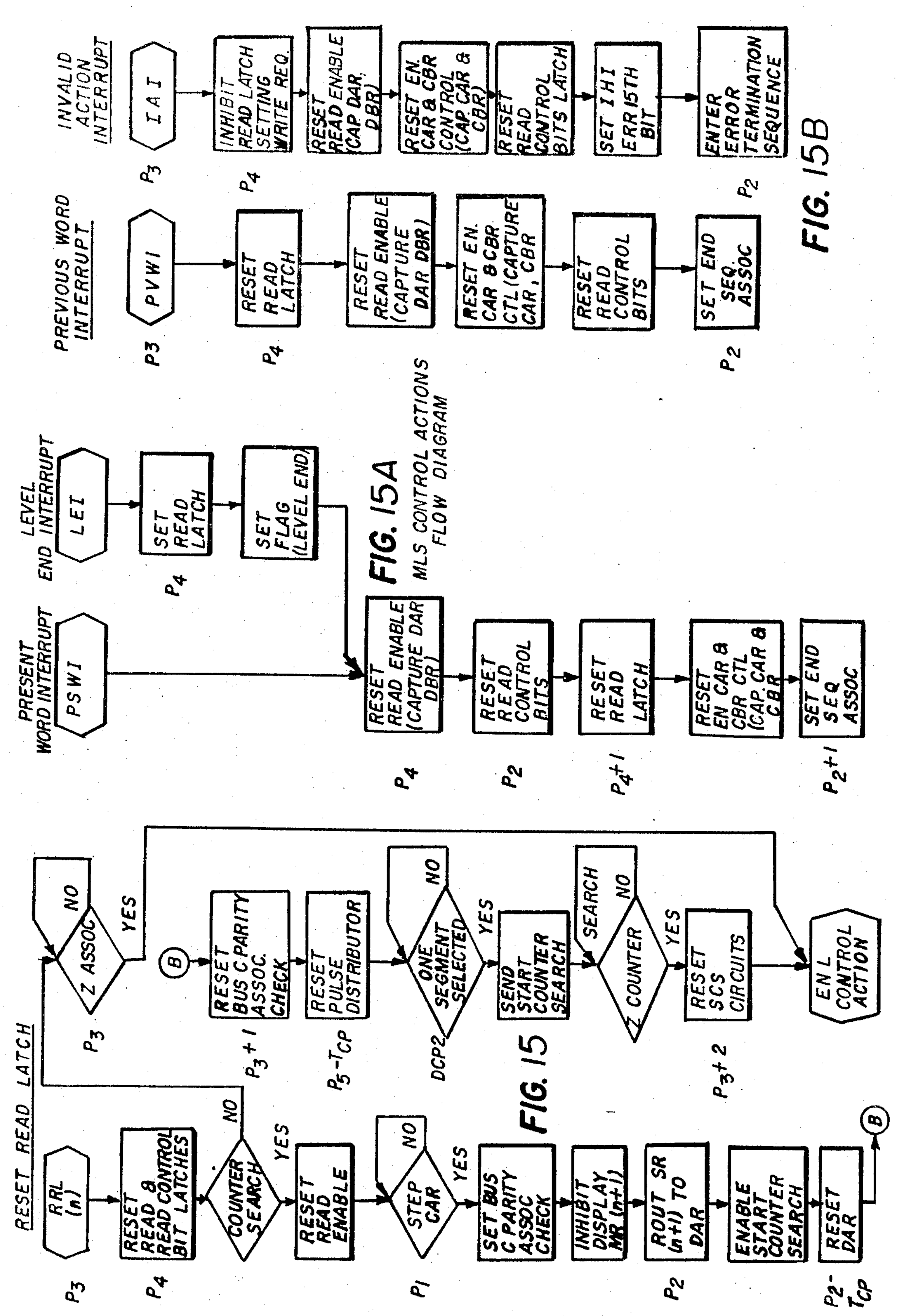
Figure 16:
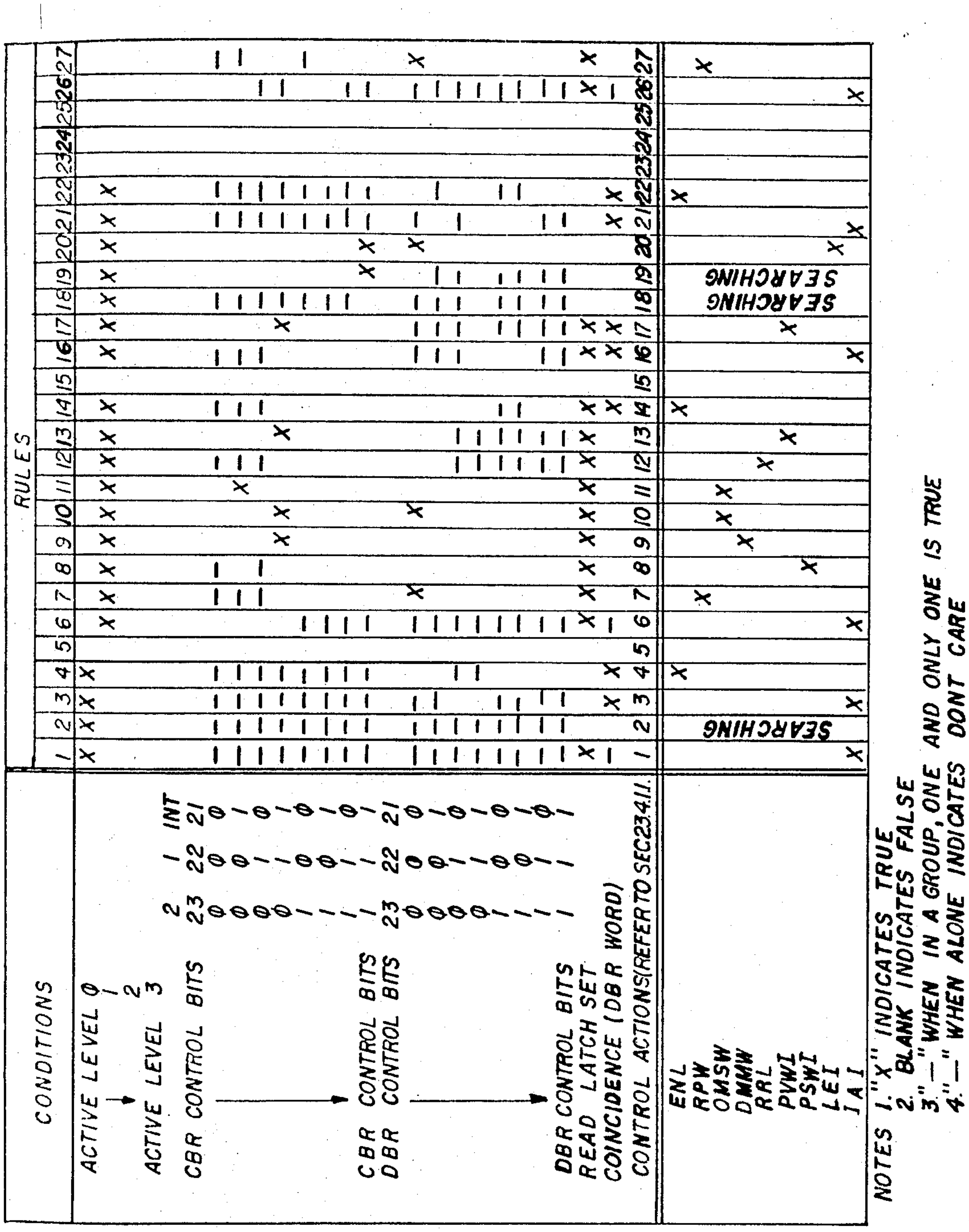

At this point, the operation of the MLS sequence is controlled by the MLS decision table FIG. 16 The MLS Sequence Decode circuit will decode the control action to be taken for each word transferred. This action will be decoded and loaded in the action register every P3 time. The Action Encode Multiplex initiates the appropriate control at the proper P time, refer to the control action flow charts of FIGS. 14 and 15

The following is a description of the nine actions which control the MLS transfer until entering the termination sequence.

These actions are decoded by the MLS Sequence Decode circuit and executed by the Action Encode Multiplex. The following is a list of the associative search control actions:

1. Enter Next Level (ENL)
2. Read Present Word (RPW)
3. Drum Modify Search Word (DMSW)
4. Drum Modify Mask Word (DMMW)
5. Reset Read Latch (RRL)
6. Previous Word Interrupt (PVWI)
7. Present Word Interrupt (PSWI)
8. Level End Interrupt (LEI)
9. Invalid Action Interrupt (IAI)

Figures 14, 14A, 14B:
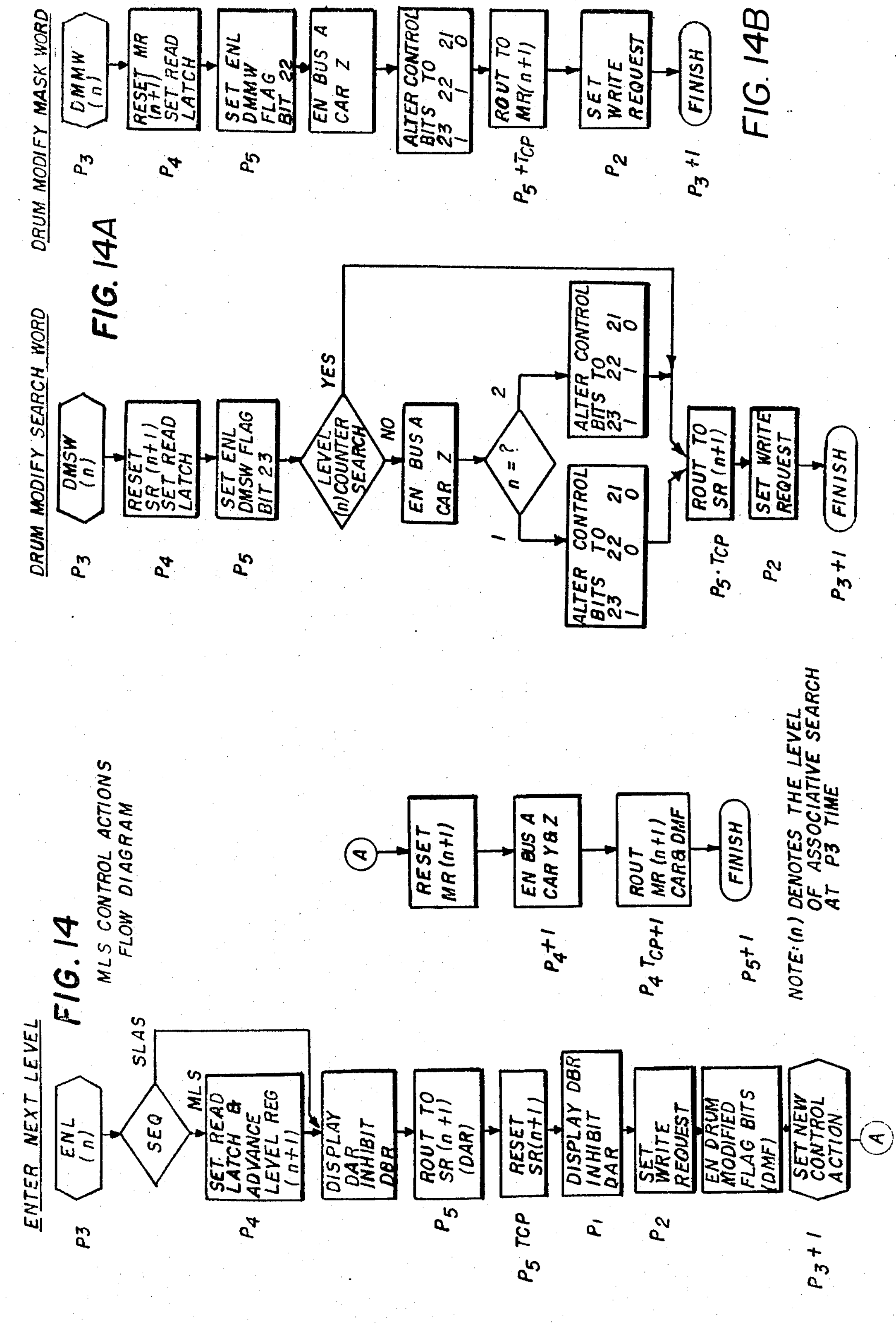
FIGS. 14, 14A, 14B, 15 and 15A and 15B comprise an MLS control actions flowchart for the drum memory system.

ENTER NEXT LEVEL, every new level is started by an ENL action at P3 time. This Decoded action will set the ENL latch refer to the ENL flow chart (FIG. 14). At P4 time the Read latch will be set. This will send a Core Write Request, via DCU Block Transfer Control, to write each succeeding word from drum into core. The Level Register will be advanced to $n+1$ (P4 trailing edge). The DAR, which will contain the address +8 of the word now in the DBR, will be displayed on bus A. Then at P5 time the DAR address will be loaded into SR ($n$), and at P1 time the DBR will be redisplayed on bus A. P2 will load the DBR into the CBR and set the Write Request latch. The modified search or mask register flag bits (23 and 22) will be enabled, so at P4+1 time the flag bits will be loaded in the MR along with the Core address of the coincidence word being written into Core. Bit 23 set indicates this level search register had been overwritten by the drum prior to ENL however, the drum can only overwrite level two and three search and mask registers. Bit 22 set indicates this level mask register has been overwritten prior to ENL control action. At P3+1 time a new action latch will be set and at P4+1 the MR will be loaded, as previously described and at P5+1 the ENL will be reset.

READ PRESENT WORD, there is no decode for the RPW action. If the read latch was set by the previous word control action and there is no present action decoded, the next P2 will set a write request and the present word will be written into core.

DRUM MODIFY SEARCH WORD. This action is the search word overwrite feature of the DCU. At P3 time the decoded action sets the DMSW action latch. At P4 time the next level search register is reset and the Read Latch is set. At P5 the modifying drum word is loaded into the next level SR with the proper control bit corrections. That is, if the next level search is a counter search the control bits of the drum word will not be altered (000), if ($n$) is level 1 and searching associatively the control bits will be changed to 100, and if ($n$) is level 2 and searching associatively the control bits will be altered to 110. At this time the DMSW flag bit will be set to be used for the next ENL action. P2 time a core write request will be set to write the modifying drum word into core. The control bits of this word will not be altered (000).

DRUM MODIFY MASK WORD. This action is similar to the DMSW with the exception of modifying the Mask Register and the control bits load into the MR will always be altered to 110.

RESET READ LATCH. This action will stop the transfer of data from drum to core and continue searching if the next level is associative coincidence. If the next level is to be entered via counter coincidence, this action must load the new drum address into the DAR and start the counter search on interlace one.

At P3 the RRL action is set. At P4 the Read latch is reset to stop transferring to core; also the Read Control Bits latch is reset, this is to avoid decoding any control action until detecting a coincidence word. If entering the next level is via associative coincidence, detecting Z assoc (coincidence) will set the ENL latch. This will complete the RRL action. If a counter search, P4 will reset Read Enable thus deactivating the DAC. After receiving Data Loaded from core and stepping CAR, Parity C AS will be set. This will permit checking bus C parity while loading the new DAR address during P2. At P5+1 time, the pulse distributor will be reset for interlace one searching. When the DAC has selected the new segment a Start Counter Search will be sent and the next level will be entered on Z counter.

PREVIOUS WORD INTERRUPT. This action will reset the Read latch, Read Enable, EN CAR CBR CTL, and Read Control Bits latch at P4 time. Resetting Read Enable will capture in the DAR the drum address +13 of the last word written into core. Resetting EN CAR CBR CTL will capture in the CBR the last word written in core. Then, P2 will activate the SET END SEQ AS lead and the DCU will enter the normal termination sequence.

PRESENT WORD INTERRUPT. This action will reset Read Enable on P4 which will capture in the DAR the drum address +8 of the last word to be written. This will also capture in the DBR the last word to be written in core. At P2 time the Read Control Bits latch will be reset and a write request will be issued to write this last word in core. During P4+1 the Read latch will be reset to halt issuing any further write requests also EN CAR CBR CTL will be reset which will capture in the CAR the core address of the last word in core and hold in the CBR the last word written in core. At P2+1 the DCU will enter the normal termination sequence.

LEVEL END INTERRUPT. This action is identical to PSWI control action mentioned above with the exceptions, at P4 time the Read latch is set and a level end flag is set in the Error/Status Word 18 bit 14. The Read Latch is set to write the present word (the DBR word) into core.

INVALID ACTION INTERRUPT. This control action will not reset the Read latch, but will inhibit initiating any further write request. The Read latch is an indicator bit in the Error/Status word 18 bit 20 which will indicate the status of transfer when the interrupt occurred. The DAR will capture the drum address +8 of the word held in the DBR. If interrupt occurred while writing core, the CBR will contain the word being written and the CAR will contain the address of the same word. If the DCU was searching at the time of interrupt, the CBR would not contain intuitively meaningful information, however the CAR will contain the location at which the next word would have been put into core. At P2 time the DCU will enter the Error Termination sequence.

2.2.2.2.3.4.2 SLAS Description.

The SLAS is a single level transfer in which the data is located via information coincidence and the size of transfer is specified by the initialization table in core.

Figure 13A:
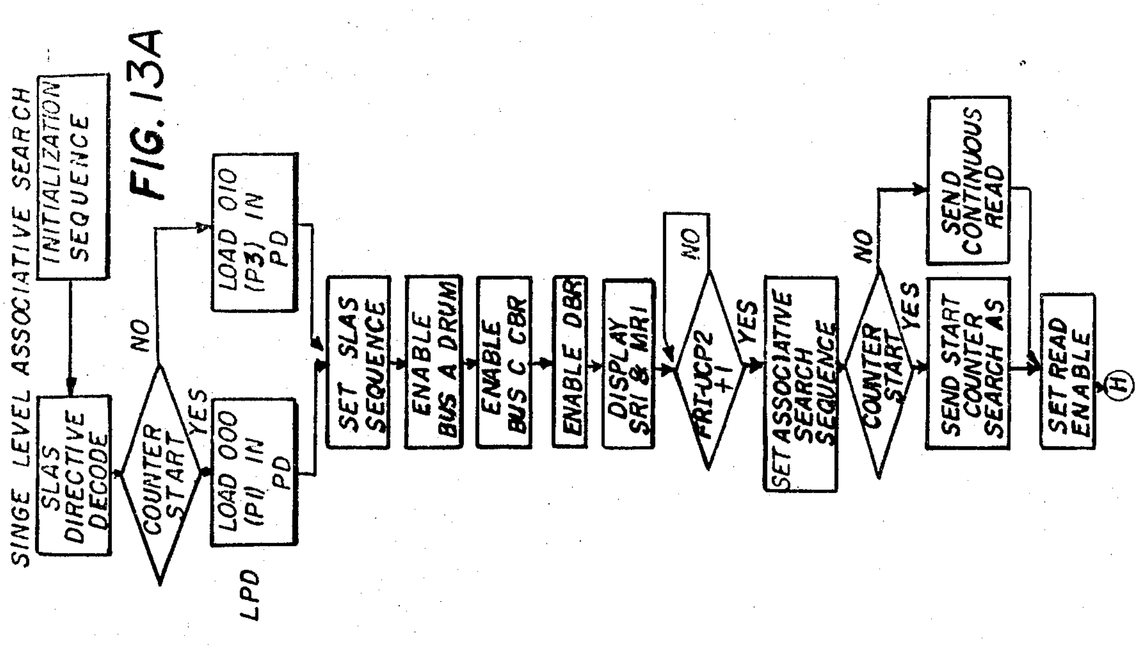
FIGS. 13 and 13A comprise an SLAS flowchart for the drum memory system.
Figure 13:
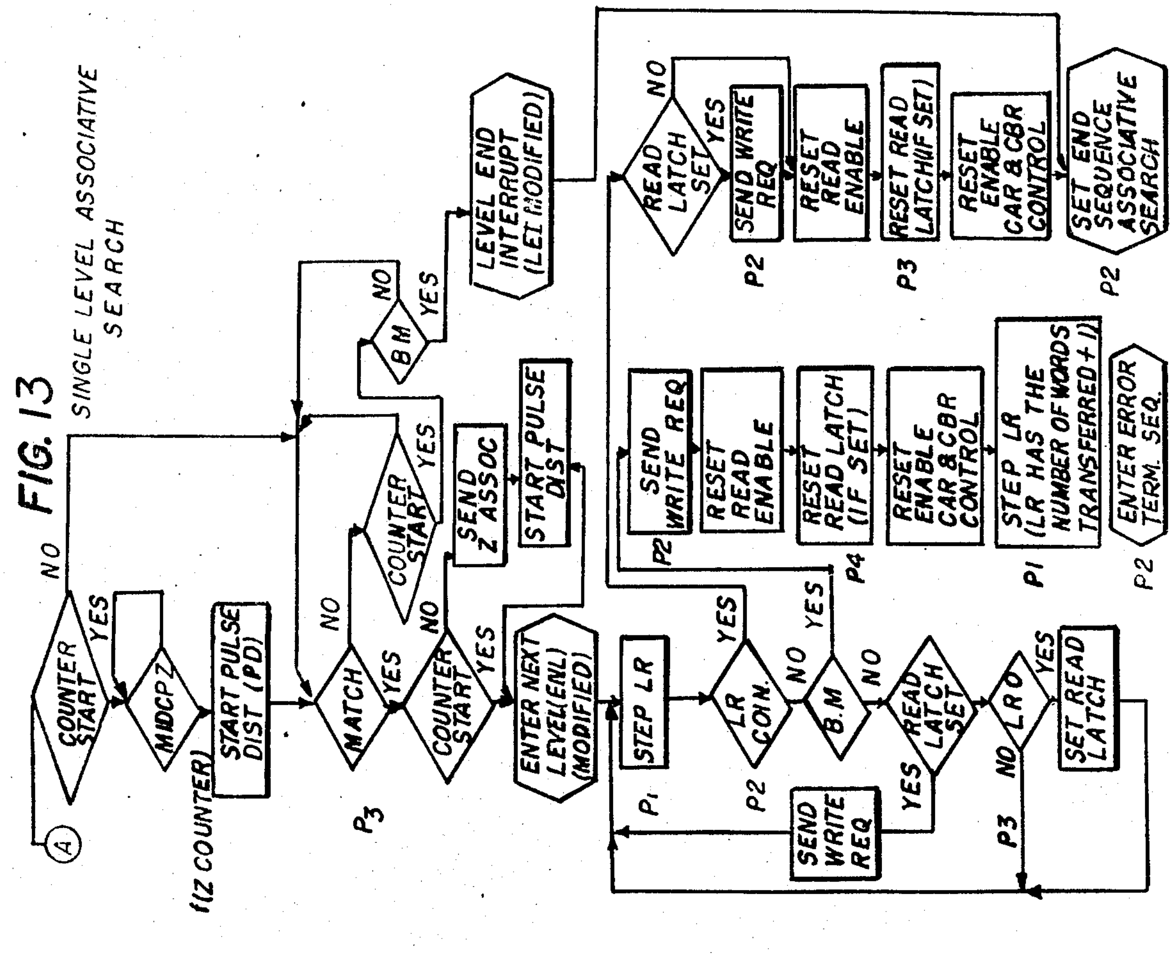

During the Initialization Sequence, the control registers are loaded with information necessary to perform a Single Level Associative Search (SLAS). The Instruction Register (IR) will contain the SLAS directive with or without a counter start (CS) and the WCT field which will specify the number of words to be transferred. The Limit Register will contain the complement of the number of words to be skipped (indexed) before transferring data. The first level Search and Mask registers will be loaded with the search information. The Core Address Register (CAR) will specify the address in core to start loading data. The Drum Address Register (DAR) will specify the segment to search and, if a counter start, specify the drum address to start associative searching, refer the SLAS flow diagram FIG. 13.

2.2.2.2.3.4.2.1 SLAS Operation

After the Initialization Sequence is completed, the SLAS sequence will be set. This will display the DBR on the DAC data bus, enable the drum data on bus A, display the CBR on bus C, and display the level one SR and MR on the match bus B, (refer to DCU Block Transfer and Associative Search Control diagrams FIGS. 8 and 11). This will also set the Read Enable and EN CAR CBR CTL latches.

If the SLAS is not a counter start (CS) sequence, the DCU will associatively search the data from drum, on interlace one. If a CS sequence, the DAC will search for the drum address specified by the DAR. Upon counter coincidence, the DCU will begin searching associatively on interlace five.

Upon obtaining information coincidence, the ENL control action (refer to FIG. 14) will be set. This will cause the coincidence word to be written into core and will step (increment) the limit register. Each word read from drum will now increment the LR. When the LR equals zero, the Read Latch will be set and all successive words will be written into core. This will continue until the LR equals the WCT field of the instruction register. LR, WCT coincidence will reset Read Enable, Read Latch, and the EN CAR CBR CTL latch, thus capturing the last word in core in the DBR and CBR. The DAR will capture the drum address +8 and the CAR will capture the core address of the last word in core. The SLAS sequence will then relinquish control to the normal termination sequence.

There is a Block Mark (BM) check for the SLAS sequence without CS. If bit 26 (BM bit) of bus A is true for the associative coincidence word or any succeeding word prior to the last word transferred, the SLAS BM error will be set. This will relinquish control to the Error Termination sequence and will cause an error interrupt.

2.2.2.2.3.5 Termination Sequence (TS)

The Termination Sequence is an automatic sequence of the DCU which occurs at the completion of a DCU process. The contents of the CAR are dumped into location 24 (bits 0 thru 14) of the Initialization Table (FIG. A of Appendix III).

After the dump, a DCU interrupt is set. If the DMS process was completed with no errors, the DCU Ready interrupt follows the Termination Sequence.

FIG. 8 shows the input control to the Termination Sequence as outputs from the End Sequence. The End Sequence is a transient state providing the hardware link between drum-core transfers and Termination.

It should be noted that a Termination Sequence which follows an Error Termination Sequence will also dump the low order bits of the IAR.

2.2.2.2.3.6 Error Termination Sequence (ETS)

When an error is detected the three error/status indicator words (E/S words) will be dumped into locations 18, 20, and 22 of the table giving details of the error and status of the DMS at the time of the error. The 5 low order bits of the LAR are captured into bits 15–19 of the CAR at the time of the error and are dumped into core by the normal termination sequence. A DCU Error Interrupt follows, and the DCU ERR/STATUS IN CORE sense line is set indicating a successful transfer of the error status indicator words in core.

(See FIG. 8). The status of the captured IAR bits in the CAR may be important for diagnostics depending upon when the error occurred. For example, the TS which follows an ETS from an error that occurred during initialization would reveal the last location of the table that was loaded into the DMS. An error during the execution of one of the data transfer directives causing the IAR to be captured would reveal the last entry read during initialization.

During a CPD Spill the captured IAR bits should display the state of the IAR just as the Error Termination Sequence is entered or 18 (10010), providing another check.

Figure 10A:
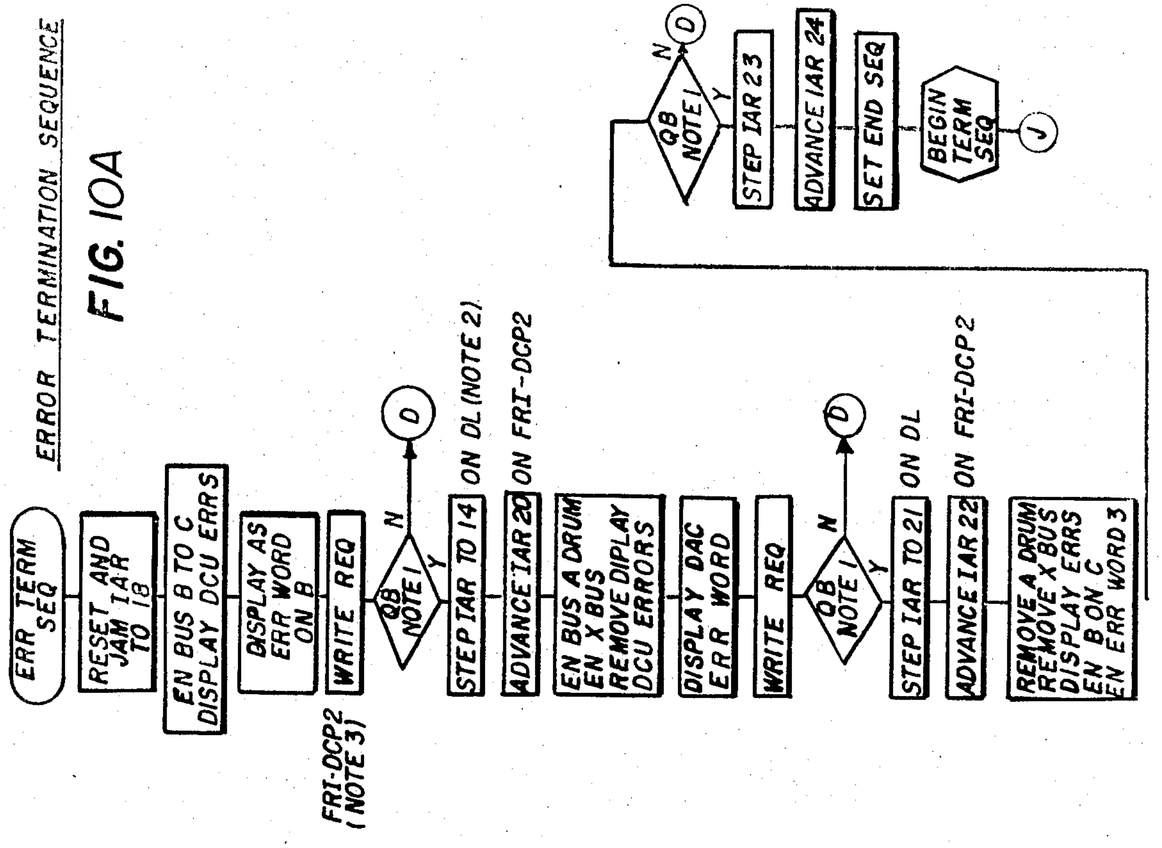
FIGS. 10 and 10A comprise a flowchart for termination sequence in the drum memory system.
Figure 10:
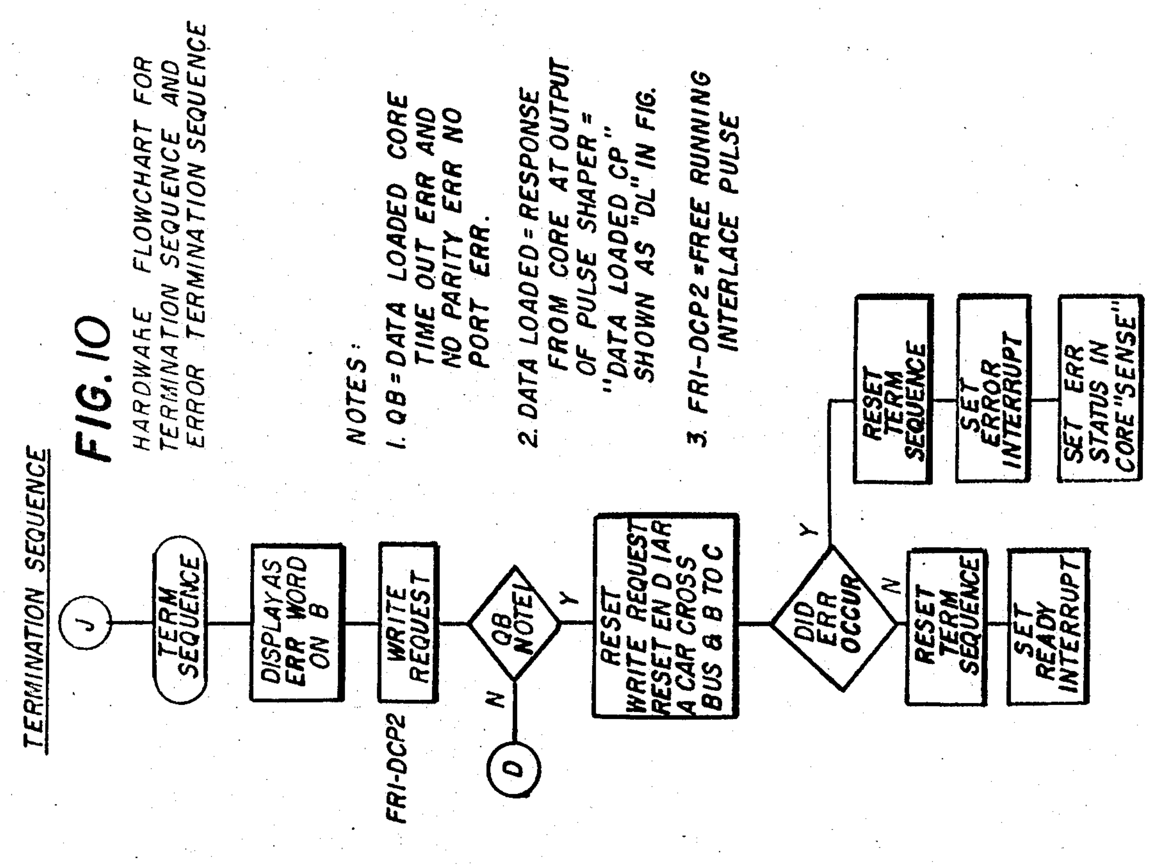

A hardware description of the TS and ETS is contained in the flow chart (FIG. 10). The notes along the flow chart functions indicate which DCU timing pulses cause the action in the boxes.

2.2.2.2.3.7 Forced Errors

The DCU has the hardware capability of checking some of its error detecting circuits. Certain bits of the E/S words will be set (1) if the particular detectors are working properly. This forced error routining of the DCU is possible thru the CPD.

2.2.2.2.3.8 Spill

Under the control of CPD (CPD Spill) the DCU can dump all registers (including E/S words) of the DMS into the initialization table - see the spill format shown in the right hand column of DMS, Appendix III.

2.2.3 INTERFACE

Figure 17:
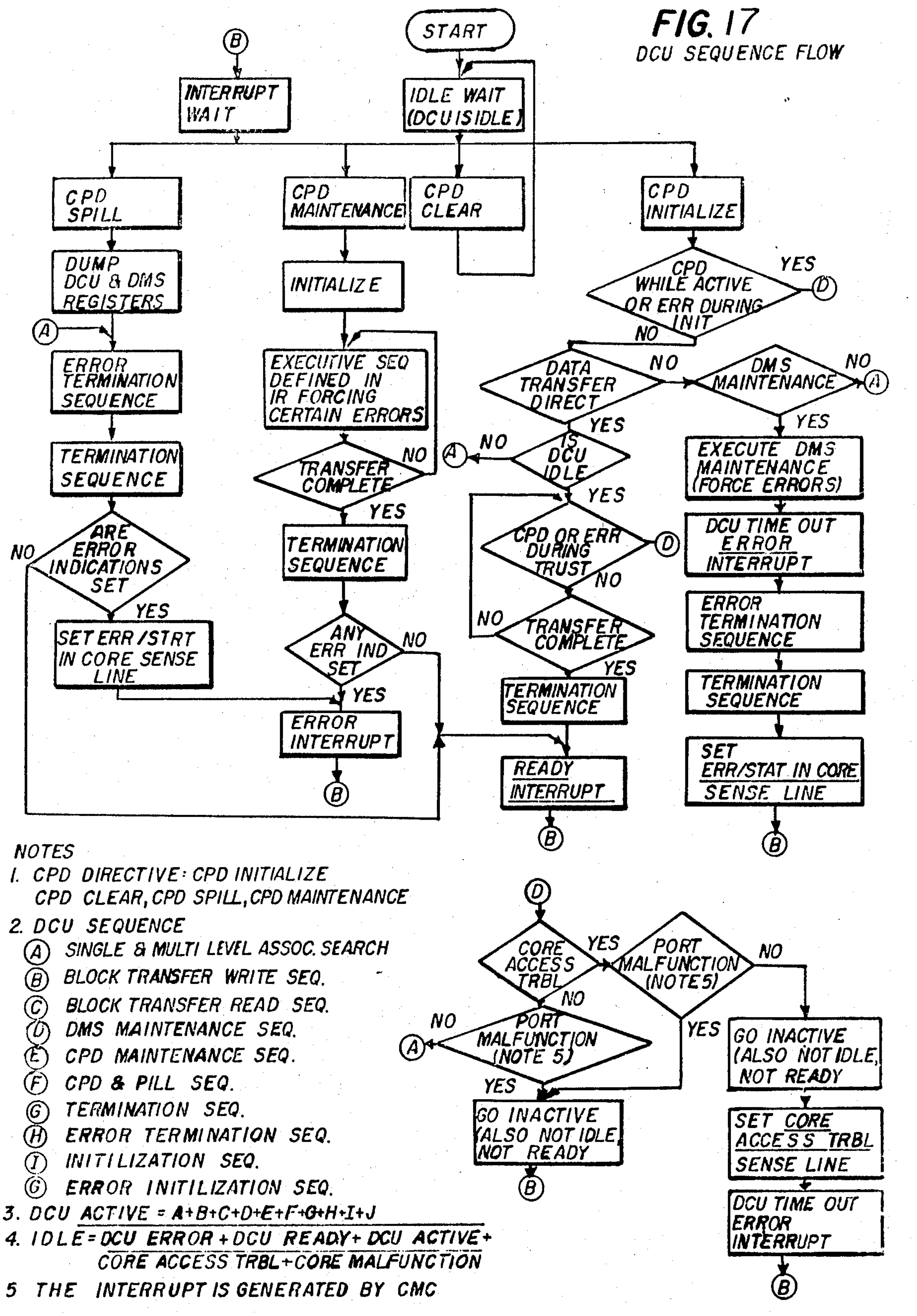
FIG. 17 is a DCU sequence flowchart for the drum memory system.

The following section will present the DMS from an interface point of view. The CPD control (interface with CCP) will be discussed in detail. Since sense lines reveal the states of the DCU, these states and a thorough analysis of the DCU sense and interrupt lines will be considered. The memory protect system and finally the core access characteristics of the DCU will be deliberated. Refer to FIG. 17 for access-response characteristics of the DCU.

2.2.3.1 CPD Directives (Control Pulse Directives)

The CPD lines interface with the CCP thru the CMC. There are four CPD commands. Two data and one CPD line sent to the DMS. The CPD clears or begins processing in the DMS.

2.2.3.1.1 CPD Clear (DL0=0, DL1=0)

This CPD completely clears the DMS. All registers except for the IAR, all error latches, all control and sequence circuits are reset. If the machine has successfully cleared, the DCU IDLE sense line will be set. No interrupt will occur. When the CPD pulse is removed, the machine will be cleared and the IDLE sense line may be checked.

Under normal conditions (no error) the CPD Clear should be issued when either the DCU READY or DCU ERROR sense line is set. The directive may, however, be issued while the DCU is active. In this event, the job will be aborted after the completion of the present core request. An Error Termination Sequence will follow and bit 21 word 22 in the ITE will be set. Termination will set the DCU ERROR interrupt. A CPD Clear may now be issued to clear the DMS. If the double CPD is used to abort DCU processing and the interrupt is not desired, the following sequence of instructions must be used:

1. Set Input Rest Register - Cause Port Malfunction
2. Reset Input Test Register - Restore Port
3. Reset Port on Line Register - Since the REI below will initiate DCU requests (ETS), the CMC must ignore the requests.
4. REI - Removes Port Malfunction
5. LLR 48 - Wait 24 microsec. for DCU Core Access Trouble to be set. Inhibits DCU Interrupt.
6. DMS CPD Clear - Reset DMS
7. Set Port on Line Register - Restore POLR.

2.2.3.1.2 CPD Initialize (DL0=1, DL1=0)

This CPD command begins initialization which is the process of loading the various registers in the DMS from an area in core called the Initialization Table (ITE, DMS, Appendix III). Each word is alternately copied back in core for parity checks. The even locations (left hand side of DMS, Appendix III) are read into the DMS registers and the odd locations are filled with a copy of the registers by writing back into core from the corresponding register of the DMS. The process follows an alternate read core-write core pattern.

Referring to FIGS. 6 and 8, the data is received over bus A, loaded in a register and placed on bus C (via bus B is required) and sent back to core. For the DAR, the cross transfer of bus A to bus B to bus C (see FIG. 8) is used to go from core to drum or from drum to core. In this manner, the integrity of the data, the DMS registers, and the DMS buses is checked by parity checking schemes in the DMS and CMC. If a parity error is detected in the DMS, the word is still copied back into core, but an attempt is made to correct the parity via (bit 24) at the output bus as it is written back in core. This way the core will always see correct parity, but a comparison between adjacent entries of the Initialization Table can be made in core to locate the erroneous bit if required.

During initialization, the complement of the core data is loaded into the LR; however, the actual uncomplemented value is copied back into core. The complement is loaded into the LR because this register will be decremented by the input clock pulses. The number of words read into the DMS registers (initialized) from the Initialization Table (ITE) and the time involved depends upon the directive in the IR as illustrated in the table below with reference to the ITE figure (DMS, Appendix III).

| | Register Loade in DMS | Locations read from ITE (DMS Appendix III) | Locations Written in ITE (DMS Appendix III) | Directive in LR (DMS Appendix II) | Execution Time micro-seconds |
|---|---|---|---|---|---|
| A | IR/LR | 0 | 1 | DAC Maint | 15 |
| B | A+λ<br>DAR+CAR | 0,2,4 | 1,3,5 | Block Trans | 45 |
| C | B+SR1+MR1 | B+6+8 | B+7+9 | Write or Read<br>SLAS | 90 |
| D | C+SR2+MR2<br>SR3+MR3 | C+10+12<br>+14+16 | C+11+13<br>+15+17 | MLS | 135 |

During this sequence the Initialization Sequence status bit of the error/status register of the DCU (Bit 0, word 22 in ITE) is set until the last register is loaded.

2.2.3.1.3 CPD Spill (DL.=., DL1=1)

When this CPD is issued all DCU and DAC registers are dumped into the odd locations of the initialization table, and the three error status indicator words are dumped into locations 18, 20 and 22. The CPD Spill command utilizes the Initialization Sequence with dummy reads, Error Termination Sequence, and the Termination Sequence. The CPD Spill format is shown in the right hand column of DMS Appendix III.

Location 23 should contain all zeros if there are no faults, indicating the quiescent state of buses B and C. When the CAR is dumped in location 24, bits 15–19 will contain the low order bits of the IAR. If the spill is successful, these bits should display 18 or

| Location 24 in ITE | 25 | 20 | 19 | 18 | 17 | 16 | 15 | 14 | CAR 0 |
|---|---|---|---|---|---|---|---|---|---|
| | | | 1 | 0 | 0 | 1 | 0 | | |

indicating the state of this register just as the Error Termination portion of the spill is entered. These bits have a different meaning when the CAR is dumped in location during the termination sequence of an error interrupt on DCU interrupts.

The meaning of the data dumped in the other locations is shown in the right hand column of DMS Appendix III. The CPD Spill takes 25 drum interlace periods or about 188 microsec.

2.2.3.1.4 CPD Maintenance (DI0=1, DL=1)

This CPD command can be used to check certain error detecting circuits of the DCU. When issued, the DMS will proceed as though a normal Initialize CPD was issued. After initialization, the instruction in the IR will be executed followed by normal termination.

The difference, however, is the DCU will be forced to detect certain errors. The error detectors will be set at the proper time during the CPD Maintenance Sequence but an Error Termination Sequence will not begin when the error occurs as would begin when an error occurs during any normal data transfer processing. This means that the indicator bits of the particular error detecting circuits being checked will not be automatically dumped into core as they normally are following an error. A CPD spill request is necessary to dump into core the words containing the error/status indicator bits (words 18, 20, and 22 of the Initialization Table). If the error detecting circuits are working, ones should be present for certain indicator bits depending upon which directive was in the IR when CPD Maintenance was issued. If at least one of the error detecting circuits has detected the simulated error, the spill will be followed by a DCU Error interrupt.

1. CPD Maintenance - Write Drum directive in IR. When CPD Maintenance is issued with a drum write directive in the IR, 6 indicator bits and one sense line should be set. The set indicator bits should be:
   1. DAC ERROR - bit 19 word 22 in ITE
   2. DAC PARITY - bit 5 word 20 in ITE
   3. BUS A PARITY - bit 22 word 22 in ITE
   4. BUS C PARITY - bit 23 word 22 in ITE
   5. PD SKEW - bit 22 word 18 in ITE
   6. READ TIME OUT ERROR - bit 12 word 22 in ITE The CORE ACCESS TRBL sense line will also be set because of the READ TIME OUT ERROR.
2. CPD Maintenance-Read Drum Directive in IR. With a read drum directive in the IR, the same error bits except for 1 and 2 above should be set.
3. CPD Maintenance - Other directive in IR. The CORE ACCESS TRBL sense line and READ TIME OUT ERROR (bit 12 word 22 in ITE) may be set by issuing a CPD Maintenance with a directive other than Read Drum or Write Drum in the IR.

The parity errors are detected by a technique of inhibiting three bits (21, 22 and 23) at the input bus (bus A). i.e., a word with correct parity from drum (core) may be used because the bad parity simulation takes place at the Data Bus A Multiplex circuit (FIG. 8). This approach eliminated the need to write bad parity in core or on drum since the bus A control for bits 21, 22 and 23 are handled separately because of Associative Search Requirements. It must be remembered; however; that bits 21, 22, and 23 of the known word as it exists in core or on drum must contain odd parity. Inhibiting them therefore causes even (bad parity in the DCU).

The execution time of CPD Maintenance is determined by the directive in the IR.

2.2.3.2 Sense Lines and Interrupts

The DMS contains 10 sense lines to interface with the CCP (thru the CMC). Two of these sense lines are interrupts. The DMS sense lines provide indications of the present state of the machine. They are used; 1) as an aid in diagnostics when the E/S words are not available and 2) to indicate present states of the DMS which could be necessary information to the CCP before and/or after certain action is taken involving the DMS.

2.2.3.2.1 DCU Interrupts

The two sense lines that interrupt the CCP are DCU READY AND DCU ERROR. The DCU Termination Sequence is followed by a DCU READY Interrupt if processing was successful (errorless). The DCU ERROR Interrupt is set indicating that an error or a CPD violation has been detected. A special case of the DCU ERROR interrupt is DCU TIME OUT detection.

The interrupts may be inhibited by the DCU ON LINE interface control from the CMC. In other words, the DMS may be accessed for normal processing but the interrupts will not be set.

2.2.3.2.2 DCU STATES

Table 1 below contains a summary of the basic states of the DMS. State (1) is the only state from which a data transfer directive may be issued. Tables 2 and 3 show other DMS States and are discussed in the sections on memory protect and core access problems.

TABLE 1

DCU STATES

| DCU State | Sense Lines DCU RDY | DCU ERR | DCU IDLE | Description |
|---|---|---|---|---|
| (1) | 0 | 0 | 1 | DMS is IDLE and READY for any CPD |
| (2) | 0 | 0 | 0 | MS is ACTIVE or QUIESCENT (see TABLE 2) |
| (3) | 1 | 0 | 0 | DMS has completed task. Waiting See (B) of FIG. 34. |
| (4) | 0 | 1 | 0 | An error was detected. Waiting See (B) of FIG. 34. |

TABLE 2

DCU STATES FROM CORE ACCESS PROBLEM

| PORT MAL-FUNCTION (ONE CMC) | PORT MAL-FUNCTION (OTHER CMC) | CORE ACCESS TRBL | DCU STATE | INTERRUPT SET BY | DCU TRBL | CMC TRBL | DCU TIME OUT |
|---|---|---|---|---|---|---|---|
| 1 | 1 | 0 | QUIESCENT | CMC | 1 | 0 | 0 |
| 1 | 0 | 0 | QUIESCENT | CMC | 0 | 1 | 0 |
| 0 | 1 | 0 | QUIESCENT | CMC | 0 | 1 | 0 |
| 0 | 0 | 1 | QUIESCENT then INTERRUPT | DCU | 1 | 0 | 1 |
| 1 | 0 | 1 | QUIESCENT | CMC | 0 | 1 | 0 |
| 0 | 1 | 1 | QUIESCENT | CMC | 0 | 1 | 0 |
| 1 | 1 | 1 | QUIESCENT | CMD | 1 | 0 | 0 |

TABLE 3

| DCU-CMC CONTROL Privileged Transfer | SENSE LINE Working With Table | MP BIT Memory Prot Bit 25 | IO AREAS Block Trans | IN Init | CORE Elsewhere |
|---|---|---|---|---|---|
| 0 | 0 | 0 | Yes | Yes | No |
| 0 | 0 | 1 | DCU ERROR | | |
| 0 | 1 | 0 | No | Yes | No |
| 0 | 1 | 1 | DCU ERROR | | |
| 1 | 0 | 0 | Yes | Yes | Yes |
| 1 | 0 | 1 | Yes | Yes | Yes |
| 1* | 1* | 0 | No | Yes | No) Impossible |
| 1* | 1* | 1 | No | Yes | No) |

*NOTE - last two entries are normally impossible 2.2.3.3 Memory Protect Scheme

Bit 25 of all the registers in the DMS is the memory protect bit defining protected or unprotected locations in core (bit set or not set respectively). Bit 1 of the IR sets hthe DCU in the privileged transfer mode.

In writing drum the memory protect bit 25 will be recorded as it comes from core. In reading the drum, when the privileged transfer bit (bit 19=0 in IR) is not set, an error will be detected when the drum word being read has a memory protect bit set. An Error Termination Sequence and a DCU ERROR interrupt will follow. The word will not be written into core. When the DCU is not privileged, only words with bit 25-0 may be written into core. In reading drum when the DCU is privileged, words will be written into core regardless of the status of the memory protect bit 25. Memory protection is extended further by the WORKING WITH TABLE sense line. This line is set when the DCU is reading or writing into the initialization table. The two areas in core reserved for data transfers from the DMS are the Initialization Table Area (32 or 64 words) and the Block Transfer Area 2000 words). Table 3 shows the locations in core that may be written for the various combinations of the "Privileged Transfer" control line, WORKING WITH TABLE sense line and Memory Protect bit 25. The NO entries in Table 3 imply that if an attempt is made to write in these core areas under these conditions, the error will be detected by the CMC.

The drum address of the last word transferred when a memory protect error occurs may be calculated. The word containing the memory protect violation will not be written into core.

DRUM ADDRESS OF LAST WORD TRANSFERRED = $DAR_{INITIAL} + 5(LR_{INITIAL} - LR_{FINAL} - 2)$

| | | |
|---|---|---|
| Where $DAR_{INITIAL}$ | = | location 2 of ITE |
| $LR_{INITIAL}$ | = | location 0 of ITE (bits 0–14) |
| $LR_{FINAL}$ | = | location 1 of ITE (bits 0–14) after CPD Spill |

2.2.3.4 Core Interface

The DMS is placed on line by the DCU ON LINE control signal from the CMC. This signal enables the DCU READY and DCU ERROR interrupt gates. To test the interface cables and cards all outputs to the CMC may be set to a logic 1 by the TEST CMC INPUTS control from the CMC. Core Address (15 bits and 1 parity) is provided over DCU bus D (FIG. 8). Twenty-six data bits are received from core via bus A and sent to core via bus C.

To read core, the DCU sets a CORE READ REQUEST. Within one interlace period the CMC will select the identifying DCU port and fetch the word at the location defined by the address on bus D of the DCU. When the data is available to the DCU, the CMC sends a DATA AVAILABLE PULSE.

To write core, the DCU sets a CORE WRITE REQUEST. Within one interlace period the CMC will write the data present on DCU bus C at the core location defined by the address on DCU bus D. When complete, the CMC responds with a DATA LOADED PULSE.

2.2.3.5 Maintenance 2.2.3.5.1 DCU Error Status Indicators (E/S words).

The following section describes each bit of the three E/S words. The description indicates when each bit is set and reset, drum location and other register status when applicable.

2.2.3.5.1.1 DCU E/S Indicator Word 22

The following is a description of the error/status indicator bits of the DCU indicator word 22.

Bit 0 Initialization Sequence (Init. Seq. Ind).

Bit 0 is set in the DCU only when the DCU is in its initialization sequence, Bit 0 in the initialization table indicates an error was detected during the initialization sequence.

Bit 1 Error Initialization Sequence (Err Init Seq Status).

Bit 1 is set in the DCU when it has been issued a CPD initialize command while in an error interrupt state (DCU ERROR interrupt set). Bit 1 is reset when the ets begins. It must always be reset in the ITE.

Bit 2 Write Sequence (Write Seq Ind).

Bit 2 is set in the DCU is reading from core and writing on drum. Bit 2 set in the initialization table indicates an error was detected during the Write Sequence for these conditions the LR contains the number of words −2 remaining to be written on drum.

Bit 3 Read Sequence (Read Seq Ind).

Bit 3 is set in the DCU when it is reading from drum and writing into core. If set in the initialization table, an error was detected during the Read Sequence. The LR contains the number of words −1 remaining to be written into core.

Bit 4 Single Level Associative Search (SLAS Ind).

Bit 4 is set in the DCU when it is in the SLAS sequence. If an error occurs during this sequence bit 4 will be set in the initialization table in core.

Bit 5 Multi Level Associative Search (MLS Ind)

Bit 5 is set in the DCU when it is in the MLS sequence. If an error occurs during this sequence, bit 5 will be set in the initialization table in core.

Bit 6 Termination Sequence (Term Seq Ind).

Bit 6 is set in the DCU during the Termination Sequence. This bit must always be reset in the ITE.

Bit 7 Error Termination Sequence (ETS Ind)

This bit is set in the DCU, when the machine is dumping the three E/S words into locations 18, 20 and 22 of the initialization table. The bit should be set in the core table.

Bit 8 CPD Spill (CPD Spill Ind)

The CPD Spill bit is set when CPD requests a dump of all registers and E/S words of the DMS into core. This bit is provided to inform the operator that a CPD spill was requested.

Bit 9 CPD Maintenance (CPD Maint Ind).

Bit 9 is set in the DCU when the CPD Maintenance Directive is issued. This bit remains set until the next CPD clear is issued. In other words this bit will be set (written) in core by a CPD spill following CPD Maintenance.

Bit 10 Maintenance Sequence (Maint Seq Ind).

Bit 10 is set in the DCU when it begins executing the DAC Maintenance directive specified in the IR.

Bit 11 Write Block Mark. (Write BM Ind).

This bit is set in the DCU during the Write Sequence when the last word is written on drum. This bit must always be reset in the ITE.

Bit 12 Read Time Out Error (RTOE Err).

This bit indicates that response to a CORE READ REQUEST was not received in the proper time.

Bit 13 Begin Error Termination Sequence (BETS Ind).

This bit is set in the DCU whenever an error is detected. The bit is set in the initialization table if the E/S word dump was preceded by a detected error, as opposed to a CPD spill request and no existing errors.

Bit 14 ( − ) En A/D to Core.

When bit 14 is reset in the DCU, bus A, C, and D are enabled for a drum read. This bit should always be set in the E/S words of the initialization table.

Bit 15 ( − ) En A/D to Drum.

When this bit is reset in the DCU, bus A, C, and D are enabled for a drum write. See bit 14.

Bit 16 DCU Time Out (DCU Time Out Ind).

Bit 16 indicates that a 23 drum revolution time period (approx. 385 ms) has elapsed between a CPD command and a DCU interrupt. The Selected Counter in the PA is captured and loaded into the DAR when the time out occurs.

Bit 17 Memory Protect Error (MP Err Ind).

Bit 17 is set in the initialization table when an unprivileged DCU attempts to transfer (read a protected word from drum to core). The word causing the error is frozen in the DBR and does not get written into core. The number of words transferred =

$$LR_I - LF_f - 1$$

The drum address of the word containing the error may be found by $$DA + 5\ (LR_I - LR_f - 1) \text{ where}$$

DA = initial drum address $LR_I$ = initial contents of LR $LR_f$ = final contents of LR The CAR contains the core address or core +1 of the last word written in core.

Bit 18 Block Mark Error - SLCS (BM Err SLCS Ind)

Bit 18 is set in the initialization table when the conditions below do not occur simultaneously during a read drum sequence:

1. LR = 0
2. Block Mark Bit = 1

The word in the CBR when the error is detected is frozen and written into core. The drum address of this word may be found:

$$DA + 5\ (LR_I - LR_f - 2)$$

The number of words transferred =

$$LR_I - LR_f - 1$$

(See bit 17 for definition of terms) The CAR contains the core address or core address +1 of the last word written in core.

Bit 19 DAC Error (DAC Error (DAC Err Ind)

The Drum Access Circuit Error Indicator is set in the initialization table when an error is detected in the PA or drum access circuits. (See E/S word 20)

Bit 20 Initialization Error (Init Err Ind).

Bit 20 is set of the DCU is initialized with a data transfer directive in the IR and the DCU is in the READY or ERROR interrupt state.

Bit 21 CPD Error (CPD Err Ind)

CPD Error is set in their initialization table when the DCU receives a CPD during a DCU active mode (processing). Where the LR is used the number of words transferred may be found by:

$$LR_I - LF_f - 1$$

Bit 22 Bus A Parity (Bus A Par Err Ind).

Bit 22 is set when even parity is detected at Bus A (input bus). During a SLCS drum read, bus A parity error will freeze the word in the DBR and its drum address + 12 will be loaded into the DAR. The word will be parity corrected at bus C and written into core. The CAR contains the core address or core address + 1 of the word written into core. The number of words transferred may be found by:

$$LR_I - LR_f - 1$$

When writing drum, bus A parity checks the word from core. An error will freeze the word in the CBR and the word will not be written on drum. The CAR contains the address + 1 of the error detected word. The number of words transferred to drum may be found by:

$$LR_I - LR_f - 2$$

Bit 23 Bus C Parity (Bus C Par Err Ind).

Bit 23 is set when even parity is detected at Bus C (output bus). During a SLCS drum read, bus C parity error will freeze the word in the DBR and its drum address + 12 will be loaded into the DAR. The word is parity corrected at bus C and written into core. The CAR contains the core address or the core address + 1 of the word written into core. The number of words transferred may be found by:

$$LR_I - LR_f - 1$$

When writing drum, bus C parity error freezes the word in the CBR, and the word will not be written on drum. The CAR contains the core address + 1 of the error detected word. The number of words transferred to drum may be found by:

$$LR_1 - LR_f - 2$$

2.2.3.5.1.2 DCU E/S Indicator Word 18

The following is a description of the error/status indicator bits of the DCU indicator word 18.

Bit 0

The Previous Word Interrupt bit (PVWI STAT) is set during the PVWI action for the MLS sequence. If an error occurs at this time bit 0 will be set in the initialization table (ITE).

Bit 1

The present Word Interrupt bit (PSWI STAT) is set for one interlace cycle ($P_3$ to $P_3$+1) during the PSWI action of the MLS sequence. If an error occurs at this time bit 1 will be set in the initialization table (ITE).

Bit 2

The Level End Interrupt Bit (LEI STAT) is for one interlace cycle ($P_3$ to $P_3$+1) during the LEI action of the MLS sequence. If an error occurs at this time bit 2 will be set in the initialization table (ITE).

Bit 3

The Invalid Action Interrupt bit (LAI STAT) is set during the IAI action of the MLS sequence. This action is an error condition, and the DCU will enter the Error Termination Sequence (ETS) and bit 3 will be set in the ITE.

Bit 4

The Enter Next Level bit (ENL STAT) is set for one interlace cycle ($P_3$ to $P_3$+1) during the ENL action of the MLS sequence. If an error occurs at this time bit 4 will be set in the ITE.

Bit 5

The drum Modify Mark Register bit (DMMR STAT) is set during the DMMW action of the MLS sequence. If an error occurs at this time bit 5 will be set in the ITE.

Bit 6

The Drum Modify Search Register Bit (DMSR STAT) is set during the DMSW action of the MLS sequence. If an error occurs at this time bit 5 will be set in the ITE.

Bit 7

The Reset Read Latch bit (RRL STAT) is set for one interlace cycle ($P_3$ to $P_3+1$) of the RRL action of the MLS sequence. If an error occurs at this time bit 7 will be set in the ITE.

Bit 8

Level 2 or level 3 bit ($L_2+L_3$), this bit is set when the DCU is in the level 2 or level 3 of the MLS Sequence. If an error occurs while in either level bit 8 will be set in the ITE. If a CPD spill is initiated after an MLS sequence and this bit becomes set in the ITE, the MLS sequence terminated in level 2 or level 3. To determine which level, it is necessary to refer also to bit 9 of E/S word 18.

Bit 9

Level 1 or Level 3 bit ($L_1+L_3$), this bit functions the same as the preceding bit 8 except, bit 9 indicates the MLS sequence terminated in level 1 or 3.

Bit 10

The drum Modify Mask Word bit (DMMW BIT) is set if the drum has overwritten the mask register, and will remain set until the DCU enters the next level of MLS sequence. If an error occurred during this time bit 11 will be set in the ITE.

Bit 11

The drum Modify Mask Word bit (DMMW BIT) is set if the drum has overwritten the mask register, and will remain set until the DCU enters the next level of MLS sequence. If an error occurred during this time bit 11 will be set in the ITE.

Bit 12

The Drum Modify Search Word bit (DMSW BIT) is set if the drum has overwritten the search register, and will remain set until the DCU enters the next level of MLS sequence. If an error occurred during this time bit 12 will be set in the ITE.

Bit 13

The Read Control Bits bit (READ CTL BITS) is set when the MLS sequence is scanning the CBR and DBR control bits (21–23). The scanning of control bits starts with coincidence to enter a level and continues until a reset read latch or interrupt action is entered. This bit 13 must always be 0 in the ITE.

Bit 14

The Level End Interrupt Flag bit (LEIF) is set when level 1 or 2 coincidence cannot be found for a MLS sequence. This bit will also be set if, for a SLAS or MLS sequence with a counter start, a block mark is detected after counter coincidence (Z counter) and prior to associative coincidence (Z assoc.).

Bit 15

The Pulse Distributor Bit 1 (PAD BIT 1) is set for the counts of $P_2$ and $P_4$ but must always be 0 in the ITE.

Bit 16

The Pulse Distributor Bit 2 (INTERL STRAP 6) is set for the counts of $P_3$ and $P_4$, but must always be 0 in the ITE.

Bit 17

The Pulse Distributor Bit 3 (PD BIT 3) is set for the count of $P_5$, but must always be 0 in the ITE.

Bit 18

The Associative Search Sequence bit (ASSEQ) is set when the DCU is in a SLAS or MLS sequence, but bit 18 must always be 0 in the ITE.

Bit 19

The Distributor Enable bit (DIST EN) is set when the Pulse Distributor is enabled, but bit 19 must always be 0 in the ITE.

Bit 20

The Invalid Action Interrupt Error bit (IAI ERROR) is set if there is an invalid combination of control bits, read latch status, coincidence status, and MLS sequence level. This invalid combination will cause an error interrupt and bit 20 in the ITE will be set.

Bit 21

The Block Mark Error bit (BM ERROR BIT) is set if the DCU is performing a SLAS counter start sequence and a block mark is detected after associative coincidence and before the last word of the transfer. This error will cause an error interrupt and bit 21 in the ITE will be set.

Bit 22

The Pulse Distributor Skew bit (PD SKEW) is set when the pulse distributor and the DAC interlace counter are not in synchronization. This will cause an error interrupt and bit 22 in the ITE will be set.

Bit 23

The Invalid Code bit (INVALID OP) is true when the OP Code field of the instruction register is invalid. This will cause an error interrupt and bit 23 in the ITE will be set.

2.2.3.5.2 DAC Error/Status Indicators

A 24 bit word for storing a record of the operational status of the DAC circuitry has been assigned to the DAC. This word will be stored at address 20 of the Initialization Table as a result of a DCU error termination sequence of a CPD spill. These 24 bits indicate the status of 19 error detectors and 5 status monitoring points in the DAC. A bit set to 1 denotes the true condition in all cases. Bits 0 through 8 are assigned to Peripheral Adapter; bits 9 through 15 are assigned to the Clock Circuits; bit 16 indicates Block Mark status for the word currently in the DBR; and bits 17 through 23 are assigned to the Recording Circuits. A description of each indicator bit follows.

2.2.3.5.2.1 DAC Error Detector and Status Indicator Descriptions

Bit 0 - Mode Error

Indicates a discrepancy between the RWI bit of the Drum Address Register (DAR) and the directive in the instruction register, the error latch will be set on the trailing edge of the first DCP1 after READ ENABLE or WRITE ENABLE (from DCU becomes true).

Bit 1 - Invalid Segment Error

Indicates that an attempt has been made to select a segment that is not assigned to that particular DCU. The error latch will be set when ROUTE TO DAR is sent from the DCU to the PA. DAC ERROR will not be enabled until READ ENABLE or WRITE ENABLE becomes true.

Bit 2 - Protected Segment Error

Indicates that an attempt has been made to write in a read only segment. The error latch will be set when WRITE ENABLE becomes true. This error indication can be inhibited by operating a manual switch which is mounted on the Segment Decode card.

Bit 3 - Binary Counter Error

Detects a binary counter failure or the absence of counter clock or reset pulses. The error latch will be set on the first Drum Reset pulse (DRP) after the error occurs. DAC ERROR will not be enabled until READ ENABLE or WRITE ENABLE becomes true.

Bit 4 - BCD Counter Error

Detects a BCD counter failure or the absence of counter clock or reset pulses. The error latch will be set on the first Drum Reset Pulse (DRP) after the error occurs. DAC ERROR will not be enabled until READ ENABLE or WRITE ENABLE becomes true.

Bit 5 - DAC Parity Error

Detects a parity error in the data in the Drum Buffer Register (DBR). The error latch will be set appr. 450 ns after the word is loaded into the DBR. The count sent to the Drum Address Register (DAR) when the error occurs will be the data words address + 8 for a write operation.

Bit 6 - Route Error

The error occurs if 1. a Route to DAR is sent while the PA is active
2. a Route to DBR is sent while the PA is inactive. The error latch will be set on one of these two signals depending upon the fault location.

Bit 7 - PA Active

PA Active is a storage element which is set when the PA is transferring data to or from the Drum. It is set by either counter coincidence (Z COUNTER) or associative search coincidence (Z ASSOC) and is reset at the end of a transfer when the DCU drops READ ENABLE or WRITE ENABLE.

Bit 8 - Enable Binary Capture

This storage element indicates which counter is transferred to the address bits of the DAR. If set, the binary count is sent to the DAR at the appropriate times; if reset, the BCD count will be sent to the DAR. It is set by ROUTE TO DAR · $\overline{\text{DAR22}}$ or a DAC Parity Error. It is reset by ROUTE TO DAR · DAR22.

Bit 9 - Auxiliary MRP 1 Error

Detects an absence of DRP pulses. The error latch which is set during a master MRP, enables DMS Clock Track Error which causes an immediate DCU Error Interrupt.

Bit 10 - Auxiliary MRP 2 Error same as Aux. MRP 1 Error.

Bit 11 - Auxiliary DIP 1 Error

Detects the absence of Drum Index Pulses (DIP). The error can occur randomly. The latch will be set immediately, enabling DMS Clock Track Error.

Bit 12 - Auxiliary DIP 2 Error

Same as Aux. DIP 1 Error.

Bit 13 - Drum Speed Error

Detects when the drum speed drops below an operable level. The latch will set immediately, enabling DMS Clock Track Error.

Bit 14 - Master Track Error

Detects the absence of master MRP. The detector circuitry checks for the presence of an MRP for each auxiliary DRP. This detector will also be set by the absence of a DIP. This Error does not cause DMS Clock Track Error.

Bit 15 - DIP Skew Error

Detects skew between the auxiliary DIP tracks. The error can occur randomly and does not cause a DMS Clock Track Error.

Bit 16 - BM 26 DCU/WR

This indicator denotes the status of the Block Mark bit of the word currently in the DBR. A 1 specifies that the BM bit is set. The indicator is set or reset each time a word is loaded into the DBR.

Bit 17 - Head Select Input Error

This detector is set by a 1 - out - of 18 circuit which monitors the segment select input to the Memory Protect Circuit and is set if none or more than one segment has been selected. The error latch will be set appr. 15 microsec after ROUTE TO DAR and before READ ENABLE or WRITE ENABLE becomes true.

Bit 18 - Head Select Output Error

Same as Head Select Input Error except the monitor point is at the output of the Memory Protect Circuit.

Bit 19 - Access Circuit Error

The error is detected on the DAC Write/Read Control Circuit and is gated in the PA so that DAC ERROR is not enabled until READ ENABLE becomes true.

Bit 20 - Write Control Error

Checks the integrity of write control signals to the write/read circuits. The error signal is gated in the PA.

Bit 21 - MPC Write Inhibit

This detector does not cause DAC ERROR directly. The signal sent to the DAC ERROR gate is MPC ERROR which cannot become true until either READ ENABLE or WRITE ENABLE becomes true.

Bit 22

Power Supply or Drum Speed Error Gated in the PA so DAC ERROR does not become true until READ ENABLE or WRITE ENABLE becomes true.

Bit 23 - +5V Redund Error

Monitors the redundant power supply of the Memory Protect Circuit. The error signal is gated in the PA.

2.2.3.5.2.2 DAC Forced Error Checks

Simulated faults are forced into the DAC via an instruction register directive called DAC Maintenance. Ten simulated faults and a transfer feature are initiated by the same directive. The simulated faults provide a means of checking DAC error detectors that cannot be checked by forcing software errors. The clock transfer causes the alternate auxiliary clock track to be switched on-line and does not cause an error.

The first entry in the Initialization Table provides all the control and data information required for DAC maintenance. The format is shown below.

| 23 20 | 18 | 17 | 16 | 5 11 | 10 | 9 5 | 4 0 |
|---|---|---|---|---|---|---|---|
| 1001 1001 | RCD | CLK | PA | RECORDING CKTS | CT | CLOCK CKTS | PA CKTS |

Bits 0 through 15, except for the clock transfer bit (10), are error simulator bits. They are divided into three groups, the peripheral adapter, the clock circuits and the recording circuits. A logic 1 in bit 16, 17 or 18 will cause the circuitry to enable the appropriate group of simulator bits. It is possible to enable more than one group simultaneously or more than one error simulator within a group simultaneously. When writing programs, care will have to be taken to insure that only those bits associated with the fault to be simulated are set to logic 1. All others should be at logic 0.Bits 20 through 23 form the instruction word directive which sets up the DCU circuitry for a DAC maintenance operation.

The DAC maintenance directive is initiated by DCU Initialization CPD. After the first entry in the Initialization Table has been written into the Instruction Register of the DCU, bits 20 through 23 are decoded.

After recognizing the decoded directive as DAC maintenance, the DCU sends Instruction Register bits 0 through 18 and an enabling pulse (ROUTE ERR SIM) to the Error Simulator Circuit of the DAC. If bit 16, 17 or 18 is at logic 1 and one of the error simulator bits is also at logic 1, the Error Simulator Circuit will force a simulated fault in the appropriate circuit. For example, if bits 16 and 0 are at logic 1, the INHIBIT DRP error simulator signal will inhibit the resetting of the address counters after the maximum count (10,998) has been reached. This will cause the counter error detectors to be set. An error detector being set will cause DAC Error to be sent to the DCU, resulting in a DCU error interrupt. The DCU will go through its error termination sequence. Word 20 of the Initialization Table, the DAC error indicators, will be checked to see if the appropriate indicators were set. If so, it can be assumed that the detectors functioned properly.

The signal that forces the simulated fault will remain at a constant level until reset by the CPD CLEAR. If more than one error detector is to be checked in sequence, the DCU will be reinitialized for each individual test.

Error simulator signals, instruction register bits that must be set for each, and the word 20 indicator bits that will be set as a result of the simulated fault are listed on the next page.

DAC MAINTENANCE ERROR SIMULATOR LISTING

| FAULT SIMULATOR LEAD NAME | INSTRUCTION REGISTER BITS SET TO LOGIC 1 | ERROR DETECTORS SET AS RESULT OF SIMULATED FAULT | COMMENTS |
|---|---|---|---|
| INHIBIT DRB | 16, 0 | DAC ERR 3 — BIN CTR ERR<br>DAC ERR 4 — BCD CTR ERR | INHIBITS RESET OF PA ADDRESS COUNTERS. |
| HOLD CTR RST | 16, 1 | DAC ERR 3 — BIN CTR ERR<br>DAC ERR 4 — BCD CTR ERR | HOLDS PA ADDRESS COUNTERS IN A RESET STATE. |
| ADVANCE COUNT | 16, 2 | DAC ERR 3 — BIN CTR ERR<br>DAC ERR 4 — BCD CTR ERR | FORCES ADDRESS COUNTERS TO REACH MAX. COUNT EARLY. |
| DECODE INHIBIT | 16, 3 | DAC ERR 3 — BIN CTR ERR<br>DAC ERR 4 — BCD CTR ERR | SIMULATES THE EFFECT OF MISSING COUNTER CLOCK PULSES. |
| MRP ERR SIM | 17, 6 | DAC ERR 14 — MASTER TRK ERR<br>(DAC ERR 9 — AUX MRP 1 ERR + DAC ERR 10 — AUX MRP 2 ERR) | ERROR WILL BE FORCED ON WHICHEVER TRACK IS ON-LINE THE FORCED ERROR WILL CAUSE A CLOCK TRANSFER. |
| DIP ERR SIM | 17, 7 | DAC ERR 14 — MASTER TRK ERR<br>(DAC ERR 11 — AUX DIP 1 ERR + DAC ERR 12 — AUX DIP 2 ERR) | ERROR WILL BE FORCED ON WHICHEVER TRACK IS ON-LINE. THE FORCED ERROR WILL CAUSE A CLOCK TRANSFER. |
| SPEED/SKEW SIM | 17, 8 | DAC ERR 13 — DRUM SPEED ERR<br>DAC ERR 15 — DIP SKEW ERR<br>DAC ERR 22 — PS DRUM SPD ERR | |
| TRANSFER CLOCK | 17, 10 | none | 500 NSEC. TRANSFER CLOCK PULSE. |
| FAIL TEST INPUT | 18, 11 | DAC ERR 17 — HS INPUT ERR | FORCES ERROR IN 1 OUT OF 18 DETECTOR MONITORING SEGMENT SELECT CKT OUTPUTS. |
| FAIL TEST OUT | 18, 12 | DAC ERR 18 — HS OUTPUT ERR<br>DAC ERR 19 — ACCESS CKT ERR | FORCES ERROR IN 1 OUT OF 18 DETECTOR MONITORING HEAD SELECT CKT OUPTUTS. |
| MPC FAIL SIM | 18, 13 | DAC ERR 22 — PS DRUM SPD ERR<br>DAC ERR 19 — ACCESS CKT ERR | |

2.2.3.5.3 DCU Time Out

The DCU Time Out sense line causes the DCU ERROR interrupt and indicates that DMS processing cannot continue because of a hardware or software error not covered by the detection circuits. In other words, the DMS is stuck somewhere, and the E/S words may indicate where. There are some cases, however, where E/S words are not available for analysis (such as core access or ETS difficulties) in which case the sense lines must be used. Certain core access troubles cause DCU TIME OUT indications - see section 4.4 for complete coverage of core access problems and related sense line status.

After the DCU TIME OUT is detected (DCU ERROR interrupt set) a period of 8 interlace periods (approx. 60 μs on interlace 5) must elapse before error/status indicators may be used. In other words a software wait may be used by checking the DCU ERROR/STATUS IN CORE sense line. When set the E/S words are available in core for diagnostics.

2.2.3.5.4 Core Access Problems

Unique problems may arise which cause core access difficulties. The CORE ACCESS TRBL sense line is a monitor of the core request time out circuits. Certain core access trouble conditions could cause the CMC to set its CMC PORT MALFUNCTION in both CMC's. When this occurs, and the CORE ACCESS TRBL line is set or not set, the DCU will enter a state of quiescence (not idle, not ready, and not active). the DCU will sit in this state (without sending an interrupt) until another CPD is issued. The interrupt is sent by the CMC. In all cases (except for a certain prot malfunction) it may be concluded that the DMS contains the fault. The DMS may be accessed via CPD for diagnostics. Localization can be accomplished by running routines based on possible DMS error conditions.

If the PORT MALFUNCTION sense line of one CMC is set and the CORE ACCESS TRBL line of the DCU is set or not set, the DCU again enters the quiescent state, but the fault is in the CMC. The interrupt in this case is set by the CMC.

In the final case where the DCU has trouble accessing core (CORE ACCESS TRBL Set) and the PORT MALFUNCTION line is not set, the DCU will enter its quiescent state until a DCU ERROR interrupt is set by the DCU time out circuits (about 0.5 sec.).

These decisions are shown in the lower right of the flow chart in FIG. 17 beginning at D. Table 2 in section 2.2.3.2.2 shows at a glance the states of the DCU in the event of core access difficulties. This approach is used to insure that interface errors of this nature will not cause more than one interrupt to the CCP.

DMS APPENDIX I

FORMAT OF DMS REGISTERS

1. Initialization Address Register - IAR (15 bits)

This register consists of a 5 bit binary counter and a strapping field for the high order 10 bits. It is used to form the address for accessing the Initiation table entry (ITE) in main core memory during the initiation cycle or during the storage of all DMS registers into the ITE (caused by a spill CPD). When an Initialize CPD is issued, the low order 5 bits will be set to 0. This requires the ITE to begin at a location divisible by 32.

2. Core Address Register - CAR (26 bits)

The low order 15 bits of this counter and storage register are used to access main core memory during all active processes other than the processes for which the Initialization Address Register is used. This address, loaded during initialization, is used to specify the starting core address where the data transfer between core and the drum will take place. Bits 15–20 are not programmable. The tag field (bits 21, 22, 23) are not used by the DCU and may be used to aid programs. When the DCU executes the error termination sequence, bits 15 through 19 will contain the low order 5 bits of the LAR.

3. Limit Register (14 bits)

This is a 14 bit binary counter and storage register. For single level counter start, the number of words to be transferred is loaded into this register during the initialization cycle. The limit register is also used for indexing in the SLAS mode refer to DMS Appendix II.

4. Instruction Register (12 bits)

This is a 12 bits storage register used to hold the DCU directive (4 bits) and the directive extension (6 bits); refer to DMS Appendix II.

5. Core Buffer Register - CBR (26 bits)

This is a 26 bit storage register used to buffer words which are written or read into core memory.

6,7,8. Information Search Register - ISR1, 2, 3 (26 bits)

These storage registers (one for each level of search) specify the drum address or data coincidence to be encountered to enter their respective levels of associative search. These registers are normally loaded during the initialization sequence however, the second and third can be modified with information on drum when specified by the control bits. When coincidence is found these registers will be loaded with the drum address +8 of the level 1,2,3 coincidence word respectively.

9,10,11. Information Mask Register - IMR (26 bits)

These storage registers (one for each level of search) are provided to facilitate a masked associative search. These registers are loaded at initialization time similar to the Information Search registers. When each level of coincidence is found IMR1, 2, 3 respectively, will be loaded with the Core address register which contains the location of the coincidence word in core. The high order bit (23) of IMR 2 and 3 will be set if the corresponding search register was overwritten with a word from drum. Bit 22 will be set if the mask word was overwritten after initialization.

12. Drum Buffer Register - DBR (27 bits)

This is a 27 bit register used to buffer words read from (written onto) Drum.

13. Drum Address Register - DAR (26 bits)

This 26 bit register has the following format:

| RWI | CS | Space | Segment | | ADD | |
|---|---|---|---|---|---|---|
| 23 | 22 | 20 | 16 | 15 | | 0 |

Address field this field is used to specify a location on the drum. The value of this field will vary from 0 to 10,998 (Binary or BCD).

Segment

This field is used to specify a segment for a read (write) operation. Its value can vary from 0 to 18 depending on the number of DCU's assigned to a drum.

Counter select (CS) bit (bit 22)

This bit is used to select the counter BCD or Binary, to be used in accessing the drum via the angular index value. It also specifies which counter should be retrieved in the associative search mode.

CS=1 use modified BCD

CS=0 use Binary

Read/Write instruction (RWI) bit - (bit 23) this bit must be set if the DCU is to write on drum.

RWI=1 Write
RWI=0 Read

14. Angular Index Counters

A standard binary and modified BCD counter is required for each DAC peripheral Adapter. The range of this counter is from 0 to 10,998. This counter will be reset by the drum reset pulse. This is not a standard BCD counter because of the requirements that the high order 4 bit stage count from 1 to 9 to 0 rather than 0 to 9. Also 0 in base 10 is represented by the bit pattern 1010. This counter is also reset by the drum reset pulse.

The relationship between the values of each counter is illustrated in DMS Appendix III.

DAC ANGULAR INDEX COUNTERS

| DECIMAL ADDRESS | INTERLACE | BINARY COUNTER | BCD COUNTER |
|---|---|---|---|
| 0 | 5 | 00000000000000 | 0001101010101010 |
| 1 | 1 | 1 | 0001 |
| 2 | 2 | 10 | 0010 |
| 3 | 3 | 11 | 0011 |
| 4 | 4 | 100 | 0100 |
| 5 | 5 | 101 | 0101 |
| 6 | 1 | 110 | 0110 |
| 7 | 2 | 111 | 0111 |
| 8 | 3 | 1000 | 1000 |
| 9 | 4 | 1001 | 1001 |
| 10 | 5 | 1010 | 00011010 |
| 100 | 5 | 00000001100100 | 000110101010 |
| 1000 | 5 | 00001111101000 | 0010101010101010 |
| 9000 | 5 | 10001100101000 | 1010101010101010 |
| 10000 | 5 | 10011100010000 | 1011101010101010 |
| 10998 | 3 | 10101011110110 | 1011101010101000 |
| 0 | 4 | 00000000000000 | 0001101010101010 |
| 1 | 5 | 00000000000001 | 0001101010100001 |

DMS APPENDIX II

DMS INSTRUCTION REGISTER AND CPD DIRECTIVES

| 25 | 24 | 23–20 | 19 | 18 | 17–14 | 13–0 |
|---|---|---|---|---|---|---|
| MP | P | OP | PT | BM | | LIMIT |

OP = Bits 23 thru 20 = 7 = $(0111)_2$
PT = In WRITE DRUM Sequence, the PT is meaningless.
BM = Bit 18 — if bit 18 is true a block mark will be written on the drum along with the last word transferred.
LIMIT = Bits 0 thru 13 the limit portion of the directives specifies the number of words to be read from core and written on the drum.
Bits = 14 thru 17 are not decoded or used during this operation.

Cycles = I + S + N (T) + ES + TERM/CORE CYCLE TIME

I = 45.4 μsec = Initialize
A = 0 to 16666 μsec = SEARCH
N = number of words written/read
T = 7.56 μsec = TRANSFER TIME PER WORD
ES = 0 to 7.56 μsec = END SEQUENCE
TERM = 7.56 μsec = TERMINATION

DRUM READ SINGLE LEVEL COUNTER START

| 25 | 24 | 23–20 | 19 | 18 | 17–14 | 13–0 |
|---|---|---|---|---|---|---|
| MP | P | OP | PT | BM | | LIMIT |

OP = Bits 23 thru 20 = 6 $(0110)_2$
PT = Bit 19 — if bit 19 is true the controller will assume a privileged transfer status for the entire transfer.
BM = Bit 18 — if bit 18 is true the controller will make a check for a block mark when the last word is read from drum. If the bit is false this check will be bypassed. It will check if BM comes true before LR=O, or if LR=0 and BM not true.
LIMIT = Bits 0 thru 13 the limit portion of the directive specifies the number of words to be read from drum and transferred to core.
Bits 14 thru 17 are not decoded or used during this operation Note: If PT is not set, the words may be transferred only to an unprotected area in core. Any attempt to write a word from drum to core when bit 25 of that word is a "1", will cause an error and being error sequence.
Refer to Drum Write for calculating core cycle per task.

DRUM READ ROUTINE (SLCS)

| 25 | 24 | 23 | 20 | 19 | 18 | 17 | 14 | 13 | 0 |
|---|---|---|---|---|---|---|---|---|---|
| MP | P | OP | | PT | BM | | | LIMIT | |

OP = Bits 23 thru 20 = $16_8 = (1110)_2$

BM = Bit 18 — if bit 18 is true the controller will make a check for a block mark when the last word is read from drum. It will check if BM comes true before LR=0. If the bit is false this check will be bypassed.

LIMIT = Bits 0 thru 13 the limit portion of the directive specifies the number of words to be read from drum and checked for proper parity.

Bits = 14 thru 17 are not decoded or used during this operation.

Note: Refer to Drum Write for calculating core cycles per task.

SINGLE LEVEL ASSOCIATIVE SEARCH

| 25 | 24 | 23 | 20 | 19 | 18 | 14 | 13 | 0 |
|---|---|---|---|---|---|---|---|---|
| MP | P | OP | | PT | LIMIT | | INDEX | |

OP = Bits 23 thru 20 = 5 = $(0101)_2$

PT = Bit 19 - if bit 19 is true the controller will assume a privileged transfer status for the entire transfer.

INDEX = Bits 0 thru 13 the index portion of the directive specifies the number of words to SKIP after information coincidence until a transfer to core memory will begin.

LIMIT = Bits 14 thru 18 the limit portion of the directive specifies the total number of words to be read from drum and written into core.

NOTE* Associative searching is performed in interlace 1, every word is examined. After information coincidence indexing and transfer will take place at the DCU interface rate.

CYCLES = I+S+T (N+1)+ES+TERM/CORE CYCLE TIME

| | | |
|---|---|---|
| I | = | 75.6 μsec |
| S | = | 0 to 16666 μsec |
| T | = | 7.56 μsec |
| N+1 | = | Number of words read + coincidence word |
| ES | = | 0 to 7.56 μsec |
| TERM | = | 7.56 μsec |

SINGLE LEVEL ASSOCIATIVE SEARCH ROUTINE

| 25 | 24 | 23 | 20 | 19 | 18 | 14 | 13 | 0 |
|---|---|---|---|---|---|---|---|---|
| MP | P | OP | | PT | LIMIT | | INDEX | |

OP = Bits 23 thru 20 = $(15)_8 = (1101)_2$

INDEX = Bits 0 thru 13 the index portion of the directive specifies the number of words to skip after information coincidence before the read latch is set.

LIMIT = Bits 14 thru 18 the limit portion of the directive specifies the number of words to be read from drum with the read latch set.

NOTE: Refer to Single Level Associative Search for calculating core cycles per task.

SINGLE LEVEL ASSOCIATIVE SEARCH COUNTER START

| 25 | 24 | 23 | 20 | 19 | 18 | 14 | 13 | 0 |
|---|---|---|---|---|---|---|---|---|
| MP | P | OP | | PT | LIMIT | | INDEX | |

OP = Bits 23 thru 20 = 4 = $(0100)_2$

This directive is the same as Single Level Associative Search except information search will begin after counter coincidence.

Bit 23 = Routine all operations will be performed with the exception of writing into core memory.

NOTE* After counter coincidence associative search will be performed at the DCU interlace rate.

SINGLE LEVEL ASSOCIATIVE SEARCH COUNTER START -Continued

| 25 | 24 | 23 | 20 | 19 | 18 | 14 | 13 | 0 |
|---|---|---|---|---|---|---|---|---|
| M P | P | OP | | P T | LIMIT | | INDEX | |

| | | |
|---|---|---|
| CYCLES | = | I+S+5(S)+T(N+1) +ES+TERM |
| I | = | 75.6 μsec. = INITIALIZE |
| S | = | 0 to 16666 μsec — SEARCH |
| N+1 | = | Number of words read + associative coincidence word. |
| T | = | 7.56 μsec = TRANSFER TIME PER WORD |
| ES | = | 0 to 7.56 μsec = END SEQUENCE |
| TERM | = | 7.56 μsec. = TERMINATION |

MULTI-LEVEL ASSOCIATIVE SEARCH AND ROUTINE

| 25 | 24 | 23 | 20 | 19 | 18 | 17 | 16 | 15 | 14 | 13 | 0 |
|---|---|---|---|---|---|---|---|---|---|---|---|
| M P | P | OP | | P T | | | | B | A | | |

| | | |
|---|---|---|
| OP | = | Bits 23 thru 20 = 3 = $(0011)_2$ |
| PT | = | Bit 19 — if bit 19 is true the controller will assume a protected status for the entire transfer. |
| A | = | Bit 14 — if bit 14 is true the first level of search will be a counter coincidence. If false it will be associative with MR1 and SR1. |
| B | = | Bit 15 — if bit 15 is true the second level of search will be a counter search. If false the search will be associative with MR2 and SR2. |
| C | = | Bit 16 — if bit 16 is true the third level of search will be a counter search. If false the search will be associative with MR3 and SR3. |
| CS | = | Counter Start. If OP code OP = 2 — $(0010)_2$ is true the first level of associative search will begin after counter coincidence. |
| Bits | = | 0–13 are not used and not decoded. |
| Bit 23 | = | Routine: All operations will be performed with the exception of writing into core memory. |
| NOTE* | | Once the first coincidence is found all succeeding associative searches and transfers take place at the DCU interlace rate. All counter searches will be on interlace 1. |
| CYCLES | = | LEV1 + LEV2 + LEV3 + ES+TERM |
| LEV 1 | = | I + S + N (T) if level 1 is a counter start add the term 5(S) for searching an interlace five |
| LEV 2&3 | = | if searching for associative coincidence =LD + W + S + N (T) |
| ES | = | to 7.56 μsec = END SEQUENCE |
| TERM | = | 7.56 μsec = TERMINATION |
| I | = | 136.2 μsec = INITIALIZE |
| S | = | 0 to 16666 μsec — SEARCH |
| N | = | number of words read |
| T | = | 7.56 μsec = TRANSFER TIME PER WORD |
| LD | = | 7.56 μsec = LOAD DAR |
| W | = | 0 to 15.0 μsec = WAIT FOR SEGMENT SELECTION |

DCU DIRECTIVES AND FORMATS

The binary codes for the directives are summarized below. A more elaborate description found within.

| INSTRUCTION REGISTER 23 | 22 | 21 | BITS 20 | DIRECTIVE DESCRIPTION |
|---|---|---|---|---|
| 0 | 0 | 0 | 0 | INVALID OP CODE |
| 0 | 0 | 0 | 1 | INVALID OP CODE |
| 0 | 0 | 1 | 0 | MULTI LEVEL ASSOCIATIVE SEARCH — COUNTER START |
| 0 | 0 | 1 | 1 | MULTI LEVEL ASSOCIATIVE SEARCH |
| 0 | 1 | 0 | 0 | SINGLE LEVEL ASSOCIATIVE SEARCH — COUNTER START |
| 0 | 1 | 0 | 1 | SINGLE LEVEL ASSOCIATIVE SEARCH |
| 0 | 1 | 1 | 0 | READ DRUM — BLOCK TRANSFER |
| 0 | 1 | 1 | 1 | WRITE DRUM — BLOCK TRANSFER |
| 1 | 0 | 0 | 0 | INVALID OP CODE |
| 1 | 0 | 0 | 1 | DAC MAINTENANCE |
| 1 | 0 | 1 | 0 | MULTI LEVEL ASSOCIATIVE SEARCH — COUNTER START — ROUTINE |
| 1 | 0 | 1 | 1 | MULTI LEVEL ASSOCIATIVE SEARCH — ROUTINE |
| 1 | 1 | 0 | 0 | SINGLE LEVEL ASSOCIATIVE SEARCH — COUNTER START — ROUTINE |
| 1 | 1 | 0 | 1 | SINGLE LEVEL ASSOCIATIVE SEARCH — ROUTINE |
| 1 | 1 | 1 | 0 | READ DRUM ROUTINE |
| 1 | 1 | 1 | 1 | INVALID OP CODE |

This code will routine the error checking circuits of the DAC. For example, to check the PA circuits, bit 16 is set and any or all of bits 0–4 are set to check the circuits which correspond to each bit.

DAC MAINTENANCE CONTROL

| 23 | 20 | 19 | 18 | 17 | 16 | 15 | 11 | 10 | 5 | 4 | 0 |
|---|---|---|---|---|---|---|---|---|---|---|---|
| OP | | | A C C | C L K | P A | ACCESS CIRCUIT | | CLOCK CKTS | | PA CKTS | |

| | | |
|---|---|---|
| OP | = | Bits 23 thru 20 = 11 = $(1001)_{11}$ |

CPD CONTROL

The control between the CPU and DCU is as follows:

| | | |
|---|---|---|
| 1) | CPD Clear | (DL0=0, DL1=0) |
| 2) | CPD Initialize | (DL0=1, DL1=0) |
| 3) | CPD Spill* | (DL0=0, DL1=1) |
| 4) | CPD Maintenance** | (DL0=1, DL1=1) |

*CPD Spill. The CPD spill directive dumps all the registers of the DCU and CMS, and the error/status bits of the DMS.
The DAC error checking circuits may be routined by the DAC Maintenance word via initialization.
**The DCU error checking circuits and the parity circuits may be routined by the CPD Maintenance. This command causes the instruction in the IR to be routined.

The DCU must receive a CPD Clear before any data transfer may be executed via initialization.

At the completion of a data transfer or the completion of an Error Termination Sequence the DCU will interrupt the DCU with a READY or ERROR interrupt respectively.

With the READY or ERROR interrupt set, the DCU may be called to execute a CPD Spill, a DMS Maintenance Sequence, or a CPD Maintenance. The DCU will reset the interrupt upon execution of the command, and then set the previous interrupt. Any attempt to initialize for a data transfer (Block Transfer or Associative Search) will begin an Error Termination Sequence and cause an ERROR interrupt. The DCU may be initialized for Maintenance, however.

This flow of DCU sequences is made clear by the attached flow chart, FIG. 17. The chart shows the normal sequential flow of the DCU for data transfers and errors. It also makes clear the consequences of a programming violation.

APPENDIX III

INITIALIZATION TABLE FORMAT

The initialization format is a map of the initialization area in core. Each DCU has its own assigned initializaztion area in core. The even numbered location 0–16 contain all the pertinent information necessary to specify a drum task, refer to the following table. After the DCU has completed initialization the odd numbered location 1–17 will contain the image of their preceding even location. This is to verify that the information was accurately loaded into the DMS registers. If the drum task was completed successfully, location 24 will contain the last CAR address. If an error occurred, the error termination sequence will load the DAC and DCU error/status words in locations 18, 20 and 22.

After a CPD spill directive the odd numbered location 1–23 and locations 18, 20, 22 and 24 will be updated with the CPD spill format, refer to the following table.

APPENDIX III

CORE FORMAT FOR INITIALIZATION TABLE

| | INITIALIZATION | SPILL | |
|---|---|---|---|
| | 23 20 19 18 17 13 0 | | |
| 0 | MP P DIRECTIVE PT BM AI EXT LIMIT | | |
| 1 | 23 20 16 15 ... 0 | IR | LR |
| 2 | WC RS SEG INITIAL DRUM ADDRESS | | |
| 3 | 14 ... 0 | | DAR |
| 4 | INITIAL CORE ADDRESS | | |
| 5 | 23 ... 0 | | CAR |
| 6 | SEARCH WORD 1 | | |
| 7 | | SR1 | DRUM ADDRESS OF 1ST COINCIDENCE |
| 8 | MASK WORD 1 | | |
| 9 | | MR1 | CORE ADDRESS OF 1ST COINCIDENCE |
| 10 | SEARCH WORD 2 | | |
| 11 | | SR2 | DRUM ADDRESS OF 2ND COINCIDENCE |
| 12 | MASK WORD 2 | | |
| 13 | | MR2 | CORE ADDREESS OF 2ND COINCIDENCE |
| 14 | SEARCH WORD 3 | | |
| 15 | | SR3 | DRUM ADDRESS OF 3RD COINCIDENCE |
| 16 | MASK WORD 3 | | |
| 17 | | MR3 | CORE ADDRESS OF 3RD COINDICENCE |
| 18 | | ASSOCIATIVE SEARCH ERR WORD | |
| 19 | | CORE BUFFER REG (CBR) | |
| 20 | | DAC ERR WORD | |
| 21 | | DRUM BUFFER REG (DBR) | |
| 22 | | DCU CONTROL & BLK TRANS ERR | |
| 23 | | ALL ZEROS (BUS B-C CHECK) | |
| 24 | | IAR | CAR |

NOTES:
1. For block transfer write or read, locations 0,2,4 are loaded into the DCU and copied back.
2. For associative search, search and mask words are also used.
3. Termination sequence dumps CAR into location 24.
4. Error termination dumps error words into locations 18, 20, 22, followed by termination which included IAR only when error.
5. CPD spill gives complete right column format above.

What is claimed is:

1. In a rotating memory system having a rotating memory and having write and read head means, first power means for driving the rotating memory, second power means for powering the head means, third power means for inhibiting the write and read means and fourth power means for enabling said write and read head means, a memory protect circuit means operated upon application of said first power means to thereafter enable said second and third power means said memory protect circuit means further including power level monitor means operated to provide an output upon any one of said power means going out of range to first disable said fourth power means, and monitor means for sensing the speed of said rotating memory and for providing an output corresponding to said speed to enable said fourth power means so that said fourth power means enables said write and read head means in response to said monitoring means sensing certain rotating memory speeds.

2. In a rotating memory system as claimed in claim 1 wherein said rotating memory is a magnetic drum having a plurality of write and read heads associated therewith, a corresponding plurality of amplifiers and head select circuit means, wherein said third power means is for said head select means.

3. In a rotating memory system as claimed in claim 2 wherein said memory system includes at least a first and a second "fourth" power means and where said memory protect circuit means includes means connected to each said first and second "fourth" power means for receive power.

4. In a rotating memory system as claimed in claim 3 wherein said power level monitor means includes a crowbar circuit to disable said fourth power means.

5. In a rotating memory system as claimed in claim 4 wherein said memory protect circuit means includes a means to provide a reset signal to said write and read head control means prior to all power means being enabled.

* * * * *